US012441770B2

(12) United States Patent
Filipovska et al.

(10) Patent No.: US 12,441,770 B2
(45) Date of Patent: Oct. 14, 2025

(54) PROTEINS AND THEIR USE FOR NUCLEOTIDE BINDING

(71) Applicant: The University of Western Australia, Nedlands (AU)

(72) Inventors: Aleksandra Filipovska, Stirling (AU); Oliver Rackham, Stirling (AU)

(73) Assignee: The University of Western Australia, Nedlands (AU)

( * ) Notice: Subject to any disclaimer, the term of this patent is extended or adjusted under 35 U.S.C. 154(b) by 1036 days.

(21) Appl. No.: 16/972,241

(22) PCT Filed: Jun. 6, 2019

(86) PCT No.: PCT/AU2019/050586
§ 371 (c)(1),
(2) Date: Dec. 4, 2020

(87) PCT Pub. No.: WO2019/232588
PCT Pub. Date: Dec. 12, 2019

(65) Prior Publication Data

US 2023/0287060 A1 Sep. 14, 2023

(30) Foreign Application Priority Data

Jun. 6, 2018 (AU) ................................ 2018902033

(51) Int. Cl.
*C07K 14/415* (2006.01)
*C07K 14/43* (2006.01)
*C07K 14/435* (2006.01)
*C12N 15/85* (2006.01)

(52) U.S. Cl.
CPC ...... *C07K 14/415* (2013.01); *C07K 14/43595* (2013.01); *C12N 15/85* (2013.01); *C12N 2800/107* (2013.01)

(58) Field of Classification Search
CPC ....................... C07K 14/415; C07K 14/43595; C12N 15/85; C12N 2800/107
See application file for complete search history.

(56) References Cited

U.S. PATENT DOCUMENTS 8,026,413 B2 * 9/2011 Perez ................. C12N 15/8261 800/290
2008/0313778 A1 * 12/2008 Perez ................. C12N 15/8261 800/290
2016/0075744 A1 * 3/2016 Yamamoto ............... C12N 9/22
2019/0177378 A1 6/2019 Yamane et al.

FOREIGN PATENT DOCUMENTS

WO WO-2013155555 A1 * 10/2013 ........... C07K 14/001
WO WO-2018/030488 A1 2/2018

OTHER PUBLICATIONS

Manna, 2015, An overview of pentatricopeptide repeat proteins and their applications, Biochimie, 113: 93-99.*
Lei et al., 2005, Switching Human Telomerase On and Off with hPOT1 Protein in Vitro, The Journal of Biological Chemistry, 280(21): 20449-20456.*
Choi et al., 2011, Characterization of the DNA binding specificity of Shelterin complexes, Nucleic Acids Research, 39(21): 9206-9223.*
Choi et al., 2015, The OB-fold domain 1 of human POT1 recognizes both telomeric and non-telomeric DNA motifs, Biochimie, 115: 17-27.*
Lei et al., 2004, Structure of human POT1 bound to telomeric single-stranded DNA provides a model for chromosome end-protection, Nature Structural & Molecular Biology, 11(12): 1223-1229.*
Xiao et al., 2012, interaction of Berberine derivative with protein POT1 affect telomere function in cancer cells, Biochemical and Biophysical Research Communications, 419: 567-572.*
Adams et al., Phenix: a comprehensive Python-based system for macromolecular structure solution, Acta Crystallogr. D. Biol. Crystallogr, 66:213-21 (2010).
Bailey, Dreme: motif discovery in transcription factor ChIP-seq data, Bioinformatics, 27(12):1653-1659 (2011).
Chen et al., MolProbity: all-atom structure validation for macromolecular crystallography, Acta Crystallogr. D. Biol. Crystallogr, 66(Pt 1):12-21 (2010).
Cohen et al., A sensitive direct human telomerase activity assay, Nat. Methods, 5(4):355-360 (2008).
Cowtan, The Buccaneer software for automated model building. 1. Tracing protein chains, Acta Crystallogr. D. Biol. Crystallogr., 62:1002-11 (2006).
Dickey et al., Single-stranded DNA-binding proteins: multiple domains for multiple functions, Structure, 21:1074-1084 (2013).
Emsley, Coot: model-building tools for molecular graphics, Acta Crystallogr. D. Biol. Crystallogr., 60:2126-32 (2004).

(Continued)

*Primary Examiner* — Amber D Steele
(74) *Attorney, Agent, or Firm* — MARSHALL, GERSTEIN & BORUN LLP

(57) ABSTRACT

A method of regulating expression of a gene in a cell is described, comprising the step of introducing into the cell a recombinant polypeptide comprising a PPR ssDNA-binding domain which itself comprises at least a pair of PPR ssDNA base-binding motifs. The PPR ssDNA base-binding motifs of the PPR ssDNA-binding domain are operably capable of binding the target ssDNA. Recombinant polypeptides comprising at least one PPR sDNA-binding domain capable of binding to target ssDNA sequence are also described, together with fusion proteins comprising the recombinant PPR ssDNA-binding domains, as well as isolated nucleic acids useful in preparing the recombinant polypeptides described. Recombinant vectors; compositions comprising the recombinant polypeptides; isolated nucleic acids; recombinant vectors; host cells comprising same; use of same in the manufacture of a medicament for regulating gene expression; as well as systems and kits for regulating gene expression are also described.

18 Claims, 20 Drawing Sheets

Specification includes a Sequence Listing.

(56) References Cited

OTHER PUBLICATIONS

Gully et al., The design and structural characterization of a synthetic pentatricopeptide repeat protein, Acta Crystallogr. D. Biol. Crystallogr., 71:196-208 (2015).
International Application No. PCT/AU2019/050586, International Search Report and Written Opinion, mailed Aug. 1, 2019.
International Application No. PCT/AU2019/050586, International Preliminary Report on Patentability, mailed Sep. 24, 2020.
Lovell et al., Structure validation by Calpha geometry: phi,psi and Cbeta deviation, Proteins, 50:437-50 (2003).
Main et al., Design of stable alpha-helical arrays from an idealized TPR motif, Structure, 11(5):497-508 (2003).
Martin, Cutadapt removes adapter sequences from high-throughput sequencing reads, EMBnet. Journal, 17(1):10-12 (2011).
Pedelacq et al., Engineering and characterization of a superfolder green fluorescent protein, Nat. Biotechnol., 24(1):79-88 (2006).
Richardson et al., Amino acid preferences for specific locations at the ends of alpha helices, Science, 240:1648-52 (1988).
Smart et al., Exploiting structure similarity in refinement: automated NCS and target-structure restraints in BUSTER, Acta Crystallogr. D. Biol. Crystallogr., 68:368-80 (2012).
Tomlinson et al., Quantitative assays for measuring human telomerase activity and DNA binding properties, Methods, 114:85-95 (2017).
Vonrhein et al., Automated structure solution with autoSHARP, Methods Mol. Biol., 364:215-30 (2007).
Zykovich et al., Bind-n-Seq: high-throughput analysis of in vitro protein-DNA interactions using massively parallel sequencing, Nucleic Acids Res., 37(22):e151 (2009).
Ashton et al., Human single stranded DNA binding proteins are essential for maintaining genomic stability, *BMC Molecular Biol.*, 14(4):1-20 (2013).
Chia et al., Engineering pentaricopeptide repeat proteins for programmable nucleic acid manipulation, Doctor of Philosophy, Univ. West. Australia, Chapter 5, Figs. 5.13, 5.10, 5.19, 5.5 and 6.1 (2016).
Coquille et al., An Artificial PPR Scaffold for Programmable RNA Recognition, *Nature Communications,* 5:5729 (2014).
Hammani et al., the Pentatricopeptide Repeat Protein OTP87 Is Essential for RNA Editing of nad7 and atp1 Transcripts in *Arabidopsis* Mitochondria, *J. Biol. Chem.,* 286(24):21361-71 (2011).
Ke et al., Structural basis for RNA recognition by a dimeric PPR-protein complex, *Molec. Biol.,* 20(12):1377-82 (2013).
Loayza et al., POT1 as a terminal transducer of TRF1 telomere length control, *Letters to Nature,* 423:1013-8 (2003).
Shen et al., Structural Basis for Specific single-stranded RNA recognition by designer pentatricopeptide repeat proteins, *Nature Communications,* 7:11285 (2016).
Spahr et al., Modular ssDNA binding and inhibition of telomerase activity by designer PPR proteins, *Nature Communications,* 9:2212 (2018).
Yin et al., Structural basis for the modular recognition of single-stranded RNA by PPR proteins, *Nature ,* 504:168-72 (2013).
International Search Report and Written Opinion of the International Searching Authority, Australian Patent Office, PCT/AU2019/050586, mailed Aug. 1, 2019.
International Preliminary Report on Patentability, Australian Patent Office, PCT/AU2019/050586, mailed Sep. 24, 2020.
Extended European Search Report and Opinion issued in European Patent Application No. 19814876.9 dated Feb. 7, 2022.
Lei Ming et al., *Nature Structural & Molecular Biology* (2004); vol. 11, No. 12, pp. 1223-1229.
Zaug A. J. et al., *Proceedings of the National Academy of Sciences* (2005), vol. 102, No. 31, pp. 10864-10869.

* cited by examiner

Figure 1A
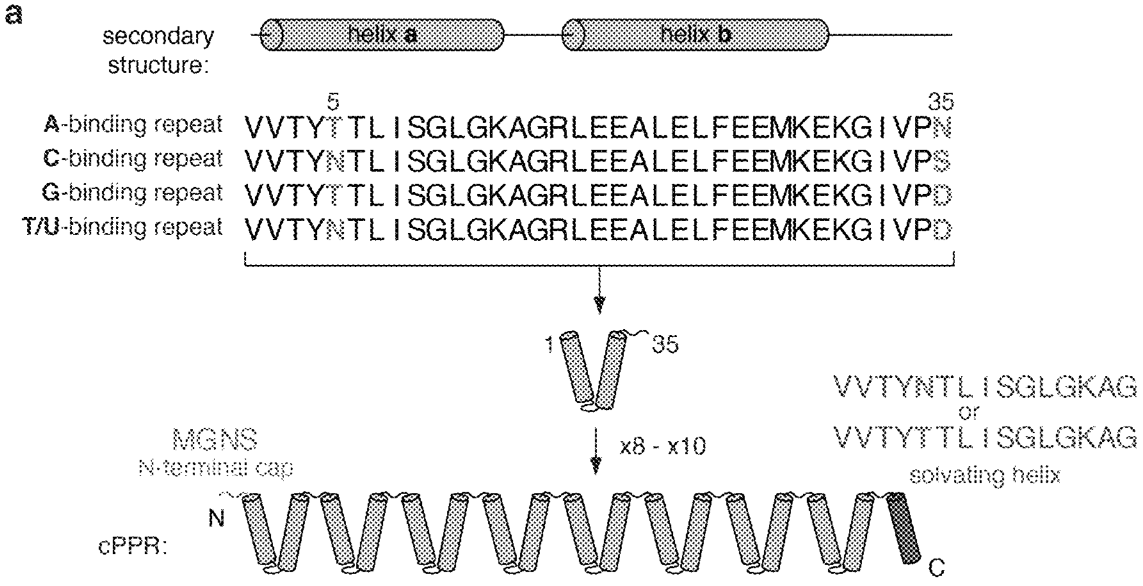
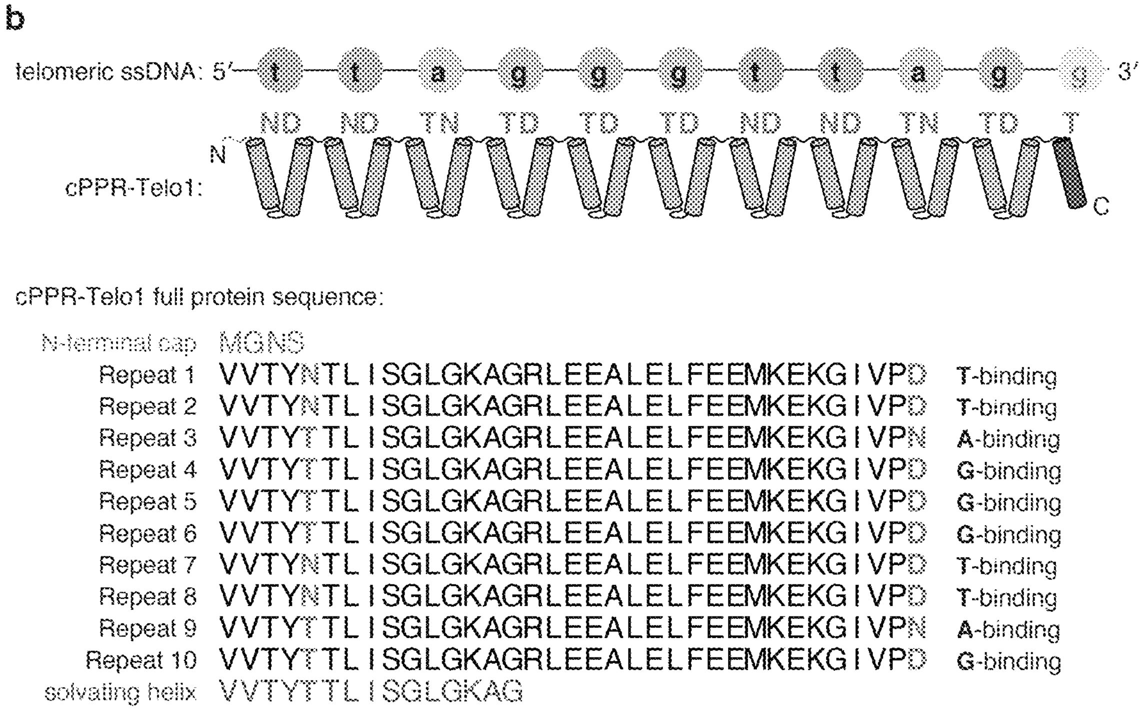
Figure 1B a

Telo-ssDNA 5′-ttagggttagggttaggg- 3′

Telo-ssDNA-GG 5′-ggttagggttagggttaggg- 3′

PROTEINS AND THEIR USE FOR NUCLEOTIDE BINDING

This application contains, as a separate part of disclosure, a Sequence Listing in computer-readable form (Filename: 56221_SubSeqListing.xml; Size: 74,803 bytes; Created: Mar. 17, 2025) which is incorporated by reference herein in its entirety.

TECHNICAL FIELD

The technical field of the invention relates to methods of regulating gene expression using pentatricopeptide repeat (PPR) binding proteins; methods of identifying a binding target nucleotide sequence of a PPR nucleotide-binding domain; as well as artifical (e.g., recombinant or synthetic) polypeptides; fusion proteins comprising the artifical polypeptides; isolated nucleic acids; recombinant vectors; compositions comprising the artifical polypeptides, nucleic acids, or recombinant vectors of the invention; use of the same in the manufacture of a medicament for regulating gene expression; systems and kits for regulating gene expression, and host cells.

Preferably, the PPR sequences are of non-natural (artificial) origin and most preferably they are designed and/or programmed for sequence-specific single stranded DNA (ssDNA) binding. More particularly, the invention provides PPR proteins that can bind ssDNA in a sequence-specific manner analogous to how they bind RNA. The modularity of the PPR proteins enables the design of PPRs that target telomeric ssDNA, blocking extension by human telomerase providing a basis for new cancer therapeutics.

BACKGROUND ART

The following discussion of the background art is intended to facilitate an understanding of the present invention only. The discussion is not an acknowledgement or admission that any of the material referred to is or was part of the common general knowledge as at the priority date of the application.

Manipulation of ssDNA

DNA is predominantly found as a stable duplex in biological systems. However, accessing the genetic information stored in DNA for transcription, replication, recombination and repair, requires the separation of DNA duplexes and exposure of ssDNA. The presence of ssDNA also ensures the recruitment of the enzymatic activities required for these processes. On the other hand, exposed ssDNA is particularly susceptible to both chemical and enzymatic damage. Cells have a variety of mechanisms to protect ssDNA and ensure the rapid return of ssDNA to a duplex state. If these mechanisms fail there are severe consequences for the cell, such as replication stalling that results in rapid increases in ssDNA. This exposed ssDNA acts as a marker of stress and activates cell signalling pathways to halt cell cycle progression and mobilise DNA repair processes and, if these fail, initiation of cell destruction via apoptosis.

Despite its vulnerability, a large number of viruses and bacteriophages use ssDNA as the transmissible form of their genomes. The mutation rates of ssDNA viruses are extremely high and approach those of viruses with RNA genomes. This might provide an evolutionary advantage, enabling a pool of viruses with variant genomes to be produced from each infected cell, some of which might have a selective advantage in subsequent infections.

In another important biological process, bacterial conjugation, ssDNA plays an important role as it is the form by which genetic information is transferred to recipient cells. In addition, ssDNA plays an important role in the maintenance and function of telomeres.

Telomeres protect the ends of linear eukaryotic chromosomes from degradation and from fusion with other chromosomes. The repetitive telomeric sequences consist of long double-stranded G-rich sequences followed by short, 50-150-nucleotide, single-stranded ends synthesised by the telomerase reverse transcriptase. In humans, telomeres are usually protected by a six-protein complex, known as shelterin.

Of the six shelterin proteins, only the Protection of Telomeres Protein 1 (POT1) binds single-stranded telomeric DNA.

Although robust technologies have now emerged that enable the site-specific manipulation of dsDNA and RNA in living cells, the manipulation of ssDNA has not been possible to date.

Because natural ssDNA-binding proteins use binding domains that recognise a combination of sequence and structure, for example OB folds and RNA recognition motifs (RRMs), they cannot be easily repurposed to bind new ssDNA targets. Hence, there exists a need for a system or method that permits manipulation of such sequences.

Pentatricopeptide Repeat (PPR) Proteins

Pentatricopeptide repeat (PPR) proteins are a family of RNA-binding proteins found predominantly in mitochondria and chloroplasts in eukaryotes. These binding proteins belong to the alpha solenoid repeat superfamily that has been suggested for use in engineering of RNA-binding proteins for the preferential binding of specific RNA sequences. They regulate RNA processing, translation, stability and editing and possess well-characterised modular RNA recognition properties.

PPR proteins are typically defined as tandem arrays of 2-30 degenerative repeats (with an average being approximately 12 repeats). Each repeat usually consists of 35 amino acids which fold into 2-helical bundles that stack to form an extended solenoid structure that recognises RNA in a sequence-specific manner based on the identities of amino acids at positions 5 and 35 of each repeat.

PPR proteins typically bind single-stranded RNA (ssRNA) in a sequence-specific fashion. However, there is little information on their nucleic acid specificity. Further, identifying the exact amino acid residues involved in binding to any nucleic acid target is complicated by the fact that PPR arrays compress significantly upon nucleotide binding. This reorientates the PPR helices so that different residues can be involved in initial recognition of the nucleic acid target backbone sugar, compared to amino acid residues those involved in later accommodation of the nucleotides within the PPR solenoid structure. In part, this may explain why the plant Organelle Transcript Processing 87 (OTP87) PPR protein binds ssRNA but not ssDNA, dsDNA or dsRNA and why the plant Thylakoid Assembly 8 (THA8) PPR protein binds ssRNA with greater than 100 fold higher affinity than ssDNA. However, detailed comparisons have been hampered because of PPR proteins' instability and insolubility.

The highly insoluble nature of PPR proteins make them extremely difficult to work with to understand their structural and RNA-binding properties. Furthermore, while PPR proteins have been attributed generally to RNA-binding functions, the specific nature and mechanism of this binding remains unclear.

Even though engineered PPR scaffolds enable the predictable binding of RNA targets, there remains a need for similar predictable structures with DNA or more particularly ssDNA. It is against this uncertain background that the present invention has been developed.

SUMMARY OF INVENTION

The present invention provides a principal of very general application where the inventors have revealed that consensus artificial PPR domains (cPPRs) can be designed to bind ssDNA in a specific, modular and/or programmable manner.

More particularly, the inventors present cPPRs to bind telomeric ssDNA and demonstrate that such complexes can inhibit the activity of human telomerase in vitro. Unlike natural human POT1 (hPOT1) that binds rigidly to its designated target, cPPRs of the present invention can be programmed to bind any telomere sequence of interest. Accordingly, the invention provides alternate methods for specific regulation of gene expression and for agents for use therein.

In one broad aspect, the present invention resides in an artificial polypeptide comprising at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which it is capable of binding, with the identity of the amino acid at each of positions five (5) and thirty-five (35) being selected according to the following DNA base rules:

a) when a binding motif binds adenine (A) in the target ssDNA base sequence, the amino acid at position five (5) of the motif is selected from the group comprising: threonine (T), serine(S), and glycine (G), and the amino acid at position thirty-five (35) is selected from the group comprising asparagine (N), threonine (T), and serine(S);
b) when a binding motif binds guanine (G) in the target ssDNA base sequence, the amino acid at position five (5) of the motif is selected from the group comprising: threonine (T), serine(S), glycine (G) and alanine (A), and the amino acid at position thirty-five (35) is selected from the group comprising aspartic acid (D), threonine (T), and serine(S);
c) when a binding motif binds cytosine (C) in the target ssDNA base sequence, the amino acid at position five (5) of the motif is selected from the group comprising: threonine (T) or asparagine (N), and the amino acid at position thirty-five (35) is selected from the group comprising asparagine (N), serine(S), aspartic acid (D), and threonine (T); and
d) when a binding motif binds thymine (T) in the target ssDNA base sequence, the amino acid at position five (5) of the motif is selected from the group comprising threonine (T), or asparagine (N), and the amino acid at position thirty-five (35) is selected from the group comprising aspartic acid (D), serine (S), asparagine (N), and threonine (T).

It will be understood that artificial polypeptides of the present invention encompass non-naturally occurring polypeptides including those polypeptides produced by recombinant means (i.e., recombinant polypeptides) and/or polypeptides produced by synthesis such as chemical synthesis (i.e., synthetic polypeptides).

It will also be understood that the artificial polypeptides of the present invention encompass polypeptides comprising at least one PPR ssDNA-binding domain which bind to the target ssDNA sequence, and wherein each of the amino acids in positions five (5) and thirty-five (35) of the 35-amino acid PPR sequence are designed or derived according to the target ssDNA base sequence to which the PPR ssDNA biding domain binds or will bind.

In one example, the artificial polypeptide comprises at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which itis capable of binding, with the identity of the amino acid at each of positions five (5) and thirty-five (35) being selected according to the following DNA base rules:

a) when a binding motif binds adenine (A) in the target ssDNA base sequence, the amino acid at position five (5) of the motif is threonine (T), and the amino acid at position thirty-five is asparagine (N),
b) when a binding motif binds guanine (G) in the target ssDNA base sequence, the amino acid at position five (5) of the motif is threonine (T) and the amino acid at position thirty-five is aspartic acid (D),
c) when a binding motif binds cytosine (C) in the target ssDNA base sequence, the amino acid at position five (5) of the motif is asparagine (N), and the amino acid at position thirty-five is, serine(S), and
d) When a binding motif binds thymine (T) in the target ssDNA base sequence, the amino acid at position five (5) of the motif is asparagine (N), and the amino acid at position thirty-five is aspartic acid (D).

In one example, the artificial polypeptide comprises at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which itis capable of binding, with the identity of the amino acid at each of positions five (5) and thirty-five (35) being selected according to the following DNA base rules:

(a) when a binding motif binds adenine (A) in the target ssDNA base sequence, the amino acid at position five (5) of the motif is threonine (T), and the amino acid at position thirty-five is asparagine (N),
(b) when a binding motif binds guanine (G) in the target ssDNA base sequence, the amino acid at position five (5) of the motif is threonine (T) and the amino acid at position thirty-five is aspartic acid (D),
(c) when a binding motif binds cytosine (C) in the target ssDNA base sequence, the amino acid at position five (5) of the motif is asparagine (N), and the amino acid at position thirty-five is, serine(S), and
(d) when a binding motif binds thymine (T) in the target ssDNA base sequence, the amino acid at position five (5) of the motif is asparagine (N), and the amino acid at position thirty-five is aspartic acid (D).

In one example, the artificial polypeptide comprises at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which itis capable of binding, with the identity of the amino acid at each of positions five (5) and thirty-five (35) being selected according to the following DNA base rules:

(a) when a binding motif binds adenine (A) in the target ssDNA base sequence, the ID NO: 1), (b) when a binding motif binds guanine (G) in the target ssDNA base sequence, the amino acid sequence is VVTYTTLISGLGKAGRLEEALELFEEMKEK-GIVPD, (SEQ ID NO: 2), (c) when a binding motif binds cytosine (C) in the target ssDNA base sequence, the amino acid sequence is VVTYNTLISGLGKAGRLEEALELFEEMKEK-GIVPS, (SEQ ID NO: 3), and (d) when a binding motif binds thymine (T) in the target ssDNA base sequence, the amino acid sequence is VVTYNTLISGLGKAGRLEEALELFEEMKEK-GIVPD, (SEQ ID NO: 4).

In yet a further example, the artificial polypeptide comprises at least one PPR ssDNA-binding domain that binds to target a telomeric ssDNA having the sequence 5'-ttagggttag-3' (SEQ ID NO: 40), and wherein said ssDNA-binding domain comprises ten PPR ssDNA base binding motifs as follows:

```
Motif 1
                                    (SEQ ID NO: 4)
VVTYNTLISGLGKAGRLEEALELFEEMKEKGIVPD,

Motif 2
                                    (SEQ ID NO: 4)
VVTYNTLISGLGKAGRLEEALELFEEMKEKGIVPD,

Motif 3
                                    (SEQ ID NO: 1)
VVTYTTLISGLGKAGRLEEALELFEEMKEKGIVPN,

Motif 4
                                    (SEQ ID NO: 2)
VVTYTTLISGLGKAGRLEEALELFEEMKEKGIVPD,

Motif 5
                                    (SEQ ID NO: 2)
VVTYTTLISGLGKAGRLEEALELFEEMKEKGIVPD,

Motif 6
                                    (SEQ ID NO: 2)
VVTYTTLISGLGKAGRLEEALELFEEMKEKGIVPD,

Motif 7
                                    (SEQ ID NO: 4)
VVTYNTLISGLGKAGRLEEALELFEEMKEKGIVPD,

Motif 8
                                    (SEQ ID NO: 4)
VVTYNTLISGLGKAGRLEEALELFEEMKEKGIVPD,

Motif 9
                                    (SEQ ID NO: 1)
VVTYTTLISGLGKAGRLEEALELFEEMKEKGIVPN,

Motif 10
                                    (SEQ ID NO: 2)
VVTYTTLISGLGKAGRLEEALELFEEMKEKGIVPD.
```

In one such example, the artificial polypeptide consists of all the ten motifs.

In one embodiment according to this broad aspect, the artificial polypeptide according to any example hereof, comprises:

(a) an N-terminal cap sequence, (b) the at least one PPR ssDNA-binding domain capable of binding to a target ssDNA sequence, and (c) a C-terminal solvating helix sequence located after the PPR ssDNA-binding domain and prevents helical unfolding and or assists in stabilising the structure.

In one example of this embodiment, the C-terminal solvating helix sequence is located after the PPR ssDNA-binding domain prevents unfolding of the helical structure of the at least one PPR ssDNA-binding domain and/or enhances stability of the helical structure of the at least one PPR ssDNA-binding domain. For example, the structure of said polypeptide and/or of the at least one PPR ssDNA-binding domain is stable. It will be understood that the artificial polypeptide according to this embodiment is stabilised and/or has enhanced stability relative to an artificial polypeptide of the present invention which does not comprise the an N-terminal cap sequence and/or the C-terminal solvating helix sequence.

In one example according to this embodiment, the N-terminal cap sequence is, has or comprises the amino acid sequence MGNS (SEQ ID NO: 5).

In one example according to this embodiment, the C-terminal solvating helix amino acid sequence is, has or comprises the amino acid sequence VVTYNTLISGLGKAG (SEQ ID NO: 6) or the amino acid sequence VVTYTTLIS-GLGKAG (SEQ ID NO: 7).

In one example according to this embodiment, the artificial polypeptide comprises at least one PPR ssDNA-binding domain that binds to target a telomeric ssDNA having the sequence 5'-ttagggttag-3' (SEQ ID NO: 40), wherein said ssDNA-binding domain comprises ten PPR ssDNA base binding motifs, and wherein the combination of the N-terminal cap sequence, the ten PPR ssDNA base binding motifs and the C-terminal solvating helix sequence in said artificial polypeptide is selected from the following two combinations of sequences:

```
                                    (SEQ ID NO: 5)
MGNS

Motif 1
                                    (SEQ ID NO: 4)
VVTYNTLISGLGKAGRLEEALELFEEMKEKGIVPD,

Motif 2
                                    (SEQ ID NO: 4)
VVTYNTLISGLGKAGRLEEALELFEEMKEKGIVPD,

Motif 3
                                    (SEQ ID NO: 1)
VVTYTTLISGLGKAGRLEEALELFEEMKEKGIVPN,

Motif 4
                                    (SEQ ID NO: 2)
VVTYTTLISGLGKAGRLEEALELFEEMKEKGIVPD,

Motif 5
                                    (SEQ ID NO: 2)
VVTYTTLISGLGKAGRLEEALELFEEMKEKGIVPD,

Motif 6
                                    (SEQ ID NO: 2)
VVTYTTLISGLGKAGRLEEALELFEEMKEKGIVPD,

Motif 7
                                    (SEQ ID NO: 4)
VVTYNTLISGLGKAGRLEEALELFEEMKEKGIVPD,

Motif 8
                                    (SEQ ID NO: 4)
VVTYNTLISGLGKAGRLEEALELFEEMKEKGIVPD,

Motif 9
                                    (SEQ ID NO: 1)
VVTYTTLISGLGKAGRLEEALELFEEMKEKGIVPN,

Motif 10
```

-continued (SEQ ID NO: 2)
VVTYTTLISGLGKAGRLEEALELFEEMKEKGIVPD, (SEQ ID NO: 6)
VVTYNTLISGLGKAG
or (SEQ ID NO: 5)
MGNS Motif 1
(SEQ ID NO: 4)
VVTYNTLISGLGKAGRLEEALELFEEMKEKGIVPD, Motif 2
(SEQ ID NO: 4)
VVTYNTLISGLGKAGRLEEALELFEEMKEKGIVPD, Motif 3
(SEQ ID NO: 1)
VVTYTTLISGLGKAGRLEEALELFEEMKEKGIVPN, Motif 4
(SEQ ID NO: 2)
VVTYTTLISGLGKAGRLEEALELFEEMKEKGIVPD, Motif 5
(SEQ ID NO: 2)
VVTYTTLISGLGKAGRLEEALELFEEMKEKGIVPD, Motif 6
(SEQ ID NO: 2)
VVTYTTLISGLGKAGRLEEALELFEEMKEKGIVPD, Motif 7
(SEQ ID NO: 4)
VVTYNTLISGLGKAGRLEEALELFEEMKEKGIVPD, Motif 8
(SEQ ID NO: 4)
VVTYNTLISGLGKAGRLEEALELFEEMKEKGIVPD, Motif 9
(SEQ ID NO: 1)
VVTYTTLISGLGKAGRLEEALELFEEMKEKGIVPN, Motif 10
(SEQ ID NO: 2)
VVTYTTLISGLGKAGRLEEALELFEEMKEKGIVPD, (SEQ ID NO: 7)
VVTYTTLISGLGKAG.

In one example, the artificial polypeptide according to any aspect of embodiment hereof further comprises a green fluorescent protein or a functional variant thereof. For example, the green fluorescent protein or functional variant thereof is fused or linked to the at least one PPR ssDNA-binding domain. In one preferred example the green fluorescent protein is enhanced green fluorescent protein (EGFP) or superfolder green fluorescent protein (sfGFP), preferably wherein the green fluorescent protein comprises the amino acid sequence set forth in SEQ ID NO: 29 or SEQ ID NO 30.

In one further example, the artificial polypeptide according to any aspect of embodiment hereof further comprises further comprises at least a fragment of the human POT1 (hPOT1) protein wherein said fragment comprises the least the C-terminal TPP binding domain of hPOT1 or a functional variant thereof. The fragment of the hPOT1 protein or functional variant thereof may be fused or linked to the at least one PPR ssDNA-binding domain. Preferably, the fragment of the hPOT1 protein comprises the amino acid sequence of POT1 (AOB) protein set forth in SEQ ID NO: 34.

As stated above, the artificial polypeptide according to any aspect of embodiment hereof may be produced recombinant or synthetically i.e., may be a recombinant or synthetic polypeptide.

In another broad aspect the invention resides in a recombinant polypeptide comprising at least one PPR ssDNA-binding domain capable of binding to a target ssDNA sequence, the PPR ssDNA-binding domain comprising at least two PPR ssDNA base binding motifs each comprising a 35-amino acid PPR sequence, wherein each of positions five (5) and thirty-five (35) of the sequence is derived according to the target ssDNA base sequence to which it will bind, with the identity of the amino acid at each of positions five (5) and thirty-five (35) being selected according to the following DNA base rules:

a) when a binding motif binds adenine (A) in the target ssDNA base sequence, the amino acid at position five (5) of the motif is selected from the group comprising: threonine (T), serine(S), and glycine (G), and the amino acid at position thirty-five (35) is selected from the group comprising asparagine (N), threonine (T), and serine(S);
b) when a binding motif binds guanine (G) in the target ssDNA base sequence, the amino acid at position five (5) of the motif is selected from the group comprising: threonine (T), serine(S), glycine (G) and alanine (A), and the amino acid at position thirty-five (35) is selected from the group comprising aspartic acid (D), threonine (T), and serine(S);
c) when a binding motif binds cytosine (C) in the target ssDNA base sequence, the amino acid at position five (5) of the motif is selected from the group comprising: threonine (T) or asparagine (N), and the amino acid at position thirty-five (35) is selected from the group comprising asparagine (N), serine(S), aspartic acid (D), and threonine (T); and
d) when a binding motif binds thymine (T) in the target ssDNA base sequence, the amino acid at position five (5) of the motif is selected from the group comprising threonine (T), or asparagine (N), and the amino acid at position thirty-five (35) is selected from the group comprising aspartic acid (D), serine (S), asparagine (N), and threonine (T).

In another broad aspect, the invention resides in a recombinant polypeptide comprising at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence is derived according to the target ssDNA base sequence to which it will bind, with the identity of the amino acid at each of positions five (5) and thirty-five (35) being selected according to the following DNA base rules:

(a) when a binding motif binds adenine (A) in the target ssDNA base sequence, the amino acid at position five (5) of the motif is threonine (T), and the amino acid at position thirty-five is asparagine (N),
(b) when a binding motif binds guanine (G) in the target ssDNA base sequence, the amino acid at position five (5) of the motif is threonine (T) and the amino acid at position thirty-five is aspartic acid (D),
(c) when a binding motif binds cytosine (C) in the target ssDNA base sequence, the amino acid at position five (5) of the motif is asparagine (N), and the amino acid at position thirty-five is, serine(S), and (d) when a binding motif binds thymine (T) in the target ssDNA base sequence, the amino acid at position five (5) of the motif is asparagine (N), and the amino acid at position thirty-five is aspartic acid (D).

In another broad aspect, the invention resides in a recombinant polypeptide comprising at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which it will bind, with the identity of the amino acid at each of positions five (5) and thirty-five (35) being selected according to the following DNA base rules:

a) when a binding motif binds adenine (A) in the target ssDNA base sequence, the amino acid sequence is VVTYTTLISGLGKAGRLEEALELFEEMKEK-GIVPN, (SEQ ID NO: 1),
b) when a binding motif binds guanine (G) in the target ssDNA base sequence, the amino acid sequence is VVTYTTLISGLGKAGRLEEALELFEEMKEK-GIVPD, (SEQ ID NO: 2),
c) when a binding motif binds cytosine (C) in the target ssDNA base sequence, the amino acid sequence is VVTYNTLISGLGKAGRLEEALELFEEMKEK-GIVPS, (SEQ ID NO: 3), and
(d) when a binding motif binds thymine (T) in the target ssDNA base sequence, the amino acid sequence is VVTYNTLISGLGKAGRLEEALELFEEMKEK-GIVPD, (SEQ ID NO: 4).

In another broad aspect, the invention resides in a recombinant comprising at least one PPR ssDNA-binding domain that binds to target a telomeric ssDNA sequence 5'-ttagggttag-3' (i.e. cPPR-Telo1; SEQ ID NO:40) is:

```
Motif 1
                                    (SEQ ID NO: 4)
VVTYNTLISGLGKAGRLEEALELFEEMKEKGIVPD,

Motif 2
                                    (SEQ ID NO: 4)
VVTYNTLISGLGKAGRLEEALELFEEMKEKGIVPD,

Motif 3
                                    (SEQ ID NO: 1)
VVTYTTLISGLGKAGRLEEALELFEEMKEKGIVPN,

Motif 4
                                    (SEQ ID NO: 2)
VVTYTTLISGLGKAGRLEEALELFEEMKEKGIVPD,

Motif 5
                                    (SEQ ID NO: 2)
VVTYTTLISGLGKAGRLEEALELFEEMKEKGIVPD,

Motif 6
                                    (SEQ ID NO: 2)
VVTYTTLISGLGKAGRLEEALELFEEMKEKGIVPD,

Motif 7
                                    (SEQ ID NO: 4)
VVTYNTLISGLGKAGRLEEALELFEEMKEKGIVPD,

Motif 8
                                    (SEQ ID NO: 4)
VVTYNTLISGLGKAGRLEEALELFEEMKEKGIVPD,

Motif 9
                                    (SEQ ID NO: 1)
VVTYTTLISGLGKAGRLEEALELFEEMKEKGIVPN,
```

-continued

```
Motif 10
                                    (SEQ ID NO: 2)
VVTYTTLISGLGKAGRLEEALELFEEMKEKGIVPD.
```

In a another broad aspect, the invention resides in a stabilised recombinant polypeptide comprises a (i) N-terminal cap sequence and/or a (ii)C-terminal solvating helix sequence added after the final consensus repeat to prevent helical unfolding and/or stabilise the structure.

Accordingly, in one embodiment of this aspect, there is provided a stabilised recombinant polypeptide comprising at least one PPR ssDNA-binding domain capable of binding to a target ssDNA sequence, the recombinant polypeptide comprising:

(a) a N-terminal cap sequence,
(b) at least one PPR ssDNA-binding domain capable of binding to a target ssDNA sequence, and
(c) C-terminal solvating helix sequence added after the PPR ssDNA-binding domain and prevents helical unfolding and or assists in stabilising the structure, and wherein the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which it will bind, with the identity of the amino acid at each of positions five (5) and thirty-five (35) being selected according to the following DNA base rules:
   I. when a binding motif binds adenine (A) in the target ssDNA base sequence, the amino acid at position five (5) of the motif is selected from the group comprising: threonine (T), serine(S), and glycine (G), and the amino acid at position thirty-five is selected from the group comprising: asparagine (N), threonine (T), and serine(S);
   II. when a binding motif binds guanine (G) in the target ssDNA base sequence, the amino acid at position five (5) of the motif is selected from the group comprising: threonine (T), serine(S), glycine (G) and alanine (A), and the amino acid at position thirty-five is selected from the group comprising: aspartic acid (D), threonine (T), and serine(S);
   III. when a binding motif binds cytosine (C) in the target ssDNA base sequence, the amino acid at position five (5) of the motif is selected from the group comprising: threonine (T) or asparagine (N), and the amino acid at position thirty-five is selected from the group comprising: asparagine (N), serine (S), aspartic acid (D), and threonine (T); and
   IV. when a binding motif binds thymine (T) in the target ssDNA base sequence, the amino acid at position five (5) of the motif is selected from the group comprising: threonine (T), or asparagine (N), and the amino acid at position thirty-five is selected from the group comprising: aspartic acid (D), serine(S), asparagine (N), and threonine (T).

Accordingly, in another embodiment of this aspect, there is provided a stabilised recombinant polypeptide comprising at least one PPR ssDNA-binding domain capable of binding to a target ssDNA sequence, the recombinant polypeptide comprising:

(a) a N-terminal cap sequence,
(b) at least one PPR ssDNA-binding domain capable of binding to a target ssDNA sequence, and (c)C-terminal solvating helix sequence added after the PPR ssDNA-binding domain and prevents helical unfolding and or assists in stabilising the structure, and wherein the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which it will bind, with the identity of the amino acid at each of positions five (5) and thirty-five (35) being selected according to the following DNA base rules:

(i) when a binding motif binds adenine (A) in the target ssDNA base sequence, the ID NO: 1), (ii) when a binding motif binds guanine (G) in the target ssDNA base sequence, the amino acid sequence is VVTYTTLISGLGKAGRLEEALELFEEMKEK-GIVPD, (SEQ ID NO: 2), (iii) when a binding motif binds cytosine (C) in the target ssDNA base sequence, the amino acid sequence is VVTYNTLISGLGKAGRLEEALELFEEMKEK-GIVPS, (SEQ ID NO: 3), and (iv) when a binding motif binds thymine (T) in the target ssDNA base sequence, the amino acid sequence is VVTYNTLISGLGKAGRLEEALELFEEMKEK-GIVPD, (SEQ ID NO: 4).

In an embodiment of this aspect, the invention provides a recombinant polypeptide comprising:

a) a N-terminal cap sequence;

b) at least one PPR ssDNA-binding domain capable of binding to a target ssDNA sequence;

c) and C-terminal solvating helix sequence added after the PPR ssDNA-binding domain and prevents helical unfolding and or assists in stabilising the structure; and wherein the PPR ssDNA-binding domain comprising at least two PPR ssDNA base binding motifs each comprising a 35-amino acid PPR sequence, wherein positions five (5) and thirty-five (35) of the sequence is derived according to the target ssDNA base sequence to which it will bind, with the identity of the amino acid at each of positions five (5) and thirty-five (35) being selected according to the following DNA base rules:

a) when a binding motif binds adenine (A) in the target ssDNA base sequence, the amino acid at position five (5) of the motif is selected from the group comprising: threonine (T), serine(S), and glycine (G), and the amino acid at position thirty-five is selected from the group comprising: asparagine (N), threonine (T), and serine(S);

b) when a binding motif binds guanine (G) in the target ssDNA base sequence, the amino acid at position five (5) of the motif is selected from the group comprising: threonine (T), serine(S), glycine (G) and alanine (A), and the amino acid at position thirty-five is selected from the group comprising: aspartic acid (D), threonine (T), and serine(S);

c) when a binding motif binds cytosine (C) in the target ssDNA base sequence, the amino acid at position five (5) of the motif is selected from the group comprising: threonine (T) or asparagine (N), and the amino acid at position thirty-five is selected from the group comprising: asparagine (N), serine(S), aspartic acid (D), and threonine (T); and d) when a binding motif binds thymine (T) in the target ssDNA base sequence, the amino acid at position five (5) of the motif is selected from the group comprising: threonine (T), or asparagine (N), and the amino acid at position thirty-five is selected from the group comprising: aspartic acid (D), serine(S), asparagine (N), and threonine (T).

In one example, the C-terminal solvating helix amino acid sequence is VVTYNTLISGLGKAG (SEQ ID NO: 6). Alternatively, or in addition, the C-terminal solvating helix amino acid sequence is VVTYTTLISGLGKAG (SEQ ID NO: 7).

In a further broad aspect the invention provides a recombinant polypeptide comprising at least one PPR ssDNA-binding domain that binds to target a telomeric ssDNA sequence 5'-ttagggttag-3' (i.e. cPPR-Telo1; SEQ ID NO: 40) selected from the sequences:

```
                                    (SEQ ID NO: 5)
MGNS

Motif 1
                                    (SEQ ID NO: 4)
VVTYNTLISGLGKAGRLEEALELFEEMKEKGIVPD,

Motif 2
                                    (SEQ ID NO: 4)
VVTYNTLISGLGKAGRLEEALELFEEMKEKGIVPD,

Motif 3
                                    (SEQ ID NO: 1)
VVTYTTLISGLGKAGRLEEALELFEEMKEKGIVPN,

Motif 4
                                    (SEQ ID NO: 2)
VVTYTTLISGLGKAGRLEEALELFEEMKEKGIVPD,

Motif 5
                                    (SEQ ID NO: 2)
VVTYTTLISGLGKAGRLEEALELFEEMKEKGIVPD,

Motif 6
                                    (SEQ ID NO: 2)
VVTYTTLISGLGKAGRLEEALELFEEMKEKGIVPD,

Motif 7
                                    (SEQ ID NO: 4)
VVTYNTLISGLGKAGRLEEALELFEEMKEKGIVPD,

Motif 8
                                    (SEQ ID NO: 4)
VVTYNTLISGLGKAGRLEEALELFEEMKEKGIVPD,

Motif 9
                                    (SEQ ID NO: 1)
VVTYTTLISGLGKAGRLEEALELFEEMKEKGIVPN,

Motif 10
                                    (SEQ ID NO: 2)
VVTYTTLISGLGKAGRLEEALELFEEMKEKGIVPD,

                                    (SEQ ID NO: 6)
VVTYNTLISGLGKAG
or

                                    (SEQ ID NO: 5)
MGNS

Motif 1
                                    (SEQ ID NO: 4)
VVTYNTLISGLGKAGRLEEALELFEEMKEKGIVPD,

Motif 2
                                    (SEQ ID NO: 4)
VVTYNTLISGLGKAGRLEEALELFEEMKEKGIVPD,

Motif 3
                                    (SEQ ID NO: 1)
VVTYTTLISGLGKAGRLEEALELFEEMKEKGIVPN,

Motif 4
```

-continued

```
                                    (SEQ ID NO: 2)
VVTYTTLISGLGKAGRLEEALELFEEMKEKGIVPD,

Motif 5
                                    (SEQ ID NO: 2)
VVTYTTLISGLGKAGRLEEALELFEEMKEKGIVPD,

Motif 6
                                    (SEQ ID NO: 2)
VVTYTTLISGLGKAGRLEEALELFEEMKEKGIVPD,

Motif 7
                                    (SEQ ID NO: 4)
VVTYNTLISGLGKAGRLEEALELFEEMKEKGIVPD,

Motif 8
                                    (SEQ ID NO: 4)
VVTYNTLISGLGKAGRLEEALELFEEMKEKGIVPD,

Motif 9
                                    (SEQ ID NO: 1)
VVTYTTLISGLGKAGRLEEALELFEEMKEKGIVPN,

Motif 10
                                    (SEQ ID NO: 2)
VVTYTTLISGLGKAGRLEEALELFEEMKEKGIVPD,

                                    (SEQ ID NO: 7)
VVTYTTLISGLGKAG.
```

In a further broad aspect, the invention provides a method for targeting telomeric ssDNA allowing blocking of its extension by human telomerase.

In an embodiment of this aspect, the invention provides a method comprising the step of: administering a therapeutically effective amount of I. An artificial polypeptide according to any example, embodiment or aspect of the invention as described herein, or
II. a stabilised artificial polypeptide according to example, embodiment or aspect of the invention as described herein throughout, to a patient in need of such treatment.

According to the invention, ssDNA cPPRs may comprise or be an artificial polypeptide according to any aspect, embodiment or example hereof and can be designed to bind telomeric ssDNA and to thereby block the activity of human telomerase, which provides a critical cancer target.

In a further embodiment of this aspect of the invention there is provided a method of treating cancer in a patient, said method comprising the step of: administering a therapeutically effective amount of:

I. artificial polypeptide according to any example, embodiment or aspect of the invention described as herein throughout, or
II. stabilised artificial polypeptide according to example, embodiment or aspect of the invention as described herein throughout, to a patient having cancer.

In another broad aspect, the invention relates to a method of stabilising an artificial polypeptide according to any aspect or embodiment or example hereof, said method comprising introducing to said artificial polypeptide or linking said artificial polypeptide with an N-terminal cap sequence and a C-terminal solvating helix sequence after the PPR ssDNA-binding domain.

In another broad aspect, the invention relates to a method of regulating gene expression in a cell or patient by targeting ssDNA in said cell or patient, said method comprising administering to the cell or patient an amount of an artificial polypeptide according to any aspect or embodiment or example hereof.

In another broad aspect, the invention relates to a method of targeting telomeric ssDNA to block its extension by a telomerase enzyme in mammalian cell or in patient, said method comprising administering to the cell or patient an amount of an artificial polypeptide according to any aspect or embodiment or example hereof.

In another broad aspect, the invention relates to a method for treating a patient with a cPPR sequence, said method comprising the step of: administering a therapeutically effective amount of an artificial polypeptide according to any aspect or embodiment or example hereof, to a patient in need of treatment from a cPPR sequence.

In another broad aspect, the invention relates to a method of inhibiting activity of telomerase in a patient in need thereof, said method comprising the step of: administering a therapeutically effective amount of an artificial polypeptide according to any aspect or embodiment or example hereof.

In another broad aspect, the invention relates to a method of treating cancer in a patient, said method comprising the step of: administering a therapeutically effective amount of artificial polypeptide according to any aspect or embodiment or example hereof to a patient having cancer.

In another broad aspect, the invention relates to a method of ameliorating the presence of neoplastic tissue in a patient, said method comprising the step of: administering a therapeutically effective amount of artificial polypeptide according to any aspect or embodiment or example hereof to a patient having cancer and/or having the neoplastic tissue.

In another broad aspect, the invention relates to use of an artificial polypeptide according to any aspect or embodiment or example hereof in the treatment of a patient in need of telomerase treatment.

In another broad aspect, the invention relates to use of an artificial polypeptide according to any aspect or embodiment or example hereof in the treatment of a patient suffering from cancer.

In another broad aspect, the invention relates to use of an artificial polypeptide according to any aspect or embodiment or example hereof in the manufacture of a medicament for treating or preventing a disease or condition in a patient wherein said disease or condition is influenced by gene expression in the patent and said medicament targeting ssDNA in the patient.

In another broad aspect, the invention relates to use of an artificial polypeptide according to any aspect or embodiment or example hereof in the manufacture of a medicament for the treatment of a patient in need of telomerase treatment.

In another broad aspect, the invention relates to use of an artificial polypeptide according to any aspect or embodiment or example hereof in the manufacture of a medicament for the treatment of a patient in need of blocking telomeric ssDNA extension by a telomerase enzyme.

In one preferred example according to any broad aspect described herein throughout or any embodiment or example thereof, the telomerase enzyme is a human a telomerase enzyme.

In another broad aspect, the invention relates to use of an artificial polypeptide according to any aspect or embodiment or example hereof in the manufacture of a medicament for the treatment of a patient suffering from cancer and/or a patient having a neoplastic tissue.

In another broad aspect, the invention provides a pharmaceutical composition comprising a therapeutically effective amount of an artificial or recombinant polypeptide according to any aspect or embodiment or example hereof and a pharmaceutically acceptance carrier, diluent and/or excipient.

In another broad aspect, the invention provides host cell comprising, transfected with, and/or expressing of an artificial or recombinant polypeptide according to any aspect or embodiment or example hereof. Preferably, the host cell is a mammalian cell, for example a HeLA cell or a Huh-7 cell.

In another aspect of the invention, a method is provided said method providing a means to target telomeric ssDNA and block extension by human telomerase.

In an embodiment of this aspect of the invention, the method comprises the step of: administering a therapeutically effective amount of I. a recombinant sequence of any aspect of the invention or any of the embodiments or examples thereof, or II. a stabilised recombinant sequence according to any aspect of the invention or any of the embodiments or examples thereof, to a patient in need of such treatment.

According to the invention, ssDNA cPPRs can be designed to bind telomeric ssDNA and to thereby block the activity of human telomerase, which provides a critical cancer target.

In a another embodiment of this aspect, the invention provides a method of treating cancer in a patient, said method comprising the step of: administering a therapeutically effective amount of:

I. a recombinant sequence according to any aspect of the invention or any of the embodiments or examples thereof, or II. a stabilised recombinant sequence according to any aspect of the invention or any of the embodiments or examples thereof, to a patient having cancer.

In another broad aspect, the invention provides a method for treating a patient with a cPPR sequence, said method comprising the step of: administering a therapeutically effective amount of a recombinant sequence according to any aspect, embodiment or example described herein to a patient in need of treatment from a cPPR sequence.

In another broad aspect, the invention provides a method of treating cancer in a patient, said method comprising the step of: administering a therapeutically effective amount of a recombinant sequence according to any aspect, embodiment or example described herein to a patient having cancer.

In another broad aspect, the invention provides a method of ameliorating the presence of neoplastic tissue in a patient, said method comprising the step of: administering a therapeutically effective amount of a recombinant sequence according to any aspect, embodiment or examples described herein to a patient having a cancer.

In another broad aspect, the invention relates to use of a cPPR sequence, said sequence being an artificial or recombinant polypeptide sequence according to any aspect, embodiment or example hereof for the treatment of a patient in need of telomerase treatment.

In another broad aspect, the invention relates to use of a cPPR sequence, said sequence being an artificial or recombinant polypeptide sequence according to any aspect, embodiment or example hereof for the treatment of a patient suffering from cancer.

In another broad aspect, the invention relates to use of a substance or composition comprising an artificial or recombinant polypeptide sequence according to any aspect, embodiment or example hereof, for the manufacture of a medicament for therapeutic use in the treatment of a patient in need of such treatment such as for use in treatment of a patient in need of a disease or therapeutic state influenced by gene expression.

In another broad aspect, the invention relates to use of a substance or composition comprising an artificial or recombinant polypeptide sequence according to any aspect, embodiment or example hereof, for the manufacture of a medicament for therapeutic use in the treatment of a patient in need of telomerase treatment.

In another broad aspect, the invention relates to use of a substance or composition comprising an artificial or recombinant polypeptide sequence according to any aspect, embodiment or example hereof, for the manufacture of a medicament for therapeutic use in the treatment of a patient in need of telomerase treatment.

In another broad aspect, the invention relates to use of a substance or composition comprising an artificial or recombinant polypeptide sequence according to any aspect, embodiment or example hereof, for the manufacture of a medicament for therapeutic use in the treatment of a patient suffering from cancer.

REFERENCE TO COLOUR FIGURES

This application contains at least one illustration executed in colour. Copies of this patent application publication with colour illustrations will be provided by the Office upon request and payment of the necessary fee.

BRIEF DESCRIPTION OF THE DRAWINGS

Further features of the present invention are more fully described in the following description of several non-limiting exemplary embodiments thereof. This description is included solely for the purposes of exemplifying the present invention. It should not be understood as a restriction on the broad summary, disclosure or description of the invention as set out above. The description will be made with reference to the following accompanying drawings.

FIG. 1 is a schematic and pictorial representation outlining criteria for designing (i.e., design rules) for cPPR proteins according to the present invention which can bind to ssDNA. (a) Schematic illustration of the design of cPPR proteins incorporating internal 35-amino acid repeats, where the amino acid residues at positions 5 and 35 are chosen based on the target ssDNA or RNA base, and wherein optional flanking N-terminal cap and/or C-terminal solvating helix can be incorporated to stabilise the cPPR helical structure. The identity of the amino acid residue at position 5 of the C-terminal solvating helix is based on the base 3' of the target sequence with Asn (N) in the case of a purine and Thr (T) in the case of a pyrimidine. (b) An example: the design and protein sequence of cPPR-Telo1, a protein designed to target the telomeric ssDNA sequence 5'-ttagggttag-3' (SEQ ID NO: 40). The binding repeat sequences shown in this Figure are VVTYTTLISGLGKAGRLEEALELFEEMKEKGIVPN (SEQ ID NO: 1), VVTYTTLISGLGKAGRLEEALELFEEMKEKGIVPD (SEQ ID NO: 2), VVTYNTLISGLGKAGRLEEALELFEEMKEKGIVPS (SEQ ID NO: 3), VVTYNTLISGLGKAGRLEEALELFEEMKEKGIVPD (SEQ ID NO: 4); the N-terminal cap sequence is MGNS (SED ID NO: 5); the C-terminal solvating helix amino acid sequences are VVTYNTLISGLGKAG (SEQ ID NO: 6) or VVTYTTLISGLGKAG (SEQ ID NO: 7).

DETAILED DESCRIPTION OF THE PREFERRED EMBODIMENTS

Figure 2:
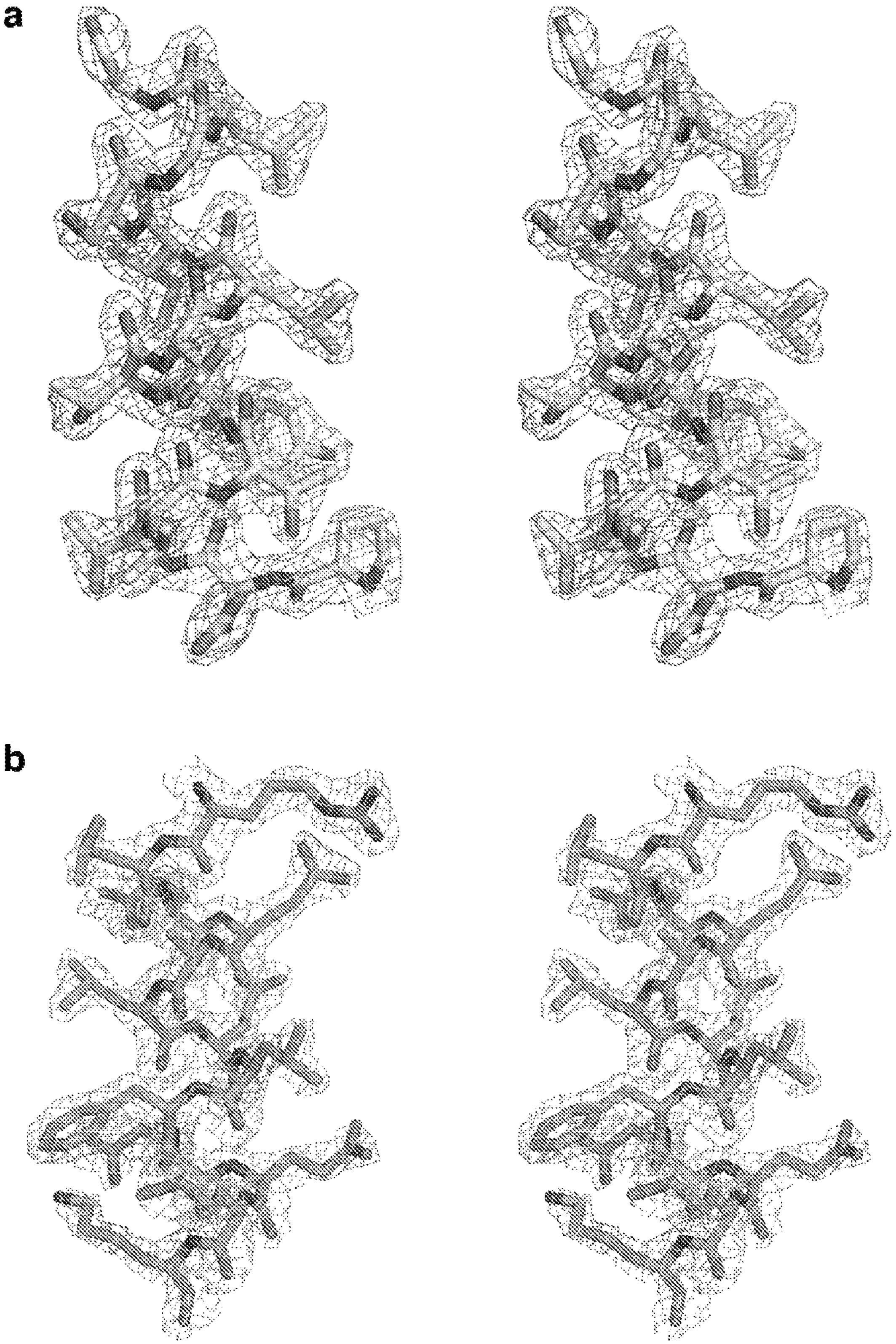
FIG. 2 shows stereo images of the electron density of cPPR-Telo1. (a) Is a stereo image showing the final weighted $2F_O$-$F_C$ electron density map of a representative section of cPPR-Telo1 contoured at 1.6 σ. Residues are shown as yellow sticks and map in blue mesh. (b) Is a stereo image showing the final weighted $2F_O$-$F_C$ electron density map of a representative section of cPPR-Telo1 in complex with DNA contoured at 1.6 σ. Residues are shown as green sticks and map in yellow mesh.

Briefly, the inventors of the present invention have identified the critical amino acid residues within pentatricopeptide repeat (PPR) motifs whose modification can alter sequence-specific binding of ssDNA, and particular combinations of residues that will recognise each ssDNA base. The inventors have identified particular combinations of amino acid residues within PPR motifs that recognise each of the 4 ssDNA bases and the determination of the relative polarity of the ssDNA and PPR tract in the PPR-ssDNA complex. The invention may be used to design a PPR protein to recognise and bind a desired ssDNA target sequence.

For convenience, section 1 (definitions) below, outlines the various meanings of the terms used herein. Following this, section 2 (specific preferred embodiments) presents a general description of the preferred examples, embodiments and aspects of the invention and provides a general exemplary discussion of the invention as it relates to recombinant polypeptides and/or or proteins, nucleic acids, compositions of matter, kits, methods of use, use of medicaments, and methods of manufacturing medicaments are discusses. This section of the description is supported by the specific examples that follow demonstrating the properties of various examples, embodiments and/or aspects of the invention and how they can be employed.

Each example, embodiments and aspect described herein throughout is to be applied mutatis mutandis to each and every other example, embodiment and/or aspect unless specifically stated otherwise.

1. Definitions

The meaning of certain terms and phrases used in the specification, examples, and appended claims, are provided below. If there is an apparent discrepancy between the usage of a term in the art and its definition provided herein, the definition provided within the specification shall prevail.

Those skilled in the art will appreciate that the invention described herein is susceptible to variations and modifications other than those specifically described. The invention includes all such variations and modifications. The invention also includes all of the steps, features, formulations and compounds referred to or indicated in the specification, individually or collectively and any and all combinations or any two or more of the steps or features.

Each document, reference, patent application or patent cited in this text is expressly incorporated herein in their entirety by reference, which means that it should be read and considered by the reader as part of this text. That the document, reference, patent application or patent cited in this text is not repeated in this text is merely for reasons of conciseness. None of the cited material or the information contained in that material should, however, be understood to be common general knowledge.

Manufacturer's instructions, descriptions, product specifications, and product sheets for any products mentioned herein or in any document incorporated by reference herein, are hereby incorporated herein by reference, and may be employed in the practice of the invention.

The present invention is not to be limited in scope by any of the specific embodiments described herein. These embodiments are intended for the purpose of exemplification only. Functionally equivalent products, formulations and methods are clearly within the scope of the invention as described herein.

Other than in the operating examples, or where otherwise indicated, all numbers expressing quantities of ingredients or reaction conditions used herein should be understood as modified in all instances by the term "about." The term "about" when used in connection with percentages can mean ±1%.

The invention described herein may include one or more range of values (e.g. size, concentration etc.). A range of values will be understood to include all values within the range, including the values defining the range, and values adjacent to the range which lead to the same or substantially the same outcome as the values immediately adjacent to that value which defines the boundary to the range. For example, a person skilled in the field will understand that a 10% variation in upper or lower limits of a range can be totally appropriate and is encompassed by the invention. More particularly, the variation in upper or lower limits of a range will be 5% or as is commonly recognised in the art, whichever is greater.

In this application, the use of the singular includes the plural unless specifically stated otherwise. In this application, the use of "or" means "and/or" unless stated otherwise. Furthermore, the use of the term "including", as well as other forms, such as "includes" and "included", is not limiting.

Also, terms such as "element" or "component" encompass both elements and components comprising one unit and elements and components that comprise more than one subunit unless specifically stated otherwise. Also, the use of the term "portion" can include part of a moiety or the entire moiety.

Throughout this specification, unless the context requires otherwise, the word "comprise" or variations such as "comprises" or "comprising", will be understood to imply the inclusion of a stated integer or group of integers but not the exclusion of any other integer or group of integers.

As used herein the term "pentatricopeptide-repeat (PPR)-containing protein" would be understood to include any pentatricopeptide-repeat-containing proteins, comprising two or more pentatricopeptide repeat motifs. Preferably each pentatricopeptide repeat motif comprise about 35 amino acids and more preferably 35 amino acids. For example, the two or more pentatricopeptide repeat motifs may be degenerate repeat motifs. In one preferred example, the pentatricopeptide repeat motifs may be present in tandem in the PPR-containing protein, such as tandem degenerate pentatricopeptide motifs. In one example the PPR-containing protein may comprise between two to 30 pentatricopeptide repeats, preferably between 2 to 25 pentatricopeptide repeats or between 2 to 20 pentatricopeptide repeats or between 2 to 15 pentatricopeptide repeats or between 2 to 10 pentatricopeptide repeats or between 2 to 5 pentatricopeptide repeats. In one example the PPR-containing protein of the present invention may comprise about two or about 3 or about 4 or about 5 or about 6 or about 7 or about 8 or about 9 or about 10 or about 11 or about 12 or about 13 or about 14 or about 15 or about 16 or about 17 or about 18 or about 19 or about 20 or about 21 or about 22 or about 23 or about 25 or about 26 or about 27 or about 28 or about 29 or about 30 or more than about 30 pentatricopeptide repeats. It would be understood that PPR-containing proteins as described herein may comprise naturally occurring protein, or alternatively may be isolated from their natural environment, or may be recombinant and/or synthetically produced.

It will however be understood that the artificial polypeptides and proteins of the present invention would be produced artificially for example, recombinantly and/or synthetically. Accordingly, in one particularly preferred example, the PP)-containing protein according to the present invention is a recombinant polypeptide comprising at least one PPR ssDNA-binding domain capable of binding and/or which binds to a target ssDNA sequence, the PPR ssDNA-binding domain comprising at least two PPR ssDNA base binding motifs each comprising a 35-amino acid PPR sequence, wherein positions five (5) and thirty-five (35) of the sequence is derived according to the target ssDNA base sequence to which it will bind, with the identity of the amino acid at each of positions five (5) and thirty-five (35) is selected according DNA base rules described and/or exemplified herein.

As used herein the term "pentatricopeptide-repeat (PPR)" would be understood to refer to any pentatricopeptide amino acid sequence motif comprising about 35 amino acids which is found in and/or derived from (either directly or indirectly) a pentatricopeptide repeat of a PPR-containing protein such as a naturally occurring PPR-containing protein.

As used herein the term "PPR ssDNA base binding motif"-refers to an amino acid sequence motif comprising a 35 amino acids PPR sequence capable of binding ssDNA target molecule and/or which binds to a ssDNA target molecule e.g., telomeric ssDNA sequence, and preferably in a sequence specific manner (e.g., with high specificity) and/or with high affinity. It will be understood that the amino acid residue at positions 5 and 35 of each PRP sequence within the PPR ssDNA base binding motif would be designed according to the target ssDNA base sequence to which the PRP protein will or is designed to bind, such that the identity of the amino acid residues at positions five (5) and thirty-five (35) are selected positions according to the DNA base rules described and/or exemplified herein.

As used herein the term "PPR ssDNA-binding domain" will be understood to refer to the amino acid sequence component of the artificial polypeptides of the present invention which comprises at least two PPR ssDNA binding motifs. It will be understood that each of the PPR ssDNA base binding motifs is capable of binding, and/or binds, to ssDNA target molecule e.g., telomeric ssDNA sequence. Preferably, the PPR ssDNA-binding domain is capable of forming, and/or forms, a tertiary structure that binds to the ssDNA target molecule e.g., with high specificity and/or affinity. In one example, the PPR ssDNA-binding domain may exist independently of the rest of the artificial polypeptide chain. For example wherein each PPR ssDNA-binding domain in the artificial polypeptide according to the present invention forms a tertiary structure that is capable of binding and/or binds to the ssDNA target molecule independently of any other PPR ssDNA-binding domain that may be present in the artificial polypeptide.

In one example the PPR ssDNA-binding domain according to the present invention may comprise between two to 30 PRP ssDNA base biding motifs. In one example, each PPR ssDNA-binding domain may comprise between 2 to 25 or between 2 to 20 or between 2 to 15 or between 2 to 10 or between 2 to 5 PRP ssDNA base biding motifs. In another example, each PPR ssDNA-binding domain according to the present invention may comprise about 2 or about 3 or about 4 or about 5 or about 6 or about 7 or about 8 or about 9 or about 10 or about 11 or about 12 or about 13 or about 14 or about 15 or about 16 or about 17 or about 18 or about 19 or about 20 or about 21 or about 22 or about 23 or about 24 or about 25 or about 26 or about 27 or about 28 or about 29 or about 30 or more than 30 PRP ssDNA base binding motifs.

Furthermore, in one example, the artificial polypeptides according to the preset invention may comprise between 1 to about 30 PPR ssDNA-binding domains, preferably between 1 to about 20 or between 1 to about 10 or between 1 to about 5 PPR ssDNA-binding domains. For example, the artificial polypeptides according to the preset invention comprise 1 or about 2 or about 3 or about 4 or about 5 or about 6 or about 7 or about 8 or about 9 or about 10 or about 11 or about 12 or about 13 or about 14 or about 15 or about 16 or about 17 or about or about 18 or about 19 or about 20 or more than 20 ssDNA-binding domains.

As used herein, the term "administer" refers to the placement of a composition into a subject by a method or route which results in at least partial localisation of the composition at a desired site such that desired effect is produced. A compound or composition described herein can be administered by any appropriate route known in the art including, but not limited to, oral or parenteral routes, including intravenous, intramuscular, subcutaneous, transdermal, airway (aerosol), pulmonary, nasal, rectal, and topical (including buccal and sublingual) administration. In certain embodiments, the compound is administered by parenterally administration, or other method allowing delivery to a target site.

In the context of this specification the phrase "effective amount" "therapeutically effective amount" or "effective dose" (used interchangeably herein) includes within its meaning a sufficient but non-toxic amount of a compound or composition of the invention to provide the desired effect. The exact amount required will vary from subject to subject depending on factors such as the desired effect, the species being treated, the age and general condition of the subject, the severity of the condition being treated, the agent being administered, the mode of administration, and so forth. Thus, it is not possible to specify an exact "effective amount". However, for any given case, an appropriate effective amount (dose) may be determined by one of ordinary skill in the art using only routine experimentation. Generally, a therapeutically effective amount can vary with the subject's history, age, condition, sex, as well as the severity and type of the medical condition in the subject, and administration of other pharmaceutically active agents.

It is to be noted that reference herein to use in therapeutic applications will be understood to be equally applicable to human and non-human, such as veterinary, applications. Hence it will be understood that, except where otherwise indicated, reference to a "patient", "subject" or "individual" (used interchangeably herein) means a human or non-human, such as an individual of any species of social, economic or research importance including but not limited to, mammalian, avian, lagomorph, ovine, bovine, equine, porcine, feline, canine, primate and rodent species. More preferably the animal is a mammalian species. The mammalian species is desirably a human or non-human primate or a companion animal such as a domesticated dog, cat, horse, monkey, mouse, rat, rabbit, sheep, goat, cow or pig.

Other definitions for selected terms used herein may be found within the detailed description of the invention and apply throughout. Unless otherwise defined, all other scientific and technical terms used herein have the same meaning as commonly understood to one of ordinary skill in the art to which the invention belongs.

Features of the invention will now be discussed with reference to the following non-limiting description and examples.

2. Specific Preferred Embodiments

Although PPRs have been regarded as RNA-binding motifs, there is little information on their nucleic acid specificity. The plant PPR protein OTP87 was reported to bind ssRNA but not ssDNA, dsDNA or dsRNA (Hammani, K. et al. The pentatricopeptide repeat protein OTP87 is essential for RNA editing of nad7 and atp1 transcripts in *Arabidopsis* mitochondria. *J Biol Chem* 286, 21361-71 (2011)) and the plant THA8 protein was reported to bind ssRNA with greater than 100 fold higher affinity than ssDNA (Ke, J. et al. Structural basis for RNA recognition by a dimeric PPR-protein complex. *Nat Struct Mol Biol* 20, 1377-82 (2013)). However, detailed comparisons have been hampered because of PPR proteins' instability and insolubility.

Earlier work by the inventors has demonstrated that artificial and/or synthetic consensus PPR (cPPR) proteins can be designed to have robust RNA-binding properties have been developed (Coquille, S. et al. An artificial PPR scaffold for programmable RNA recognition. *Nat Commun* 5, 5729 (2014)). In the work leading to the present invention, the inventors sought to investigate the ability of cPPR proteins to bind to nucleic acids and to develop, for the first time, artificial and/or synthetic cPPR proteins which bind to nucleic acids such as ssDNA, as well as evaluate the utility of such cPPRs proteins for application, such as therapeutic application in mammalian cells.

As demonstrated in working example 2 that follows, in the work leading to the present invention, the inventors produced four different artificial (e.g., recombinant and/or synthetic) cPPR proteins which were designed to bind homopolymers of adenine, cytosine, guanine or uracil, and then tested their binding to ssDNA using ssDNA homopolymers. As shown herein, the results demonstrated that the binding of ssDNA homopolymers conformed to the specific code for base recognition established previously for RNA. Therefore, the inventors have demonstrated that the code for base recognition by PPRs previously used for RNA binding was also maintained when binding ssDNA targets, thereby paving the way for the use of cPPRs to target ssDNAs in a programmable manner.

As demonstrated in working example 3, artificial (e.g., recombinant and/or synthetic) polypeptides comprising at least one PPR ssDNA biding domain (i.e., comprising at least one cPPR) which is capable of binding to ssDNA could be designed to target biologically relevant ssDNA targets such as repeating telomeric ssDNA sequences of mammalian cells. For example, as shown in the working examples that follow, the inventors performed direct telomerase extension assays using human telomerase over-expressed and assembled in HEK-293T cells and examined whether the specific binding of the telomeric ssDNA for example by recombinant cPPR-Telo1 and cPPR-Telo2 proteins could modulate telomerase activity. As shown, both cPPRs effectively blocked telomerase activity (e.g., in a dose-dependent manner), while control cPPR proteins had no effect. Furthermore, inhibition of telomerase extension was maintained even when non-specific competitor ssDNA was present in orders of magnitude excess. The inventors reasoned that the potent inhibition of telomerase observed likely resulted from the cPPR's ability to block access of telomerase to ssDNA, since it was found that cPPR-Telo2 could protect its ssDNA target from DNase I digestion.

As further demonstrated in the working examples that follow, the present inventors also resolved the structure of a telomeric ssDNA-bound cPPR protein produced according to the present invention, and elucidated the conformational changes within the artifical (e.g., synthetic or recombinant) polypeptides comprising at least one PPR ssDNA biding domain capable of binding to ssDNA when such artifical (e.g., recombinant or synthetic) proteins bind to target biologically relevant ssDNA targets such as repeating telomeric ssDNA sequences of mammalian cells (see e.g., working example 4). In addition, using comprehensive Bind-n-Seq analysis of randomised ssDNA target sequences the inventors elucidated the specificity of base recognition in all positions of the cPPR domains of the present invitation and demonstrated specificity of cPPRs of the present invention for ssDNA. The inventors' results obtained in the work leading to the present invention were also able to confirm the relative contribution of the various nucleotide positions in the target ssDNA nucleic acids to the binding affinities of the artifical (e.g., recombinant or synthetic) PPR proteins/polypeptides designed according to the present invention (see e.g., working example 5).

As also demonstrated in the examples that follow, cPPRs were difficult to express in mammalian cells, as demonstrated by the inventors' first attempts at establishing a cPPR-based system for manipulating ssDNA and/or RNA in mammalian cells which were unsuccessful and resulted in lack of cPPR expression in the mammalian cells such as HeLa cells. The lack of expression in mammalian cells of cPPRs was not previously expected since cPPRs were anticipated to be adequately stable on their own in mammalian cells. The inventors speculated that the observed lack of cPPRs expression in mammalian cells might be due to their protein instability or misfolding in mammalian cells. Following vigorous testing of various expression modes, the inventors demonstrated that the fusion of cPPRs to green fluorescent protein, such as to enhanced green fluorescent protein (EGFP) or to superfolder green fluorescent protein (sfGFP), enables robust expression of cPPRs in mammalian cells, thereby facilitating a cPPR based system which allows to manipulate ssDNA and/or RNA in mammalian cells.

Furthermore, in addition to showing that cPPRs can profoundly inhibit telomerase activity in vitro by blocking its association with its ssDNA template, in the work leading to the present invention the inventors were also able to demonstrate that it is possible to use cPPRs proteins which bind to ssDNA in mammalian cells e.g., with a potential to inhibit telomerase activity within mammalian cells. Specifically, the inventors demonstrated that fusion of cPPRs proteins according to the present invention to a fragment of the human POT1 protein comprising at least the C-terminal TPP binding domain of hPOT1 enables targeting cPPRs to telomeres in mammalian cells, pave the way for the use of cPPR-based telomerase inhibitors for use in regulation of gene expression in mammalian cells and in therapy such as cancer therapies.

Accordingly, in one broad aspect, the present invention resides in an artificial polypeptide comprising at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which it is capable of binding, with the identity of the amino acid at each of positions five (5) and thirty-five (35) being selected according to the following DNA base rules:

e) when a binding motif binds adenine (A) in the target ssDNA base sequence, the amino acid at position five (5) of the motif is selected from the group comprising: threonine (T), serine(S), and glycine (G), and the amino acid at position thirty-five (35) is selected from the group comprising asparagine (N), threonine (T), and serine(S);

f) when a binding motif binds guanine (G) in the target ssDNA base sequence, the amino acid at position five (5) of the motif is selected from the group comprising: threonine (T), serine(S), glycine (G) and alanine (A), and the amino acid at position thirty-five (35) is selected from the group comprising aspartic acid (D), threonine (T), and serine(S);

g) when a binding motif binds cytosine (C) in the target ssDNA base sequence, the amino acid at position five (5) of the motif is selected from the group comprising: threonine (T) or asparagine (N), and the amino acid at position thirty-five (35) is selected from the group comprising asparagine (N), serine(S), aspartic acid (D), and threonine (T); and h) when a binding motif binds thymine (T) in the target ssDNA base sequence, the amino acid at position five (5) of the motif is selected from the group comprising threonine (T), or asparagine (N), and the amino acid at position thirty-five (35) is selected from the group comprising aspartic acid (D), serine (S), asparagine (N), and threonine (T).

It will be understood that artificial polypeptides of the present invention encompass non-naturally occurring polypeptides including those polypeptides produced by recombinant means (i.e., recombinant polypeptides) and/or polypeptides produced by synthesis such as chemical synthesis (i.e., synthetic polypeptides).

It will also be understood that the artificial polypeptides of the present invention encompass polypeptides comprising at least one PPR ssDNA-binding domain which bind to the target ssDNA sequence, and wherein each of the amino acids in positions five (5) and thirty-five (35) of the 35-amino acid PPR sequence are designed or derived according to the target ssDNA base sequence to which the PPR ssDNA biding domain binds or will bind.

In one example, the artificial polypeptide comprises at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which itis capable of binding, with the identity of the amino acid at each of positions five (5) and thirty-five (35) being selected according to the following DNA base rules:

e) when a binding motif binds adenine (A) in the target ssDNA base sequence, the amino acid at position five (5) of the motif is threonine (T), and the amino acid at position thirty-five is asparagine (N), f) when a binding motif binds guanine (G) in the target ssDNA base sequence, the amino acid at position five (5) of the motif is threonine (T) and the amino acid at position thirty-five is aspartic acid (D), g) when a binding motif binds cytosine (C) in the target ssDNA base sequence, the amino acid at position five (5) of the motif is asparagine (N), and the amino acid at position thirty-five is, serine(S), and h) when a binding motif binds thymine (T) in the target ssDNA base sequence, the amino acid at position five (5) of the motif is asparagine (N), and the amino acid at position thirty-five is aspartic acid (D).

In one example, the artificial polypeptide comprises at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which itis capable of binding, with the identity of the amino acid at each of positions five (5) and thirty-five (35) being selected according to the following DNA base rules:

(a) when a binding motif binds adenine (A) in the target ssDNA base sequence, the amino acid at position five (5) of the motif is threonine (T), and the amino acid at position thirty-five is asparagine (N), (b) when a binding motif binds guanine (G) in the target ssDNA base sequence, the amino acid at position five (5) of the motif is threonine (T) and the amino acid at position thirty-five is aspartic acid (D), (c) when a binding motif binds cytosine (C) in the target ssDNA base sequence, the amino acid at position five (5) of the motif is asparagine (N), and the amino acid at position thirty-five is, serine(S), and (d) when a binding motif binds thymine (T) in the target ssDNA base sequence, the amino acid at position five (5) of the motif is asparagine (N), and the amino acid at position thirty-five is aspartic acid (D).

In one example, the artificial polypeptide comprises at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence are derived according to the target ssDNA base sequence to which itis capable of binding, with the identity of the amino acid at each of positions five (5) and thirty-five (35) being selected according to the following DNA base rules:

(a) when a binding motif binds adenine (A) in the target ssDNA base sequence, the amino acid sequence is VVTYTTLISGLGKAGRLEEALELFEEMKEK-GIVPN, (SEQ ID NO: 1), (b) when a binding motif binds guanine (G) in the target ssDNA base sequence, the amino acid sequence is VVTYTTLISGLGKAGRLEEALELFEEMKEK-GIVPD, (SEQ ID NO: 2), (c) when a binding motif binds cytosine (C) in the target ssDNA base sequence, the amino acid sequence is VVTYNTLISGLGKAGRLEEALELFEEMKEK-GIVPS, (SEQ ID NO: 3), and (d) when a binding motif binds thymine (T) in the target ssDNA base sequence, the amino acid sequence is VVTYNTLISGLGKAGRLEEALELFEEMKEK-GIVPD, (SEQ ID NO: 4).

In yet a further example, the artificial polypeptide comprises at least one PPR ssDNA-binding domain that binds to target a telomeric ssDNA having the sequence 5'-ttagggttag-3' (SEQ ID NO: 40), and wherein said ssDNA-binding domain comprises ten PPR ssDNA base binding motifs as follows:

```
Motif 1
                                    (SEQ ID NO: 4)
VVTYNTLISGLGKAGRLEEALELFEEMKEKGIVPD,

Motif 2
                                    (SEQ ID NO: 4)
VVTYNTLISGLGKAGRLEEALELFEEMKEKGIVPD,

Motif 3
                                    (SEQ ID NO: 1)
VVTYTTLISGLGKAGRLEEALELFEEMKEKGIVPN,

Motif 4
                                    (SEQ ID NO: 2)
VVTYTTLISGLGKAGRLEEALELFEEMKEKGIVPD,

Motif 5
                                    (SEQ ID NO: 2)
VVTYTTLISGLGKAGRLEEALELFEEMKEKGIVPD,

Motif 6
                                    (SEQ ID NO: 2)
VVTYTTLISGLGKAGRLEEALELFEEMKEKGIVPD,

Motif 7
                                    (SEQ ID NO: 4)
VVTYNTLISGLGKAGRLEEALELFEEMKEKGIVPD,

Motif 8
                                    (SEQ ID NO: 4)
VVTYNTLISGLGKAGRLEEALELFEEMKEKGIVPD,

Motif 9
                                    (SEQ ID NO: 1)
VVTYTTLISGLGKAGRLEEALELFEEMKEKGIVPN,

Motif 10
                                    (SEQ ID NO: 2)
VVTYTTLISGLGKAGRLEEALELFEEMKEKGIVPD.
```

In one such example, the artificial polypeptide consists of all the ten motifs.

In one embodiment according to this broad aspect, the artificial polypeptide according to any example hereof, comprises:

(a) an N-terminal cap sequence, (b) the at least one PPR ssDNA-binding domain capable of binding to a target ssDNA sequence, and (c) a C-terminal solvating helix sequence located after the PPR ssDNA-binding domain and prevents helical unfolding and or assists in stabilising the structure.

In one example of this embodiment, the C-terminal solvating helix sequence is located after the PPR ssDNA-binding domain prevents unfolding of the helical structure of the at least one PPR ssDNA-binding domain and/or enhances stability of the helical structure of the at least one PPR ssDNA-binding domain. For example, the structure of said polypeptide and/or of the at least one PPR ssDNA-binding domain is stable. It will be understood that the artificial polypeptide according to this embodiment is stabilised and/or has enhanced stability relative to an artificial polypeptide of the present invention which does not comprise the an N-terminal cap sequence and/or the C-terminal solvating helix sequence.

In one example according to this embodiment, the N-terminal cap sequence is, has or comprises the amino acid sequence MGNS (SEQ ID NO: 5).

In one example according to this embodiment, the C-terminal solvating helix amino acid sequence is, has or comprises the amino acid sequence VVTYNTLISGLGKAG (SEQ ID NO: 6) or the amino acid sequence VVTYTTLISGLGKAG (SEQ ID NO: 7).

In one example according to this embodiment, the artificial polypeptide comprises at least one PPR ssDNA-binding domain that binds to target a telomeric ssDNA having the sequence 5'-ttagggttag-3' (SEQ ID NO: 40), wherein said ssDNA-binding domain comprises ten PPR ssDNA base binding motifs, and wherein the combination of the N-terminal cap sequence, the ten PPR ssDNA base binding motifs and the C-terminal solvating helix sequence in said artificial polypeptide is selected from the following two combinations of sequences:

```
                                        (SEQ ID NO: 5)
MGNS

Motif 1
                                        (SEQ ID NO: 4)
VVTYNTLISGLGKAGRLEEALELFEEMKEKGIVPD,

Motif 2
                                        (SEQ ID NO: 4)
VVTYNTLISGLGKAGRLEEALELFEEMKEKGIVPD,

Motif 3
                                        (SEQ ID NO: 1)
VVTYTTLISGLGKAGRLEEALELFEEMKEKGIVPN,

Motif 4
                                        (SEQ ID NO: 2)
VVTYTTLISGLGKAGRLEEALELFEEMKEKGIVPD,

Motif 5
                                        (SEQ ID NO: 2)
VVTYTTLISGLGKAGRLEEALELFEEMKEKGIVPD,

Motif 6
                                        (SEQ ID NO: 2)
VVTYTTLISGLGKAGRLEEALELFEEMKEKGIVPD,

Motif 7
                                        (SEQ ID NO: 4)
VVTYNTLISGLGKAGRLEEALELFEEMKEKGIVPD,

Motif 8
                                        (SEQ ID NO: 4)
VVTYNTLISGLGKAGRLEEALELFEEMKEKGIVPD,

Motif 9
                                        (SEQ ID NO: 1)
VVTYTTLISGLGKAGRLEEALELFEEMKEKGIVPN,

Motif 10
                                        (SEQ ID NO: 2)
VVTYTTLISGLGKAGRLEEALELFEEMKEKGIVPD,

                                        (SEQ ID NO: 6)
VVTYNTLISGLGKAG
or

                                        (SEQ ID NO: 5)
MGNS

Motif 1
```

-continued

```
                                        (SEQ ID NO: 4)
VVTYNTLISGLGKAGRLEEALELFEEMKEKGIVPD,

Motif 2
                                        (SEQ ID NO: 4)
VVTYNTLISGLGKAGRLEEALELFEEMKEKGIVPD,

Motif 3
                                        (SEQ ID NO: 1)
VVTYTTLISGLGKAGRLEEALELFEEMKEKGIVPN,

Motif 4
                                        (SEQ ID NO: 2)
VVTYTTLISGLGKAGRLEEALELFEEMKEKGIVPD,

Motif 5
                                        (SEQ ID NO: 2)
VVTYTTLISGLGKAGRLEEALELFEEMKEKGIVPD,

Motif 6
                                        (SEQ ID NO: 2)
VVTYTTLISGLGKAGRLEEALELFEEMKEKGIVPD,

Motif 7
                                        (SEQ ID NO: 4)
VVTYNTLISGLGKAGRLEEALELFEEMKEKGIVPD,

Motif 8
                                        (SEQ ID NO: 4)
VVTYNTLISGLGKAGRLEEALELFEEMKEKGIVPD,

Motif 9
                                        (SEQ ID NO: 1)
VVTYTTLISGLGKAGRLEEALELFEEMKEKGIVPN,

Motif 10
                                        (SEQ ID NO: 2)
VVTYTTLISGLGKAGRLEEALELFEEMKEKGIVPD,

                                        (SEQ ID NO: 7)
VVTYTTLISGLGKAG.
```

In one example, the artificial polypeptide according to any aspect of embodiment hereof further comprises a green fluorescent protein or a functional variant thereof. For example, the green fluorescent protein or functional variant thereof is fused or linked to the at least one PPR ssDNA-binding domain. In one preferred example the green fluorescent protein is enhanced green fluorescent protein (EGFP) or superfolder green fluorescent protein (sfGFP), preferably wherein the green fluorescent protein comprises the amino acid sequence set forth in SEQ ID NO: 29 or SEQ ID NO 30.

In one further example, the artificial polypeptide according to any aspect of embodiment hereof further comprises further comprises at least a fragment of the human POT1 (hPOT1) protein wherein said fragment comprises the least the C-terminal TPP binding domain of hPOT1 or a functional variant thereof. The fragment of the hPOT1 protein or functional variant thereof may be fused or linked to the at least one PPR ssDNA-binding domain. Preferably, the fragment of the hPOT1 protein comprises the amino acid sequence of POT1 (AOB) protein set forth in SEQ ID NO: 34.

As stated above, the artificial polypeptide according to any aspect of embodiment hereof may be produced recombinantly or synthetically i.e., may be a recombinant or synthetic polypeptide.

Accordingly, in another broad aspect, the invention resides in a recombinant polypeptide comprising at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence is derived according to the target ssDNA base sequence to which it will bind, with the identity of the amino acid at each of positions five (5) and thirty-five (35) being selected according to the following DNA base rules:

a) when a binding motif binds adenine (A) in the target ssDNA base sequence, the amino acid at position five (5) of the motif is selected from the group comprising: threonine (T), serine(S), and glycine (G), and the amino acid at position thirty-five is selected from the group comprising asparagine (N), threonine (T), and serine (S);
b) when a binding motif binds guanine (G) in the target ssDNA base sequence, the amino acid at position five (5) of the motif is selected from the group comprising: threonine (T), serine(S), glycine (G) and alanine (A), and the amino acid at position thirty-five is selected from the group comprising aspartic acid (D), threonine (T), and serine(S);
c) when a binding motif binds cytosine (C) in the target ssDNA base sequence, the amino acid at position five (5) of the motif is selected from the group comprising: threonine (T) or asparagine (N), and the amino acid at position thirty-five is selected from the group comprising asparagine (N), serine(S), aspartic acid (D), and threonine (T); and
d) when a binding motif binds thymine (T) in the target ssDNA base sequence, the amino acid at position five (5) of the motif is selected from the group comprising threonine (T), or asparagine (N), and the amino acid at position thirty-five is selected from the group comprising aspartic acid (D), serine(S), asparagine (N), and threonine (T).

It will be understood that features of the invention according to any broad aspect or embodiment or example described herein provide for each PPR ssDNA base-binding motif to comprise between 30 and 40 amino acids, preferably about 35 amino acids, and more preferably 35 amino acids.

Still further features of the invention according to any broad aspect or embodiment or example described herein provide for the PPR ssDNA-binding domain to comprise a plurality of PPR ssDNA base-binding motifs. Further, the plurality of PPR ssDNA base-binding motifs may comprise a first PPR ssDNA base-binding motif capable of binding to a first DNA base and a second ssDNA RNA base-binding motif capable of binding to a second DNA base, wherein the first and second PPR ssDNA base-binding motifs alter sequence-specific binding of ssDNA.

The target DNA sequence may be any DNA sequence that might be or is capable of being bound in a single stranded form.

The target DNA molecule may be encoded in a transgene that is introduced into a cell such that an endogenous PPR protein will affect the expression of the transgene through the known binding pattern identified herein. The transgene may encode a reporter protein or protein that mediates a desired biological activity (e.g. growth, maturation rate, resistance, etc.)

Further features of the invention according to any broad aspect or embodiment or example described herein provide for the plurality of DNA base-binding motifs to comprise between 2 and 40 PPR DNA base-binding motifs, preferably between 8 and 20 PPR DNA base-binding motifs.

Yet further features of the invention according to any broad aspect or embodiment or example described herein provide for the PPR DNA-binding domain to comprise a plurality of pairs of PPR DNA base-binding motifs operably linked via amino acid spacers; for such amino acid spacers to include those typically used by persons skilled in the art; such as, but not limited to, synthetic amino acid spacers, and further for the amino acid spacers to be derived, wholly or in part, from PPR proteins derived from one or more of the group comprising *Zea Mays* (maize), *Oryza sativa* (Asian rice), *Oryza glaberrima* (African rice), *Hordeum* spp. (Barley), *Arabidopsis* spp. (Rockcress) such as *Arabidopsis thaliana*, or any other species harboring PPR proteins.

The following PPR proteins are given as examples only and it will be appreciated that these examples are intended for the purpose of exemplification. PPR proteins comprise an extensive family of proteins and the invention may be applied to recombinant proteins derived from a large range of PPR proteins which may be functionally equivalent to those described herein. It is understood that PPR proteins demonstrating amino acid sequence homology or similarity to those described herein may be useful for the present invention. It will be also appreciated that many PPR proteins may not demonstrate amino acid sequence similarity to those described herein yet may demonstrate secondary and tertiary structural and functional similarity and/or equivalence to other PPR proteins. The present invention is not limited to PPR proteins demonstrating amino acid sequence homology or similarity to those described herein and includes PPR proteins that demonstrate functional secondary and tertiary structural and/or functional similarity to the embodiments described herein.

According in some embodiments of the present invention, there is provided a recombinant polypeptide comprising at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence is derived according to the target ssDNA base sequence to which it will bind, with the identity of the amino acid at each of positions five (5) and thirty-five (35) being selected according to the following DNA base rules:

a) when a binding motif binds adenine (A) in the target ssDNA base sequence, the amino acid at position five (5) of the motif is threonine (T), and the amino acid at position thirty-five is asparagine (N),
b) when a binding motif binds guanine (G) in the target ssDNA base sequence, the amino acid at position five (5) of the motif is threonine (T) and the amino acid at position thirty-five is aspartic acid (D),
c) when a binding motif binds cytosine (C) in the target ssDNA base sequence, the amino acid at position five (5) of the motif is asparagine (N), and the amino acid at position thirty-five is, serine(S), and
d) when a binding motif binds thymine (T) in the target ssDNA base sequence, the amino acid at position five (5) of the motif is asparagine (N), and the amino acid at position thirty-five is aspartic acid (D).

In a further embodiment, there is provided a recombinant polypeptide comprising at least one PPR ssDNA-binding domain capable of binding to a target ssDNA sequence, the PPR ssDNA-binding domain comprising at least two PPR ssDNA base binding motifs each comprising a 35-amino acid PPR sequence, wherein positions five (5) and thirty-five (35) of the sequence is derived according to the target ssDNA base sequence to which it will bind, with the identity of the amino acid at each of positions five (5) and thirty-five (35) being selected according to the following DNA base rules:

a) when a binding motif binds adenine (A) in the target ssDNA base sequence, the amino acid sequence is VVTYTTLISGLGKAGRLEEALELFEEMKEK-GIVPN, (SEQ ID NO: 1),
b) when a binding motif binds guanine (G) in the target ssDNA base sequence, the amino acid sequence is VVTYTTLISGLGKAGRLEEALELFEEMKEK-GIVPD, (SEQ ID NO: 2),
c) when a binding motif binds cytosine (C) in the target ssDNA base sequence, the amino acid sequence is VVTYNTLISGLGKAGRLEEALELFEEMKEK-GIVPS, (SEQ ID NO: 3), and
d) when a binding motif binds thymine (T) in the target ssDNA base sequence, the amino acid sequence is VVTYNTLISGLGKAGRLEEALELFEEMKEK-GIVPD, (SEQ ID NO: 4).

By way of example, a recombinant polypeptide comprising at least one PPR ssDNA-binding domain that binds to target a telomeric ssDNA sequence 5'-ttagggttag-3' (i.e. cPPR-Telo1; SEQ ID NO: 40) is:

```
Motif 1
                                  (SEQ ID NO: 4)
VVTYNTLISGLGKAGRLEEALELFEEMKEKGIVPD,

Motif 2
                                  (SEQ ID NO: 4)
VVTYNTLISGLGKAGRLEEALELFEEMKEKGIVPD,

Motif 3
                                  (SEQ ID NO: 1)
VVTYTTLISGLGKAGRLEEALELFEEMKEKGIVPN,

Motif 4
                                  (SEQ ID NO: 2)
VVTYTTLISGLGKAGRLEEALELFEEMKEKGIVPD,

Motif 5
                                  (SEQ ID NO: 2)
VVTYTTLISGLGKAGRLEEALELFEEMKEKGIVPD,

Motif 6
                                  (SEQ ID NO: 2)
VVTYTTLISGLGKAGRLEEALELFEEMKEKGIVPD,

Motif 7
                                  (SEQ ID NO: 4)
VVTYNTLISGLGKAGRLEEALELFEEMKEKGIVPD,

Motif 8
                                  (SEQ ID NO: 4)
VVTYNTLISGLGKAGRLEEALELFEEMKEKGIVPD,

Motif 9
                                  (SEQ ID NO: 1)
VVTYTTLISGLGKAGRLEEALELFEEMKEKGIVPN,

Motif 10
                                  (SEQ ID NO: 2)
VVTYTTLISGLGKAGRLEEALELFEEMKEKGIVPD.
```

In some cases of each aspect, embodiment or example described herein, each motif may be operably linked via an amino acid spacer. Such amino acid spacers include those typically used by persons skilled in the art such as, but not limited to, synthetic amino acid spacers, and further for the amino acid spacers to be derived, wholly or in part, from PPR proteins derived from one or more of the group comprising *Zea Mays* (maize), *Oryza sativa* (Asian rice), *Oryza glaberrima* (African rice), *Hordeum* spp. (Barley), and *Arabidopsis* spp. (Rockcress) such as *Arabidopsis thaliana* or any other species harbouring PPR proteins. These PPR proteins are given as examples and it will be that these examples are intended for the purpose of exemplification In a further broad aspect, the invention resides in a stabilised recombinant polypeptide comprises a (i)N-terminal cap sequence and/or a (ii)C-terminal solvating helix sequence added after the final consensus repeat to prevent helical unfolding and or stabilise the structure.

In one embodiment of this aspect of the invention, the recombinant polypeptide comprises:

a) a N-terminal cap sequence,
b) at least one PPR ssDNA-binding domain capable of binding to a target ssDNA sequence, and
c) and C-terminal solvating helix sequence added after the PPR ssDNA-binding domain and prevents helical unfolding and or assists in stabilising the structure, and wherein the PPR ssDNA-binding domain comprising at least two PPR ssDNA base binding motifs each comprising a 35-amino acid PPR sequence, wherein positions five (5) and thirty-five (35) of the sequence is derived according to the target ssDNA base sequence to which it will bind, with the identity of the amino acid at each of positions five (5) and thirty-five (35) being selected according to the following DNA base rules:

a) when a binding motif binds adenine (A) in the target ssDNA base sequence, the amino acid at position five (5) of the motif is selected from the group comprising: threonine (T), serine(S), and glycine (G), and the amino acid at position thirty-five is selected from the group comprising: asparagine (N), threonine (T), and serine(S);
b) when a binding motif binds guanine (G) in the target ssDNA base sequence, the amino acid at position five (5) of the motif is selected from the group comprising: threonine (T), serine(S), glycine (G) and alanine (A), and the amino acid at position thirty-five is selected from the group comprising: aspartic acid (D), threonine (T), and serine(S);
c) when a binding motif binds cytosine (C) in the target ssDNA base sequence, the amino acid at position five (5) of the motif is selected from the group comprising: threonine (T) or asparagine (N), and the amino acid at position thirty-five is selected from the group comprising: asparagine (N), serine(S), aspartic acid (D), and threonine (T); and
d) when a binding motif binds thymine (T) in the target ssDNA base sequence, the amino acid at position five (5) of the motif is selected from the group comprising: threonine (T), or asparagine (N), and the amino acid at position thirty-five is selected from the group comprising: aspartic acid (D), serine(S), asparagine (N), and threonine (T).

In a second embodiment of this aspect of the invention, there is provided a recombinant polypeptide comprising:

a) a N-terminal cap sequence,
b) at least one PPR ssDNA-binding domain capable of binding to a target ssDNA sequence, and
c)C-terminal solvating helix sequence added after the PPR ssDNA-binding domain and prevents helical unfolding and or assists in stabilising the structure, and wherein the PPR ssDNA-binding domain comprising at least two PPR ssDNA base binding motifs each comprising a 35-amino acid PPR sequence, wherein positions five (5) and thirty-five (35) of the sequence is derived according to the target ssDNA base sequence to which it will bind, with the identity of the amino acid at each of positions five (5) and thirty-five (35) being selected according to the following DNA base rules:

a) when a binding motif binds adenine (A) in the target ssDNA base sequence, the amino acid at position five (5) of the motif is threonine (T), and the amino acid at position thirty-five is asparagine (N),
b) when a binding motif binds guanine (G) in the target ssDNA base sequence, the amino acid at position five (5) of the motif is threonine (T) and the amino acid at position thirty-five is aspartic acid (D),
c) when a binding motif binds cytosine (C) in the target ssDNA base sequence, the amino acid at position five (5) of the motif is asparagine (N), and the amino acid at position thirty-five is, serine(S), and
d) when a binding motif binds thymine (T) in the target ssDNA base sequence, the amino acid at position five (5) of the motif is asparagine (N), and the amino acid at position thirty-five is aspartic acid (D).

In a third embodiment of this aspect, there is provided a recombinant polypeptide comprising:
a) a N-terminal cap sequence,
b) at least one PPR ssDNA-binding domain capable of binding to a target ssDNA sequence, and
c) C-terminal solvating helix sequence added after the PPR ssDNA-binding domain and prevents helical unfolding and or assists in stabilising the structure, and
wherein the PPR ssDNA-binding domain comprising at least two PPR ssDNA base binding motifs each comprising a 35-amino acid PPR sequence, wherein positions five (5) and thirty-five (35) of the sequence is derived according to the target ssDNA base sequence to which it will bind, with the identity of the amino acid at each of positions five (5) and thirty-five (35) being selected according to the following DNA base rules:
i. when a binding motif binds adenine (A) in the target ssDNA base sequence, the amino acid sequence is VVTYTTLISGLGKAGRLEEALELFEEMKEKGIVPN, (SEQ ID NO: 1),
ii. when a binding motif binds guanine (G) in the target ssDNA base sequence, the amino acid sequence is VVTYTTLISGLGKAGRLEEALELFEEMKEKGIVPD, (SEQ ID NO: 2),
iii. when a binding motif binds cytosine (C) in the target ssDNA base sequence, the amino acid sequence is VVTYNTLISGLGKAGRLEEALELFEEMKEKGIVPS, (SEQ ID NO: 3), and
iv. when a binding motif binds thymine (T) in the target ssDNA base sequence, the amino acid sequence is VVTYNTLISGLGKAGRLEEALELFEEMKEKGIVPD, (SEQ ID NO: 4).

Preferably, the N-terminal cap sequence is the amino acid sequence MGNS (SEQ ID NO: 5) while the C-terminal solvating helix amino acid sequence is VVTYNTLISGLGKAG (SEQ ID NO: 6) or the amino acid sequence VVTYTTLISGLGKAG (SEQ ID NO: 7)

By way of example, a recombinant polypeptide may comprise at least one PPR ssDNA-binding domain that binds to target a telomeric ssDNA sequence 5'-ttagggttag-3' (i.e. cPPR-Telo1; SEQ ID NO: 40) is selected from the sequences:

```
                                       (SEQ ID NO: 5)
  MGNS

  Motif 1
                                       (SEQ ID NO: 4)
  VVTYNTLISGLGKAGRLEEALELFEEMKEKGIVPD,

  Motif 2
```

```
                                       (SEQ ID NO: 4)
  VVTYNTLISGLGKAGRLEEALELFEEMKEKGIVPD,

  Motif 3
                                       (SEQ ID NO: 1)
  VVTYTTLISGLGKAGRLEEALELFEEMKEKGIVPN,

  Motif 4
                                       (SEQ ID NO: 2)
  VVTYTTLISGLGKAGRLEEALELFEEMKEKGIVPD,

  Motif 5
                                       (SEQ ID NO: 2)
  VVTYTTLISGLGKAGRLEEALELFEEMKEKGIVPD,

  Motif 6
                                       (SEQ ID NO: 2)
  VVTYTTLISGLGKAGRLEEALELFEEMKEKGIVPD,

  Motif 7
                                       (SEQ ID NO: 4)
  VVTYNTLISGLGKAGRLEEALELFEEMKEKGIVPD,

  Motif 8
                                       (SEQ ID NO: 4)
  VVTYNTLISGLGKAGRLEEALELFEEMKEKGIVPD,

  Motif 9
                                       (SEQ ID NO: 1)
  VVTYTTLISGLGKAGRLEEALELFEEMKEKGIVPN,

  Motif 10
                                       (SEQ ID NO: 2)
  VVTYTTLISGLGKAGRLEEALELFEEMKEKGIVPD,

                                       (SEQ ID NO: 6)
  VVTYNTLISGLGKAG
  or

                                       (SEQ ID NO: 5)
  MGNS

  Motif 1
                                       (SEQ ID NO: 4)
  VVTYNTLISGLGKAGRLEEALELFEEMKEKGIVPD,

  Motif 2
                                       (SEQ ID NO: 4)
  VVTYNTLISGLGKAGRLEEALELFEEMKEKGIVPD,

  Motif 3
                                       (SEQ ID NO: 1)
  VVTYTTLISGLGKAGRLEEALELFEEMKEKGIVPN,

  Motif 4
                                       (SEQ ID NO: 2)
  VVTYTTLISGLGKAGRLEEALELFEEMKEKGIVPD,

  Motif 5
                                       (SEQ ID NO: 2)
  VVTYTTLISGLGKAGRLEEALELFEEMKEKGIVPD,

  Motif 6
                                       (SEQ ID NO: 2)
  VVTYTTLISGLGKAGRLEEALELFEEMKEKGIVPD,

  Motif 7
                                       (SEQ ID NO: 4)
  VVTYNTLISGLGKAGRLEEALELFEEMKEKGIVPD,

  Motif 8
                                       (SEQ ID NO: 4)
  VVTYNTLISGLGKAGRLEEALELFEEMKEKGIVPD,

  Motif 9
                                       (SEQ ID NO: 1),
  VVTYTTLISGLGKAGRLEEALELFEEMKEKGIVPN,

  Motif 10
```

-continued (SEQ ID NO: 2)
VVTYTTLISGLGKAGRLEEALELFEEMKEKGIVPD, (SEQ ID NO: 7)
VVTYTTLISGLGKAG.

In some cases, each sequence is operably linked via an amino acid spacer. Such amino acid spacers include those typically used by persons skilled in the art such as, but not limited to, synthetic amino acid spacers, and further for the amino acid spacers to be derived, wholly or in part, from PPR proteins derived from one or more of the group comprising *Zea Mays* (maize), *Oryza sativa* (Asian rice), *Oryza glaberrima* (African rice), *Hordeum* spp. (Barley), and *Arabidopsis* spp. (Rockcress) such as *Arabidopsis thaliana* or any other species harbouring PPR proteins. These PPR proteins are given as examples and it will be that these examples are intended for the purpose of exemplification In a further aspect of the invention, there is provided a method for targeting telomeric ssDNA and/or blocking extension of telomeric ssDNA by human telomerase.

In an embodiment of this aspect of the invention, the method comprises the step of: administering a therapeutically effective amount of I. a recombinant sequence of the first aspect of the invention or one of the embodiments there to, or II. a stabilised recombinant sequence according to the second aspect of the invention or one of the embodiments there to, to a patient in need of such treatment such as for use in treatment of a patient in need of a disease or therapeutic state influenced by gene expression.

According to the invention, ssDNA cPPRs can be designed to bind telomeric ssDNA and to thereby block the activity of human telomerase, which provides a critical cancer target.

In a second embodiment of this aspect the invention provides a method of treating cancer in a patient, said method comprising the step of: administering a therapeutically effective amount of:

I. a recombinant sequence of the first aspect of the invention or one of the embodiments there to, or II. a stabilised recombinant sequence according to the second aspect of the invention or one of the embodiments there to, to a patient having cancer.

In a third embodiment of this aspect, the invention provides a method of ameliorating the presence of neoplastic tissue in a patient, said method comprising the step of: administering a therapeutically effective amount of:

I. a recombinant sequence of the first aspect of the invention or one of the embodiments there to, or II. a stabilised recombinant sequence according to the second aspect of the invention or one of the embodiments there to, to a patient having a cancer.

Preferably the sequence is administered directly into neoplastic tissue. This may be achieved by either site-specific targeting of the sequence to a neoplastic tissue by direct injection or alternatively by targeting the sequence through selectively targeting one or more marker sequences that are specific for the cancer being treated.

In a further aspect, the invention provides for the use of a cPPR sequence, said sequence being a recombinant sequence selected from:

I. a recombinant sequence of the first aspect of the invention or one of the embodiments there to, or II. a stabilised recombinant sequence according to the second aspect of the invention or one of the embodiments there to, for use in treatment of a patient in need of a disease or therapeutic state influenced by aberrant gene expression.

In an alternative form, the invention resides in the use of a cPPR sequence, said sequence being a recombinant sequence selected from:

I. a recombinant sequence of the first aspect of the invention or one of the embodiments there to, or II. a stabilised recombinant sequence according to the second aspect of the invention or one of the embodiments there to, for use in treatment of a patient suffering from cancer.

In yet another alternative form, the invention resides in the use of a substance or composition comprising a fusion protein comprising at least one PPR DNA-binding domain capable of specifically binding to an DNA base as herein described, for the manufacture of a medicament for therapeutic use in the treatment of a patient in need of such treatment such as for use in treatment of a patient in need of a disease or therapeutic state influenced by gene expression.

Preferably, the invention further resides in the use of a substance or composition comprising a cPPR sequence as herein described for the manufacture of a medicament for therapeutic use in the treatment of a patient in need of telomerase treatment.

The invention also resides ibn the use of a substance or composition comprising a fusion protein comprising at least one PPR DNA-binding domain capable of specifically binding to any DNA base as herein described, for the manufacture of a medicament for therapeutic use in the treatment of a patient in need of telomerase treatment.

The invention also resides in the use of a substance or composition comprising a cPPR sequence as herein described for the manufacture of a medicament for therapeutic use in the treatment of a patient suffering from cancer.

The invention also provides a fusion protein comprising at least one PPR DNA-binding domain capable of specifically binding to any DNA base, and an effector domain.

The invention also provides a fusion protein comprising at least one artifice or recombinant polypeptide of the invention, and an effector domain.

The effector domain may be any domain capable of interacting with DNA, whether transiently or irreversibly, directly or indirectly, including but not limited to an effector domain selected from the group comprising; nucleases; protein-protein interaction domains, RNA-binding domains, DNA-binding domains, deaminases, methylases, polymerases, base-modifying enzyme domains, ligases, helicases, topoisomerases, glycosyltransferases, phosphatases, sulfurylases, recombinases, kinases.

The effector domain may also be a reporter protein, or functional fragment thereof, including, but not limited to, his3, β-galatosidase, GFP, RFP, YFP, luciferase, β-glucuronidase, and alkaline phosphatase.

The artificial or recombinant PPR polypeptide according to any aspect or embodiment or example of the invention described herein may be derived from a P-type PPR protein, such as, but not limited, to the Rf clade of fertility restorers.

Further features provide for the PPR DNA-binding domain and the effector domain to be operably linked via a peptide spacer.

Due to the degeneracy of the DNA code, it will be well understood to one of ordinary skill in the art that substitution of nucleotides may be made without changing the amino acid sequence of the polypeptide. Therefore, the invention includes any nucleic acid sequence for a recombinant polypeptide comprising a recombinant PPR DNA-binding domain according to the invention capable of specifically binding to an RNA base. Moreover, it is understood in the art that for a given protein's amino acid sequence, substitution of certain amino acids in the sequence can be made without significant effect on the function of the peptide. Such substitutions are known in the art as "conservative substitutions."

In one broad aspect, the invention also encompasses an artificial or recombinant polypeptide comprising a PPR ssDNA-binding domain that contains conservative substitutions, wherein the function of the recombinant polypeptide in the specific binding of an ssDNA base according to the invention is not altered. Generally, the identity of such a mutant recombinant polypeptide comprising a PPR ssDNA-binding domain will be at least 90% identical to a polypeptide encoded by the sequence of any one of SEQ ID NOS: 1 to 4.

In another broad aspect, the invention further provides for an isolated nucleic acid encoding the artificial or recombinant polypeptide or the fusion protein of the invention described in any aspect, or embodiment or example herein.

Further features of the invention provide for the isolated nucleic acid to have a sequence of any one of SEQ ID NOS: 1 to 4 or any combination thereof.

In another broad aspect, the invention encompasses an isolated nucleic acid encoding the recombinant polypeptide or the fusion protein of the invention that is at least 80%; at least 85%; at least 90%; at least 95%; or at least 97% identical; to the sequence of any one of SEQ ID NOS: 1 to 4 or any combination thereof.

Most preferably, the isolated nucleic acid encoding the recombinant polypeptide or the fusion protein will be at least 99% identical to the sequence of any one of SEQ ID NOS: 1 to 4 or any combination thereof.

In another broad aspect, the invention yet further provides a recombinant vector comprising nucleic acid encoding the recombinant polypeptide or the fusion protein of the invention.

Further features of the invention provide for the nucleic acid of the recombinant vector to have a sequence of the sequence of any one of SEQ ID NOS: 1 to 4 or any combination thereof. The invention encompasses a recombinant vector comprising nucleic acid encoding the recombinant polypeptide or the fusion protein of the invention that is at least 80% identical to the sequence of any one of SEQ ID NOS: 1 to 4 or any combination thereof. Preferably, the nucleic acid of the recombinant vector will be at least 80%; at least 85%; at least 90%; at least 95%; or at least 97% identical; to the sequence of any one of SEQ ID NOS: 1 to 4 or any combination thereof. Most preferably, the nucleic acid of the recombinant vector will be at least 99% identical to the sequence of any one of SEQ ID NOS: 1 to 4 or any combination thereof.

In another broad aspect, the invention extends to a host cell comprising nucleic acid encoding the artificial or recombinant polypeptide or the fusion protein of the invention; and for the nucleic acid of the host cell comprising a sequence encoding the artificial or recombinant polypeptide or the fusion protein of the invention e.g., encoding the sequence of any one of SEQ ID NOS: 1 to 4 or any combination thereof.

The invention encompasses a host cell comprising nucleic acid encoding the artificial or recombinant polypeptide or the fusion protein of the invention. Preferably, the nucleic acid is at least 80%; at least 85%; at least 90%; at least 95%; or at least 97% identical to either SEQ ID NO: 1 to 4 or any combination thereof. Most preferably, the nucleic acid of the host cell will be at least 99% identical to either SEQ ID NO: 1 to 4 or any combination thereof.

The artificial or recombinant polypeptide of the invention or the fusion protein of the invention may further comprise an operable signal sequence such as those known in the art, including but not limited to a nuclear localization signal (NLS), a mitochondrial targeting sequence (MTS) and a secretion signal. The isolated nucleic acid of the invention, the nucleic acid of the recombinant vector of the invention, and the nucleic acid of the host cell of the invention may encode an operable signal sequence such as those known in the art, including but not limited to a nuclear localization signal (NLS), a mitochondrial targeting sequence (MTS), a chloroplast targeting sequence (CTS), a plastid targeting signal, and a secretion signal.

The artificial or recombinant polypeptide of the invention or the fusion protein of the invention may further comprise a protein tag such as those known in the art, including but not limited to an intein tag, a maltose binding protein domain tag, a histidine tag, a FLAG-tag, a biotin tag, a streptavidin tag, a starch binding protein domain tag, a hemagglutinin (HA) tag, and a fluorescent protein tag.

The invention also provides for a composition comprising the artificial or recombinant polypeptide of the invention or the fusion protein of the invention or the isolated nucleic acid of the invention or the recombinant vector of the invention.

The invention extends to the use of an effective amount of the artificial or recombinant polypeptide of the invention or the fusion protein of the invention or the isolated nucleic acid of the invention or the recombinant vector of the invention in the manufacture of a medicament for regulating gene expression.

The invention further provides for a method of regulating expression of a gene in a cell, the method comprising the step of introducing into the cell an artificial or recombinant polypeptide comprising a PPR ssDNA-binding domain comprising PPR ssDNA base-binding motifs according to any aspect, embodiment or example of the invention as described herein; and wherein binding of the recombinant polypeptide to the target RNA alters the expression of the gene.

The polypeptides and proteins of the present invention also encompass modified peptides, i.e. peptides, which may contain amino acids modified by addition of any chemical residue, such as phosphorylated or myristylated amino acids.

The invention further provides for a pharmaceutical composition comprising the artificial or recombinant polypeptide of the invention or the fusion protein of the invention or the isolated nucleic acid of the invention or the recombinant vector of the invention.

The term "pharmaceutical composition" as used herein comprises the substances of the present invention and optionally one or more pharmaceutically acceptable carriers.

The substances of the present invention can be formulated as pharmaceutically acceptable salts. Acceptable salts comprise acetate, methylester, HCl, sulfate, chloride and the like.

The pharmaceutical compositions can be conveniently administered by any of the routes conventionally used for drug administration, for instance, orally, topically, parenterally or by inhalation.

The substances can be administered in conventional dosage forms prepared by combining the drugs with standard pharmaceutical carriers according to conventional procedures. These procedures may involve mixing, granulating and compressing or dissolving the ingredients as appropriate to the desired preparation.

It will be appreciated that the form and character of the pharmaceutically acceptable character or diluent is dictated by the amount of active ingredient with which it is to be combined, the route of administration and other well-known variables.

The carrier(s) must be "acceptable" in the sense of being compatible with the other ingredients of the formulation and not deleterious to the recipient thereof. The pharmaceutical carrier employed may be, for example, either a solid or liquid. Exemplary of solid carriers are lactose, terra alba, sucrose, talc, gelatine, agar, pectin, acacia, magnesium stearate, stearic acid and the like. Exemplary of liquid carriers are phosphate buffered saline solution, syrup, oil such as peanut oil and olive oil, water, emulsions, various types of wetting agents, sterile solutions and the like. Similarly, the carrier or diluent may include time delay material well known to the art, such as glyceryl mono-stearate or glyceryl distearate alone or with a wax.

The substance according to the present invention can be administered in various manners to achieve the desired effect. Said substance can be administered either alone or in the formulated as pharmaceutical preparations to the subject being treated either orally, topically, parenterally or by inhalation. Moreover, the substance can be administered in combination with other substances either in a common pharmaceutical composition or as separated pharmaceutical compositions.

The diluent is selected so as not to affect the biological activity of the combination. Examples of such diluents are distilled water, physiological saline, Ringer's solutions, dextrose solution, and Hank's solution. In addition, the pharmaceutical composition or formulation may also include other carriers, adjuvants, or nontoxic, nontherapeutic, nonimmunogenic stabilizers and the like.

A therapeutically effective dose refers to that amount of the substance according to the invention which ameliorate the symptoms or condition. Therapeutic efficacy and toxicity of such compounds can be determined by standard pharmaceutical procedures in cell cultures or experimental animals, e.g., ED50 (the dose therapeutically effective in 50% of the population) and LD50 (the dose lethal to 50% of the population). The dose ratio between therapeutic and toxic effects is the therapeutic index, and it can be expressed as the ratio, LD50/ED50. The dosage regimen will be determined by the attending physician and other clinical factors; preferably in accordance with any one of the methods described above.

As is well known in the medical arts, dosages for any one patient depends upon many factors, including the patient's size, body surface area, age, the particular compound to be administered, sex, time and route of administration, general health, and other drugs being administered concurrently. Progress can be monitored by periodic assessment.

Specific formulations of the substance according to the invention are prepared in a manner well known in the pharmaceutical art and usually comprise at least one active substance referred to herein above in admixture or otherwise associated with a pharmaceutically acceptable carrier or diluent thereof. For making those formulations the active substance(s) will usually be mixed with a carrier or diluted by a diluent, or enclosed or encapsulated in a capsule, sachet, cachet, paper or other suitable containers or vehicles. A carrier may be solid, semisolid, gel-based or liquid material, which serves as a vehicle, excipient or medium for the active ingredients. Said suitable carriers comprise those mentioned above and others well known in the art, see, e.g., Remington's Pharmaceutical Sciences, Mack Publishing Company, Easton, Pennsylvania. The formulations can be adapted to the mode of administration comprising the forms of tablets, capsules, suppositories, solutions, suspensions or the like.

The dosing recommendations will be indicated in product labelling by allowing the prescriber to anticipate dose adjustments depending on the considered patient group, with information that avoids prescribing the wrong drug to the wrong patients at the wrong dose.

The invention also provides a system for regulating gene expression comprising a. a plurality of PPR ssDNA base-binding motifs;
b. means for annealing the PPR ssDNA base-binding motifs in a desired sequence to produce an isolated nucleic acid encoding an expressible recombinant polypeptide comprising a binding domain having a plurality of consecutively ordered binding motifs; and
c. a target ssDNA sequence, wherein binding motifs corresponds with the target ssDNA sequence.

Further features of the invention provide for each pair of PPR ssDNA base-binding motifs to comprise between 30 and 40 amino acids, preferably about 35 amino acids.

Further features of the invention provide for the plurality of PPR ssDNA-base binding motifs, preferably comprising between 2 and 40 PPR ssDNA-base binding motifs, more preferably between 8 and 20 PPR ssDNA-base binding motifs.

Yet further features provide for the PPR ssDNA-base binding domain to comprise a PPR ssDNA-base binding motifs operably linked via amino acid spacers. Such amino acid spacers include those typically used by persons skilled in the art such as, but not limited to, synthetic amino acid spacers, and further for the amino acid spacers to be derived, wholly or in part, from PPR proteins derived from one or more of the group comprising *Zea Mays* (maize), *Oryza sativa* (Asian rice), *Oryza glaberrima* (African rice), *Hordeum* spp. (Barley), and *Arabidopsis* spp. (Rockcress) such as *Arabidopsis thaliana* or any other species harboring PPR proteins. These PPR proteins are given as examples and it will be that these examples are intended for the purpose of exemplification.

In one broad aspect, the invention also extends to a kit for regulating gene expression comprising a) a plurality of PPR ssDNA base-binding motifs;
b) means for annealing the PPR ssDNA base-binding motifs in a desired sequence to produce an isolated nucleic acid encoding an expressible recombinant polypeptide comprising a binding domain having a plurality of consecutively ordered binding motifs; and
c) a target ssDNA sequence, wherein binding motifs corresponds with the target ssDNA sequence.

The target ssDNA sequence in the kit can be a ssDNA sequence encoding a reporter protein including, but not limited to, his3, β-galatosidase, GFP, RFP, YFP, luciferase, β-glucuronidase, and alkaline phosphatase.

In another broad aspect, the invention relates to a method of stabilising an artificial polypeptide according to any aspect or embodiment or example hereof, said method comprising introducing to said artificial polypeptide or linking said artificial polypeptide with an N-terminal cap sequence and a C-terminal solvating helix sequence after the PPR ssDNA-binding domain.

In another broad aspect, the invention relates to a method of regulating gene expression in a cell or patient by targeting ssDNA in said cell or patient, said method comprising administering to the cell or patient an amount of an artificial polypeptide according to any aspect or embodiment or example hereof.

In another broad aspect, the invention relates to a method of targeting telomeric ssDNA to block its extension by a telomerase enzyme in mammalian cell or in patient, said method comprising administering to the cell or patient an amount of an artificial polypeptide according to any aspect or embodiment or example hereof.

In another broad aspect, the invention relates to a method for treating a patient with a cPPR sequence, said method comprising the step of: administering a therapeutically effective amount of an artificial polypeptide according to any aspect or embodiment or example hereof, to a patient in need of treatment from a cPPR sequence.

In another broad aspect, the invention relates to a method of inhibiting activity of telomerase in a patient in need thereof, said method comprising the step of: administering a therapeutically effective amount of an artificial polypeptide according to any aspect or embodiment or example hereof.

In another broad aspect, the invention relates to a method of treating cancer in a patient, said method comprising the step of: administering a therapeutically effective amount of artificial polypeptide according to any aspect or embodiment or example hereof to a patient having cancer.

In another broad aspect, the invention relates to a method of ameliorating the presence of neoplastic tissue in a patient, said method comprising the step of: administering a therapeutically effective amount of artificial polypeptide according to any aspect or embodiment or example hereof to a patient having cancer and/or having the neoplastic tissue.

In another broad aspect, the invention relates to use of an artificial polypeptide according to any aspect or embodiment or example hereof in the treatment of a patient in need of telomerase treatment.

In another broad aspect, the invention relates to use of an artificial polypeptide according to any aspect or embodiment or example hereof in the treatment of a patient suffering from cancer.

In another broad aspect, the invention relates to use of an artificial polypeptide according to any aspect or embodiment or example hereof in the manufacture of a medicament for treating or preventing a disease or condition in a patient wherein said disease or condition is influenced by gene expression in the patent and said medicament targeting ssDNA in the patient.

In another broad aspect, the invention relates to use of an artificial polypeptide according to any aspect or embodiment or example hereof in the manufacture of a medicament for the treatment of a patient in need of telomerase treatment.

In another broad aspect, the invention relates to use of an artificial polypeptide according to any aspect or embodiment or example hereof in the manufacture of a medicament for the treatment of a patient in need of blocking telomeric ssDNA extension by a telomerase enzyme.

In one preferred example according to any broad aspect described herein throughout or any embodiment or example thereof, the telomerase enzyme is a human a telomerase enzyme.

In another broad aspect, the invention relates to use of an artificial polypeptide according to any aspect or embodiment or example hereof in the manufacture of a medicament for the treatment of a patient suffering from cancer and/or a patient having a neoplastic tissue.

In another broad aspect, the invention provides a pharmaceutical composition comprising a therapeutically effective amount of an artificial or recombinant polypeptide according to any aspect or embodiment or example hereof and a pharmaceutically acceptance carrier, diluent and/or excipient.

In another broad aspect, the invention provides host cell comprising, transfected with, and/or expressing of an artificial or recombinant polypeptide according to any aspect or embodiment or example hereof. Preferably, the host cell is a mammalian cell, for example a HeLA cell or a Huh-7 cell.

In another aspect of the invention, a method is provided said method providing a means to target telomeric ssDNA and block extension by human telomerase.

In an embodiment of this aspect of the invention, the method comprises the step of: administering a therapeutically effective amount of I. a recombinant sequence of any aspect of the invention or any of the embodiments or examples thereof, or
II. a stabilised recombinant sequence according to any aspect of the invention or any of the embodiments or examples thereof, to a patient in need of such treatment.

According to the invention, ssDNA cPPRs can be designed to bind telomeric ssDNA and to thereby block the activity of human telomerase, which provides a critical cancer target.

In a another embodiment of this aspect, the invention provides a method of treating cancer in a patient, said method comprising the step of: administering a therapeutically effective amount of:

I. a recombinant sequence according to any aspect of the invention or any of the embodiments or examples thereof, or
II. a stabilised recombinant sequence according to any aspect of the invention or any of the embodiments or examples thereof, to a patient having cancer.

In another broad aspect, the invention provides a method for treating a patient with a cPPR sequence, said method comprising the step of: administering a therapeutically effective amount of a recombinant sequence according to any aspect, embodiment or example described herein to a patient in need of treatment from a cPPR sequence.

In another broad aspect, the invention provides a method of treating cancer in a patient, said method comprising the step of: administering a therapeutically effective amount of a recombinant sequence according to any aspect, embodiment or example described herein to a patient having cancer.

In another broad aspect, the invention provides a method of ameliorating the presence of neoplastic tissue in a patient, said method comprising the step of: administering a therapeutically effective amount of a recombinant sequence according to any aspect, embodiment or examples described herein to a patient having a cancer.

In another broad aspect, the invention relates to use of a cPPR sequence, said sequence being an artificial or recombinant polypeptide sequence according to any aspect, embodiment or example hereof for the treatment of a patient in need of telomerase treatment.

In another broad aspect, the invention relates to use of a cPPR sequence, said sequence being an artificial or recombinant polypeptide sequence according to any aspect, embodiment or example hereof for the treatment of a patient suffering from cancer.

In another broad aspect, the invention relates to use of a substance or composition comprising an artificial or recombinant polypeptide sequence according to any aspect, embodiment or example hereof, for the manufacture of a medicament for therapeutic use in the treatment of a patient in need of such treatment such as for use in treatment of a patient in need of a disease or therapeutic state influenced by gene expression.

In another broad aspect, the invention relates to use of a substance or composition comprising an artificial or recombinant polypeptide sequence according to any aspect, embodiment or example hereof, for the manufacture of a medicament for therapeutic use in the treatment of a patient in need of telomerase treatment.

In another broad aspect, the invention relates to use of a substance or composition comprising an artificial or recombinant polypeptide sequence according to any aspect, embodiment or example hereof, for the manufacture of a medicament for therapeutic use in the treatment of a patient in need of telomerase treatment.

In another broad aspect, the invention relates to use of a substance or composition comprising an artificial or recombinant polypeptide sequence according to any aspect, embodiment or example hereof, for the manufacture of a medicament for therapeutic use in the treatment of a patient suffering from cancer.

2. General Discussion

As demonstrated in the working examples that follow, here the inventors found that designed PPR proteins can bind ssDNA in a sequence-specific manner.

Furthermore, as demonstrated herein the modularity of the cPPR proteins enabled the inventors to design cPPRs that can target telomeric ssDNA and block extension by human telomerase.

Once the inventors demonstrated the ability of cPPRs to target ssDNA, they sought to also investigate whether natural PPR proteins generally discriminate between RNA and DNA. This this end, the inventors observed that the 2'-OH groups in the bound RNA are oriented towards helix a and discrimination between ssDNA and RNA might be achieved by interactions with the side chains of residues at positions 6 and 9 of helix a. However, identifying the exact residues involved has been complicated by the fact that PPR arrays compress significantly upon RNA binding. This reorientates the helices so that different residues might be involved in initial recognition of the backbone sugar, compared to those involved in later accommodation within the PPR solenoid. The molecular basis for potential discrimination between ssRNA and ssDNA by the wide variety of natural PPR proteins is not yet clear. The THA8 PPR protein binds its RNA target as a dimer and only a central G is recognised according to the PPR code by a PPR repeat from one of the THA8 subunits. A direct hydrogen bond between an arginine residue at position 8 of that repeat and the 2'-OH group appears to be required for high affinity RNA binding. The ribose group of the adjacent A nucleotide is also recognised by THA8 but via a water-mediated hydrogen bond with an arginine of the other THA8 protein in the dimer. The PPR10 protein has 19 PPRs and three of these interact with the 2'-OH ribose groups in its target RNA: repeats 3 and 5 make direct hydrogen bonds via arginine and serine amino acids at positions 2 and 5, respectively, while repeat 15 makes a water-mediated hydrogen bond, via a serine at position 9.

Consistent with these observations the inventors found that recombinant PPR10 did not robustly bind ssDNA, in comparison to RNA (FIG. 25). Therefore, the mode of recognition of ribose 2'-OH groups by different PPR proteins appears to be idiosyncratic and the specificity for RNA in natural proteins might be wiped clean in the consensus design of cPPRs, resulting in their ability to bind both RNA and ssDNA with high affinity.

In nature RNA-binding proteins do not often need to discriminate against SSDNA. First, because RNAs are usually orders of magnitude more abundant than the genes that encode them in cells, the DNA can be simply outcompeted by RNA. Second, ssDNA may be sequestered in cells by non-specific ssDNA-binding proteins, such as replication protein A (RPA) (Ashton, N. W. et al. Human single-stranded DNA binding proteins are essential for maintaining genomic stability. *BMC Mol. Biol.* 14, 9 (2013)), limiting the access of RNA-binding proteins. Third, in eukaryotic cells RNA-binding proteins are often targeted to the locations of their RNA targets, such as the cytoplasm, mitochondria and the nucleoli, which are separated from potential ssDNA targets in the nucleus (Dickey, T. H., Altschuler, S. E. & Wuttke, D. S. Single-stranded DNA-binding proteins: multiple domains for multiple functions. *Structure* 21, 1074-1084 (2013)). The inventors have reasoned that the cPPR scaffold provides high affinity, sequence-specific binding to aid in the goal of developing designer ssDNA-binding proteins, and the results outlined in the examples that follow set the stage for further engineering of cPPRs to discriminate against RNA, to more efficiently target ssDNA in cells. Furthermore, the inventors also speculated that if combined with protein signals to efficiently target cPPRs to regions of the cell containing their ssDNA targets, these proteins could help reveal the many aspects of cell biology involving ssDNA, that are currently understudied due to a lack of appropriate tools.

In the work leading to the present invention as exemplified in the examples that follow, the inventors provide proof-of-principle that cPPRs can be used to target and manipulate ssDNA such as telomeric ssDNA in vitro. One attractive area in ssDNA biology is to manipulate telomerase and telomeres in general. Telomerase uses a unique mode of primer extension, whereby an internal RNA template is used to specify the sequence of the added repeat. Because this template can be re-used for each repeat, the product-template duplex must dissociate after each addition, providing ample opportunity for the engineered cPPRs to access the telomeric ssDNA.

Human telomerase is proposed to extend telomeres by 5-10 repeats per cell division. This may result from the complex competition between telomerase, POT1, the general ssDNA binding protein RPA, and other shelterin components. The addition of a telomeric sequence-specific cPPR in cells skew this competition by blocking telomerase access and preventing telomere extension, providing a cancer therapeutic.

As also demonstrated in the working examples that follow, cPPRs may be difficult to express in mammalian cells, as demonstrated by the inventors' first attempts at establishing a cPPR-based system for manipulating ssDNA and/or RNA in mammalian cells which were unsuccessful and resulted in lack of cPPR expression in the mammalian cells such as Hela cells. The lack of expression in mammalian cells of cPPRs was not previously expected since cPPRs were anticipated to be adequately stable on their own in mammalian cells. The inventors speculated that the observed lack of cPPRs expression in mammalian cells might be due to their protein instability or misfolding in mammalian cells. Following vigorous testing of various expression modes, the inventors demonstrated that the fusion of cPPRs to green fluorescent protein, such as to enhanced green fluorescent protein (EGFP) or to superfolder green fluorescent protein (sfGFP), enables robust expression of cPPRs in mammalian cells, thereby facilitating a cPPR based system which allows to manipulate ssDNA and/or RNA in mammalian cells.

Furthermore, in addition to showing that cPPRs can profoundly inhibit telomerase activity in vitro by blocking its association with its ssDNA template, in the work leading to the present invention the inventors were also able to demonstrate that it is possible to use cPPRs proteins which bind to ssDNA in mammalian cells e.g., with a potential to inhibit telomerase activity within mammalian cells. Specifically, the inventors demonstrated that fusion of cPPRs proteins according to the present invention to a fragment of the human POT1 protein comprising at least the C-terminal TPP binding domain of hPOT1 enables targeting cPPRs to telomeres in mammalian cells, pave the way for the use of cPPR-based telomerase inhibitors for use in regulation of gene expression in mammalian cells and in therapy such as cancer therapies.

The following Examples serve to illustrate the present invention and should not be construed as limiting.

EXAMPLES

Example 1: Methods and Materials

1. Design and Synthesis of cPPR Coding Sequences.

The cPPR-polyA, cPPR-polyC, cPPR-polyG and cPPR-polyU proteins incorporating internal 35-amino acid repeats were designed as described and illustrated in FIG. 1*a*. In particular, the amino acid residues at positions 5 and 35 were chosen based on the target ssDNA or RNA base, and wherein optional flanking N-terminal cap and/or C-terminal solvating helix can be incorporated to stabilise the cPPR helical structure. The identity of the amino acid residue at position 5 of the C-terminal solvating helix was based on the base 3' of the target sequence with Asn (N) in the case of a purine and Thr (T) in the case of a pyrimidine. The cPPR-Telo1 and cPPR-Telo2 proteins which were designed to target the telomeric ssDNA sequence 5'-ttagggttag-3' (SEQ ID NO: 40) were designed based on 10 tandem repeats with amino acids at position 4 and 34 chosen according to the recognition code of cPPR described herein. N-terminal cap residues (Met-Gly-Asn-Ser) (SEQ ID NO: 5) and a C-terminal solvating helix (Val-Val-Thr-Tyr-Thr-Thr-Leu-Ile-Ser-Gly-Leu-Gly-Lys-Ala-Gly) (SEQ ID NO: 7) were added to the final design (see FIG. 1*b* for a detailed example). The synthetic and/or recombinant genes encoding the final cPPR design were optimized for expression in *E. coli* and synthesized from overlapping oligonucleotides (GeneArt and GenScript).

2. Protein Purification.

Coding sequences for cPPR-Telo1, cPPR-Telo2 and EGFP were subcloned into pETM30 vector (EMBL, Heidelberg, Germany) and expressed as fusions to GST and His tags in *E. coli* 2566 cells (New England Biolabs). Cells were lyzed by sonication in Lysis Buffer (50 mM Tris-HCl, pH 8.0, 0.3 M NaCl and 5 mM imidazole). Lysate were clarified by centrifugation and incubated with His Select Beads (Sigma) for 30 min with gentle rocking at 4° C. Beads were washed twice with Wash Buffer (same as Lysis Buffer but with 10 mM imidazole) and transferred into a Poly-Prep Chromatography Column (Bio-Rad). Beads were then washed twice with Wash Buffer and proteins were eluted in Elution Buffer (same as Lysis Buffer but with 250 mM imidazole). Purified proteins were dialyzed using DiaEasy Dialyzer (BioVision) in Dialysis Buffer (25 mM Tris, pH 7.4, 0.2 M NaCl, 0.5 mM EDTA and 2 mM DTT) overnight at 4° C. Protein concentration was determined by the bicinchoninic acid (BCA) assay using bovine serum albumin (BSA) as a standard. cPPR-polyA, cPPR-polyC, cPPR-polyG, cPPR-polyU/T and cPPR-NRE were purified as described in Coquille, S. et al. An artificial PPR scaffold for programmable RNA recognition. Nat Commun 5, 5729 (2014). Proteins used for crystallization were essentially purified as above with the following modifications: During dialysis, the fusion tag was removed by tobacco etch virus (TEV) at a protease: protein molar ratio of 1:50, followed by purification on a Superdex 200 10/300 column in dialysis buffer and concentrated using Vivaspin concentrators (10,000 Da MWCO, GE).

3. Crystallization and Structure Determination.

Crystals of cPPR-Telo1 were grown at 23° C. by the sitting drop vapour diffusion method by mixing 1 μl protein (5 mg/ml) with an equal volume of reservoir solution (100 mM sodium acetate pH 4.6, 20 mM calcium chloride, and 40% MPD). In addition, cPPR-Telo1 was incubated with target ssDNA oligonucleotide (ttagggttag SEQ ID NO: 40) at a protein/DNA molar ratio of 1:2 for 30 min at 4° C. and crystallized in 100 mM sodium acetate pH 4.6, 20 mM calcium chloride, and 22% MPD. For both cPPR-Telo1 and cPPR-Telo1/ssDNA a single-wavelength anomalous dispersion dataset was collected at the K-edge of selenium at beam line ID30A-3 (ESRF, Grenoble, France). The X-ray diffraction data (Table 1) were processed with XDS40 and the structure was solved with PHENIX (Adams, P. D. et al. PHENIX: a comprehensive Python-based system for macromolecular structure solution. *Acta Crystallogr D Biol Crystallogr* 66, 213-21 (2010)) and autoSHARP (Vonrhein, C., Blanc, E., Roversi, P. & Bricogne, G. Automated structure solution with autoSHARP. *Methods Mol Biol* 364, 215-30 (2007). An initial model built by Buccaneer (Cowtan, K. The Buccaneer software for automated model building. 1. Tracing protein chains. *Acta Crystallogr D Biol Crystallogr* 62, 1002-11 (2006) or Autobuild (Adams, P. D. et al. PHENIX: a comprehensive Python-based system for macromolecular structure solution. *Acta Crystallogr D Biol Crystallogr* 66, 213-21 (2010) was used as a starting model for manual building in COOT (Emsley, P. & Cowtan, K. Coot: model-building tools for molecular graphics. *Acta Crystallogr D Biol Crystallogr* 60, 2126-32 (2004) interspersed with refinement in Buster (version 2.10.3) (Smart, O. S. et al. Exploiting structure similarity in refinement: automated NCS and target-structure restraints in BUSTER. *Acta Crystallogr D Biol Crystallogr* 68, 368-80 (2012), which rendered a final model (Table 1) that had no Ramachandran outliers as assessed by MOLPROBITY (Lovell, S. C. et al. Structure validation by Calpha geometry: phi,psi and Cbeta deviation. Proteins 50, 437-50 (2003). Representative portions of the electron densities of the final cPPR-Telo1 and cPPR-Telo1/ssDNA models obtained are shown as stereo images in FIG. 2. Figures of the stereo images were prepared with PyMOL (Schrödinger) and structural alignments were performed using the secondary-structure matching (SSM) method.

TABLE 1

Data collection and refinement statistics

| | apo cPPR-Telo1 | cPPR-Telo1/ssDNA |
|---|---|---|
| Data collection | | |
| Space group | $P2_12_12_1$ | $P4_12_12$ |
| Cell dimensions | | |
| a, b, c (Å) | 86.4, 87.1, 91.6 | 114.8, 114.8, 83.5 |
| α, β, γ (°) | 90, 90, 90 | 90, 90, 90 |
| Resolution (Å) | 19.70-2.08 (2.15-2.08) | 27.41-1.95 (2.02-1.95) |
| $R_{merge}$ | 0.111 (1.306) | 0.0714 (1.823) |
| $CC_{1/2}$ | 0.998 (0.719) | 0.999 (0.742) |
| I/σ(I) | 9.92 (1.24) | 30.79 (2.23) |
| Completeness (%) | 96.62 (81.79) | 99.21 (99.63) |
| Redundancy | 10.5 (4.9) | 27.1 (28.7) |
| Refinement | | |
| Resolution (Å) | 19.70-2.08 (2.13-2.08) | 27.41-1.95 (2.0-1.95) |
| No. reflections | 40891 | 40921 |
| $R_{work}/R_{free}$ | 0.240/0.280 | 0.189/0.228 |
| No. atoms | | |
| Protein | 2683 | 2785 |
| DNA | | 210 |
| Water | 840 | 377 |
| B-factors | | |
| Protein | 26.10 | 29.27 |
| DNA | | 19.03 |
| Water | 44.88 | 41.41 |
| R.m.s. deviations | | |
| Bond lengths (Å) | 0.014 | 0.010 |
| Bond angles (°) | 1.67 | 1.01 |
| Ramachandran plot favored/allowed (%)[a] | 99.71/0.29 | 98.07/1.93 |
| Clashscore[a] | 2.93 | 3.17 |
| Molprobity score[a] | 1.58 | 1.5 |

Statistics for the highest-resolution shell are shown in parentheses.

[a]According to the definition used in Molprobity (Chen et al. (2010) MolProbity: all-atom structure validation for macromolecular crystallography. *Acta Crystallographica* D66: 12-21).

HEK293T cells were rotated for 1 h at 4° C. Protein G-agarose beads (50 μl of a 50% vol/vol slurry per ml lysate) were added and the suspension rotated for an additional 1 h at 4° C. The protein G suspension was collected in a 15 mm ID×200 mm L fritted glass column (BioRad) and washed with 5 column volumes of lysis buffer without DTT and PMSF. To elute the purified enzyme, 100 μl of 1 μM antigenic peptide (ARPAEEATSLEGALSGTRH) (SEQ ID NO: 8) in storage buffer (20 mM HEPES-KOH PH 7.9, 2 mM $MgCl_2$, 300 mM KCl, 1 mM DTT, 10% v/v glycerol and 0.1% v/v Triton X-100) was added per ml of lysate and incubated with shaking at room temperature for 1 h. The eluate was collected into a Protein Lo-Bind tube (Eppendorf), snap frozen in liquid nitrogen and stored at −80° C. The yield of telomerase enzyme complex was determined by dot blotting using a probe against hTR and western blot for hTERT using the DNA oligonucleotide probe 5'-32P-cggtggaaggcggcaggccgaggc-3' (SEQ ID NO: 41) for detection as described in Cohen, S. B. & Reddel, R. R. A sensitive direct human telomerase activity assay. *Nat. Methods* 5, 355-360 (2008) and Tomlinson, C. G. et al. Quantitative assays for measuring human telomerase activity and DNA binding properties. *Methods* 114, 85-95 (2017).

4. Direct Primer Extension Activity Assay.

Telomerase activity assays were performed as described in Tomlinson, C. G. et al. Quantitative assays for measuring human telomerase activity and DNA binding properties. Methods 114, 85-95 (2017). Briefly, immunopurified telomerase was incubated alone or in combination with cPPR-Telo1 protein, cPPR-Telo2 protein or enhanced green fluorescent protein (EGFP). Telomerase extension assay was performed at 37° C. for 4 h in 20 mM HEPES-KOH buffer, pH 8, 150 mM KCl, 2 mM $MgCl_2$, 0.1% vol/vol Triton X-100, 1 mM DTT, 100 nM primer, 1 mM dTTP, 1 mM dATP, 10 μM dGTP, and 20 μCi [α-32P] dGTP (PerkinElmer). The following primers were used:

```
Telo 14
                                        (SEQ ID NO: 9)
5'-biotin-ctagacctgtcatcattagggttagggtt,

Telo 16
                                       (SEQ ID NO: 10)
5'-biotin-ctagacctgtcatcattagggttagggttag,

Telo 18
                                       (SEQ ID NO: 11)
5'-biotin-ctagacctgtcatcattagggttagggttaggg,

Telo 20
                                       (SEQ ID NO: 12)
5'-biotin-ctagacctgtcatcattagggttagggttagggtt,.
```

Telomerase extension was quenched with addition of 200 μl of Stop Buffer (500 mM NaCl, 10 mM EDTA, 0.1% vol/vol Triton X-100) and transferred to micro-spin columns containing 40 μl Ultralink Neutravidin Plus beads slurry (Thermo Fisher) and rotated at room temperature for 2 hr. Non-biotinylated product was removed by centrifugation at 2,000×g for 10 s and the beads were washed three times in 500 μl of Stop Buffer with rotation for 10 min at room temperature followed by centrifugation at 2,000×g for 10 s. Residual Stop Buffer was removed with centrifugation at 2,000×g for 10 s. Telomerase extension products were released by addition of 30 μl of Denaturing Formamide Buffer (9 volumes of 90% vol/vol formamide, 10% TBE (90 mM Tris base, 90 mM boric acid, 1 mM EDTA), 0.01% wt/vol xylene cyanol and 0.01% wt/vol bromophenol blue to 1 volume buffer TE containing 5 mM biotin) heating at 95° C. for 10 min. 5 μl of each DNA sample was analysed by electrophoresis on a DNA sequencing gel run at a constant 75 W for 1 h. The gel was transferred to filter paper, dried for 30 min at 80° C., exposed to a Phosphor Imager screen (GE), and visualized on a Typhoon FLA9500 scanner.

5. Bind-n-Seq Analysis of Protein-ssDNA Specificity.

Target sequences of cPPR-Telo1 were determined using a modified version of the Bind-n-Seq method described in Zykovich, A., et al. (Zykovich, A., Korf, I. & Segal, D. J. Bind-n-Seq: high-throughput analysis of in vitro protein-DNA interactions using massively parallel sequencing. *Nucleic Acids Res.* 37, e151 (2009)). 100 nM of purified cPPR-Telo1 was combined with 50 μM ssDNA library oligonucleotide with the sequence: 5'-ctttatccagccctcacnnnnnnnnnnnctatagtgtcacctaaatc-3', (SEQ ID NO: 13) for 1 h in EMSA Buffer (10 mM HEPES, pH 8.0, 1 mM EDTA, 50 mM KCl, 2 mM DTT, 0.1 mg/ml fatty acid-free BSA and 0.02% Tween-20) with gentle rocking at room temperature. An aliquot was removed to serve as the unselected library. His Select Beads (Sigma) were added and the sample was incubated for 30 min at room temperature. Complexes were washed three times with EMSA Buffer for 10 min, once with Wash Buffer (50 mM Tris-HCl, pH 8.0, 0.3 M NaCl and 10 mM imidazole) and proteins were eluted in Elution Buffer (same as Wash Buffer but with 250 mM imidazole) for 10 min at room temperature. DNA was purified using Oligo Clean & Concentrator columns following the manufacturer's instructions (Zymo) and amplified by PCR using the following primers (with Illumina adaptor sequences shown in underline): 5'-tcgtcggcagcgtcagatgtgtataagagacagctt-tatccagccctcac-3' (SEQ ID NO: 14) and 5'-gtctcgtgggctcg-gagatgtgtataagagacag gatttaggtgacactatag-3' (SEQ ID NO: 15). PCR products were purified using Oligo Clean & Concentrator columns, following the manufacturer's instructions (Zymo), indexed and sequenced by the Australian Genomic Research Facility (Perth, Australia) on an Illumina MiSeq, according to the manufacturer's instructions. Paired-end reads were merged with bbmerge.sh (mininsert=0 mininsert0-0) from the BBTools suite v37.02 (website: jgi.doe.gov/data-and-tools/bbtools/), removing the adapters, and the merged reads were trimmed of 5' and 3' flanking sequences with cutadapt v1.1.4 (ctttatccagccctcac (SEQ ID NO: 42) ctatagtgtcacctaaatc (SEQ ID NO: 43)): Martin, M. Cutadapt removes adapter sequences from high-throughput sequencing reads. *EMBnet. Journal* 17, 10-12 (2011). Any trimmed reads not 10 nt in length were excluded using reformat.sh from BBTools (minlength=10 max-length=10) and these sequences searched for 10 nt motifs enriched relative to the control with DREME (–k 10-dna-norc): Bailey, T. L. DREME: motif discovery in transcription factor ChIP-seq data. *Bioinformatics* 27, 1653-9 (2011).

6. Data Availability

Crystallography datasets are available at the RCSB Protein Data Bank with accession numbers 5ORM (cPPR-Telo1) [website: dx.doi.org/10.2210/pdb5ORM/pdb] and 5ORQ (cPPRTelo1/ssDNA) [website: dx.doi.org/10.2210/pdb5ORQ/pdb]. The nucleotide sequence for cPPR-Telo1 is available at the NCBI Genbank database with accession code MH247127.

7. Quantitative Reverse Transcriptase PCR (qRT-PCR).

RNA was isolated from harvested mammalian cells using a Qiagen miRNeasy RNA extraction kit, according to the manufacturer's instructions. cDNA was synthesized using ThermoScript reverse transcriptase (Invitrogen) with random hexamers. Quantitative PCR reactions were performed using Platinum UDG SYBR Green Mastermix (Invitrogen) using a Rotor-Gene 3000 (Corbett Life Sciences) and normalized to 18S rRNA.

8. SDS-PAGE and Immunoblotting

Proteins were denatured in SDS loading buffer for 5 minutes at 95° C. and separated on a 10% Tris-glycine gels using a Bio-Rad Mini Protean System. Gels were electrotransfered onto 0.2 mm nitrocellulose using a BioRad Mini Trans-Blot system (100 V, 1 h) in transfer buffer (25 mM Tris-HCl, pH 8.3, 192 mM glycine, 20% methanol) and then blocked with Odyssey Blocking Buffer (Li-Cor) at room temperature for an hour. Anti-GFP antibody (Novus, 1:1000) was diluted in 5 ml Odyssey Blocking Buffer (Li-Cor) and added onto the blot. The blot was incubated overnight at 4° C. with gentle rocking. The blot was washed three times with PBST Solution (PBS and 0.05% Tween). IR Dye 800CW Goat Anti-Rabbit IgG (Li-Cor) secondary antibody was diluted in Odyssey Blocking Buffer. The secondary antibody binding was carried out for 1 hour at room temperature, followed by three 10 minutes washes in TPBS. Antibody-bound proteins were visualized using Odyssey Infrared Imaging System (Li-Cor). The primary antibody used in this study was anti-GFP antibody (Novus Biologicals) at 1:1,000 dilution. The secondary antibody used was IRDye 800CW goat anti-rabbit antibody (Li-Cor) at 1:10,000 dilution.

10. Tissue Culture and Plasmid Transfection of Mammalian Cells

HeLa human cervical cancer cells were cultured at 37° C. under humidified 95% air/5% CO2 in Dulbecco's modified Eagle's medium (DMEM, Invitrogen) containing glucose (4.5 g/1), 1 mM pyruvate, 2 mM glutamine, penicillin (100 U/ml), streptomycin sulfate (100 μg/ml) and 10% fetal bovine serum (FBS). Hela cells were plated at 80% confluence in 6-well plates and plasmids were transfected using Fugene HD (Roche). For stable clonal cell lines, 2 μg/ml puromycin was added to the culture medium and single cells were sorted onto 96-well plates two weeks after transfection based on sfGFP expression using FACS Aria Ill cell sorter (BD Biosciences).

11. Fluorescence Microscopy of Transfected Mammalian (HeLa) Cells

Transfected Hela cells were plated onto 13 mm diameter glass coverslips and allowed to attach overnight. Cells were fixed with 4% paraformaldehyde in PBS for 30 minutes and washed with PBS. Cells were then incubated with 10% FBS and 0.1% Triton X-100 prepared in PBS for 30 minutes to permeabilise cells and block non-specific sites. Staining was done using primary anti-RAP antibody (Sapphire Bioscience) and secondary anti-mouse Alexa. Cells were mounted in DABCO/PVA medium and images were acquired using a Nikon Ellipse Ti fluorescent inverted microscope using a Nikon 60× objective.

Example 2: Modular ssDNA Binding by Consensus PPR Proteins

In earlier work the inventors prepared synthetic consensus PPR (cPPR) proteins with robust RNA-binding properties and stabilities (Coquille, S. et al. An artificial PPR scaffold for programmable RNA recognition. *Nat Commun* 5, 5729 (2014)). In the work presented in this example, the inventors sought to examine nucleic acid-binding specificity of artificial cPPR proteins e.g., recombinant and/or synthetic cPPR proteins.

Typical cPPRs can optionally also consist of eight identical synthetic repeats flanked by an N-terminal cap consisting of Met-Gly-Asn-Ser (SEQ ID NO: 5), because statistically, Gly, Asn, and Ser have the highest propensities to occur at these N-terminal positions in a helices (FIG. 3*a* and FIG. 1): Richardson, J. S. & Richardson, D. C. Amino acid preferences for specific locations at the ends of alpha helices. *Science* 240, 1648-52 (1988). In addition, a C-terminal solvating helix can optionally be added after the final consensus repeat e.g., to prevent unfolding, according to the successful consensus tetratricopeptide repeat domain design of Main, E. R. et al. Design of stable alpha-helical arrays from an idealized TPR motif. *Structure* 11, 497-508 (2003).

Synthetic PPR proteins fold into solenoid structures like natural PPR proteins and a recent study from Shen et al. (Shen, C. et al. Structural basis for specific single-stranded RNA recognition by designer pentatricopeptide repeat proteins. *Nat Commun* 7, 11285 (2016)) showed that the synthetic PPR proteins wrap around their RNA targets (FIG. 1*b*). However a molecular explanation for any potential discrimination between RNA and ssDNA is lacking.

Figure 3:
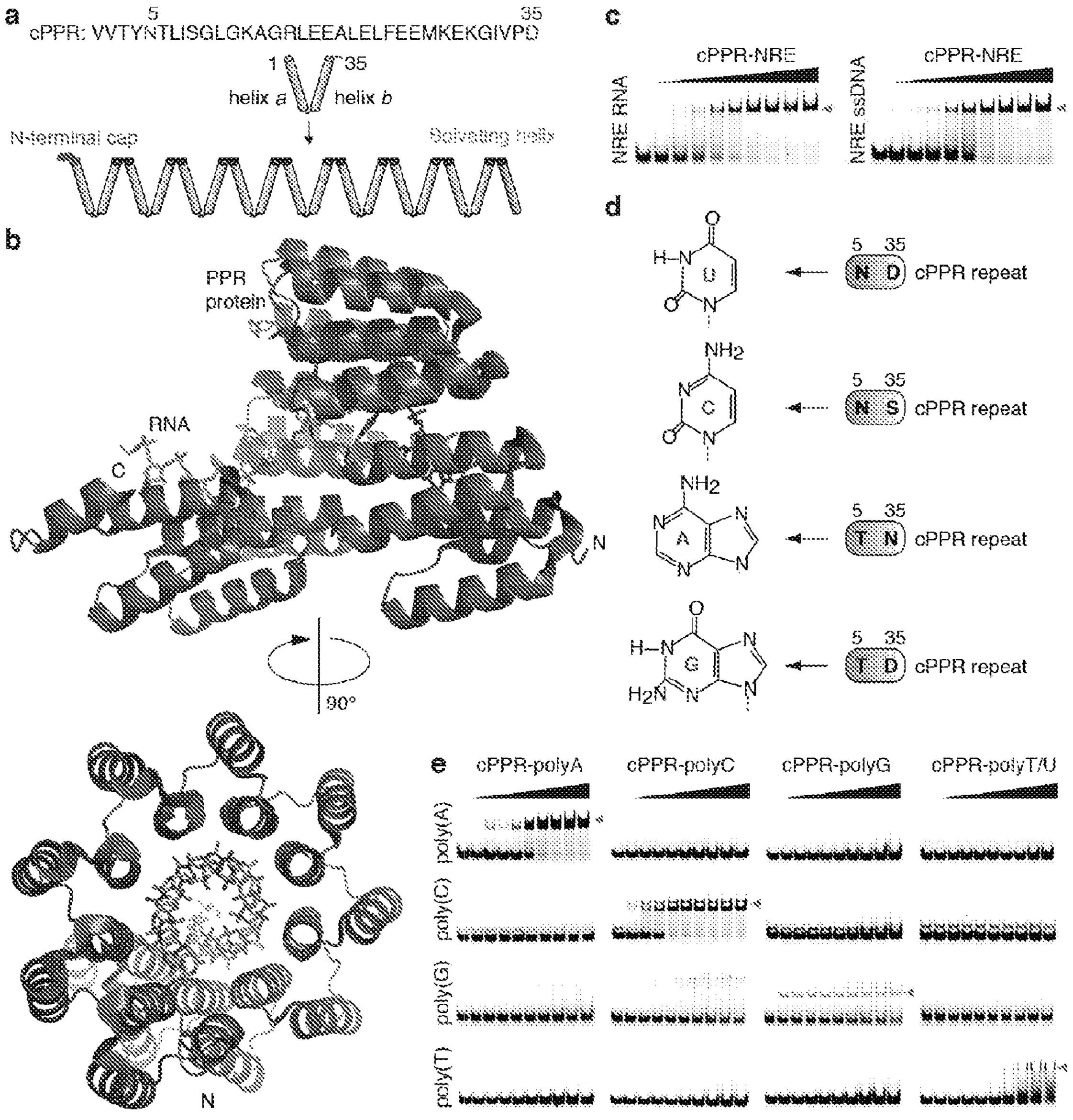
FIG. 3 shows that consensus pentatricopeptide repeat (cPPR) proteins according to the present invention bind ssDNA. (a) Shows the the consensus PPR sequence (VVTYNTLISGLGKAGRLEEALELFEEMKEKGIVPD (SEQ ID NO: 4)) and its assembly into a repeat protein optionally flanked by stabilizing elements such as N-terminal cap and/or C-terminal solvating helix. Annotation of the PPR sequence is based on the numbering scheme of Yin, P. et al. (Yin, P. et al. Structural basis for the modular recognition of single-stranded RNA by PPR proteins. *Nature* 504, 168-71 (2013)). (b) Shows a crystal structure of a designer PPR protein bound to its RNA target. Structure determined by Shen, C. et al. Structural basis for specific single-stranded RNA recognition by designer pentatricopeptide repeat proteins. *Nat Commun* 7, 11285 (2016). (c) Shows results of electrophoretic mobility shift assays (EMSA) of the cPPR-NRE using RNA and ssDNA nano response element (NRE) probes. Bound complexes are highlighted with red arrows. Protein concentrations used were, from left to right: 0, 0.15 μM, 0.3 μM, 0.5 μM, 1 μM, 2 μM, 4 μM, 6 μM, 8 μM, 10 μM. (d) Shows the modular PPR code for RNA binding. Amino acids at positions 5 and 35 of each cPPR repeat recognise specific RNA bases. (e) Purified proteins were titrated against homopolymeric ssDNA probes in a DNA EMSA. Complexes formed between predicted cognate ssDNA-protein pairs are indicated with red arrows and demonstrate that high specificity of each cPPR protein for its cognate ssDNA target. Protein concentrations used were, from left to right: 0, 0.15 μM, 0.3 μM, 0.5 μM, 1 μM, 2 μM, 4 μM, 6 μM, 8 μM, 10 μM.
Figure 4:
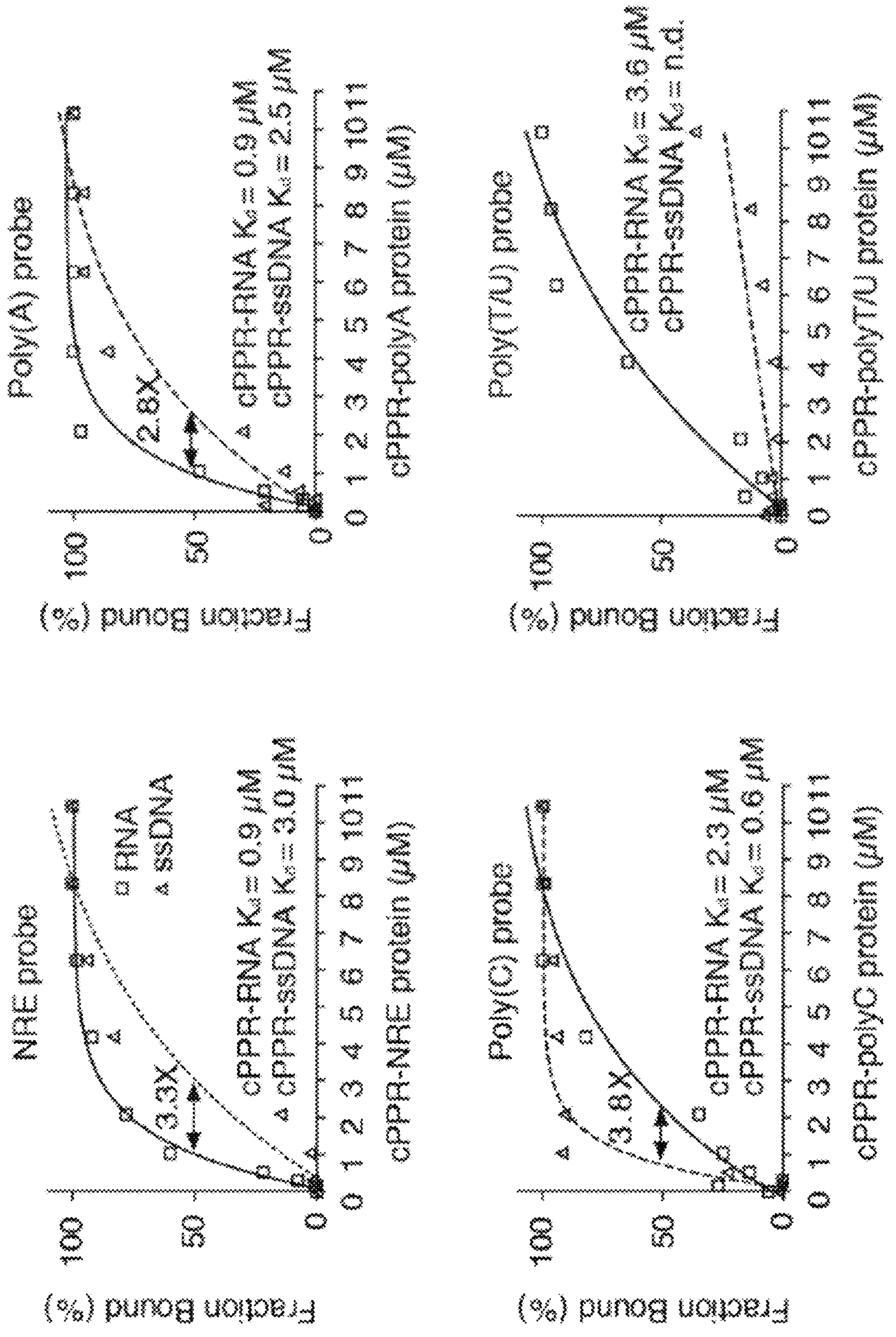
FIG. 4 shows cPPR proteins of the present invention bind ssDNA and RNA. Equilibrium binding curves for cPPR-NRE, cPPR-polyA, cPPR-polyC and cPPR-polyU/T. The lines represent theoretical binding curves fit to the data for cPPR-RNA binding and cPPR-ssDNA binding shown as squares and triangles, respectively. Kd values and the ratio of the Kd are indicated.

The inventors initially tested a cPPR protein designed to bind a naturally occurring RNA sequence known as the Nanos response element (NRE). It was found that this cPPR bound tightly to a ssDNA NRE oligonucleotide as well as an RNA NRE oligonucleotide (FIG. 3*c*). Surprisingly, the affinity was only ~3-fold reduced between ssDNA and RNA (FIG. 3*c* and FIG. 4). Based on bioinformatics predictions the inventors identified particular amino acids at positions 5 and 35 of our cPPR that enable the specific recognition of individual RNA bases. Although the NRE targeting cPPR bound ssDNA, it was not clear if it bound the ssDNA specifically according to the PPR code. Therefore, the inventors produced four different cPPR proteins designed to bind homopolymers of adenine, cytosine, guanine or uracil and tested their binding using ssDNA homopolymers (FIG. 3D).

The results obtained demonstrated that the binding of ssDNA homopolymers conformed to the specific code for base recognition established previously for RNA (FIG. 3*e*). The binding of poly (A) ssDNA was slightly reduced compared to poly (A) RNA, while binding to poly (C) ssDNA was actually slightly better than for poly (C) RNA (FIG. 4). Exact binding affinities for poly (G) ssDNA and RNA were difficult to determine, likely due to the propensity of poly (G) tracts to form G-quadruplex structures. Interestingly, binding to poly (T) ssDNA was reduced compared to poly (U), possibly due to the additional methyl group on the thymine base relative to uracil. Therefore, the results provided herein establish that the code for base recognition by PPRs is maintained when binding ssDNA targets, thereby opening the way for the use of cPPRs to target ssDNAs in a designed and programmable manner.

Example 3: Inhibition of Human Telomerase by Designed cPPR Proteins

Figures 5A, 5B, 5C, 5D, 5E:
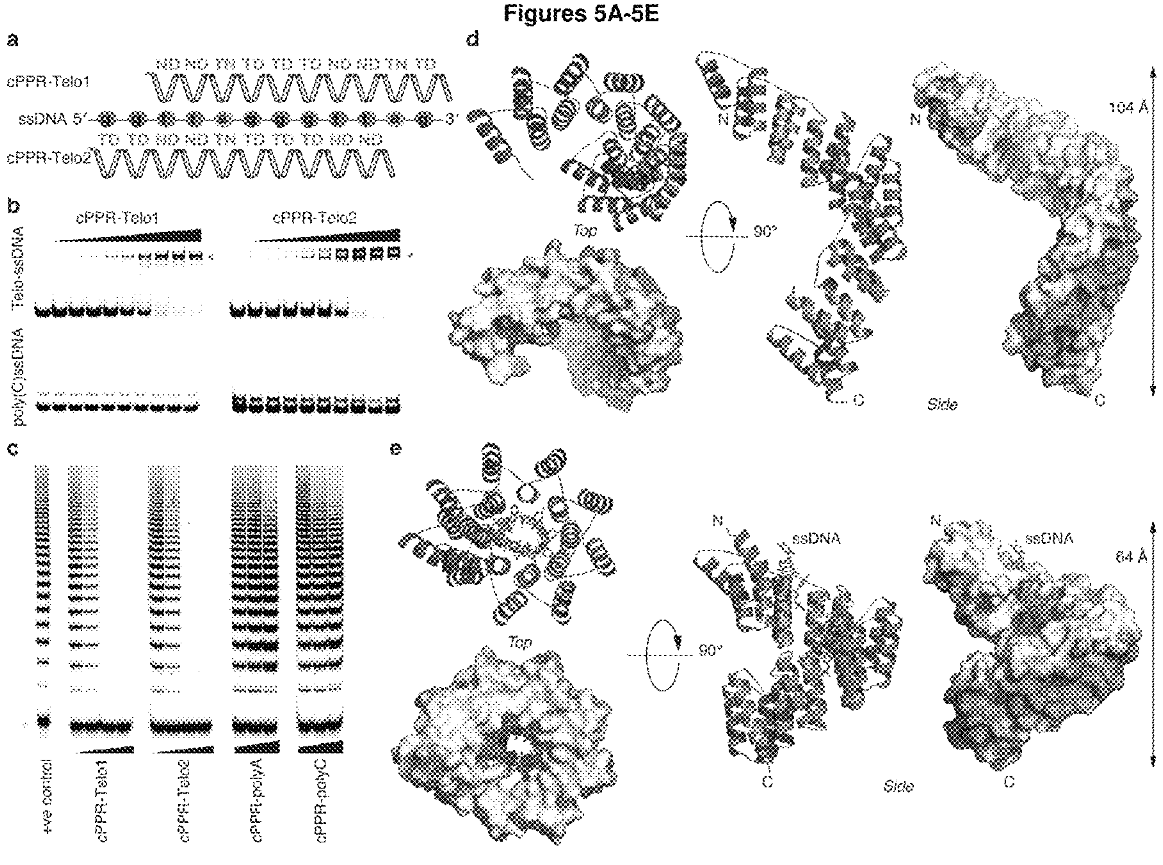
FIG. 5 demonstrates that cPPRs proteins which were designed according to the present invention are able to bind to telomeric ssDNA sequences. (a) Shows a cartoon depicting the design and binding sites of cPPR-Telo1 and cPPR-Telo2. The amino acids at positions 5 and 35 of each repeat in the 10-repeat cPPRs are shown in red. The ssDNA probe (ggttagggttag (SEQ ID NO: 44)) is derived from the repeating telomeric DNA sequence and contains the binding sites for both cPPR-Telo1 and cPPR-Telo2. As shown, cPPR-Telo1 binds to 5'-ttagggttag-3' (SEQ ID NO: 40) and cPPR-Telo2 binds to 5'-ggttagggtt-3' (SEQ ID NO: 51). (b) Shows ssDNA EMSA using Telo-ssDNA or poly (C) ssDNA (control). ssDNA-protein complexes are highlighted with red arrows. Protein concentrations used were, from left to right: 0, 0.15 μM, 0.3 μM, 0.5 μM, 1 μM, 2 μM, 4 μM, 6 μM, 8 μM, 10 μM. (c) Shows inhibition of telomerase extension by telomere-targeting cPPRs in telomerase activity assays with immunopurified telomerase and a primer incorporating 18 nucleotides (nt) of telomeric sequence. Increasing concentrations of cPPR-Telo1 and cPPR-Telo2 (50 nM, 100 nM, 200 nM, and 300 nM) were added to the indicated reactions and cPPR-polyA and cPPR-polyC (300 nM, 1 μM, and 3 μM) were used as control proteins. The red asterisk indicates a 30-mer 5'-$^{32}$P-labelled recovery/loading control. (d) Overall three-dimensional structure of cPPR-Telo1, shown in cartoon representation coloured in rainbow colours with blue at the N-terminus and red at the C-terminus. The surface charge distribution is coloured according to the local electrostatic potential (blue, +5 KT; red −5 kT). (e) Shows the structure of cPPR-Telo1 in complex with DNA, which is shown as orange or yellow sticks.
Figure 6:
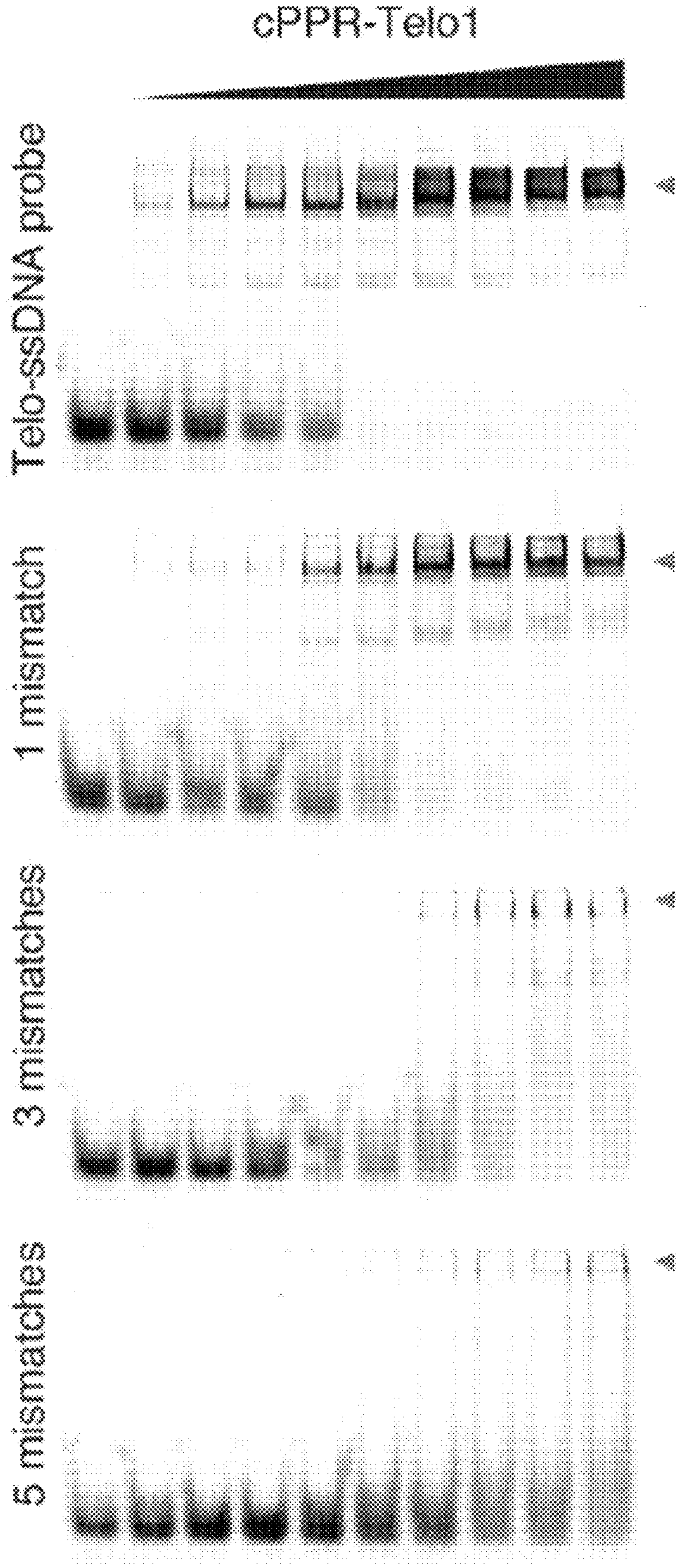
FIG. 6 demonstrates that cPPR-Telo1 prepared according to the present invention binds to telomeric ssDNA sequences in highly specific manner. (a) EMSA analyses of cPPR-Telo1 binding to telomeric ssDNA probes with variable numbers of base mismatches. Bound complexes are highlighted with red arrows. Protein concentrations used were, from left to right: 0, 0.15 μM, 0.3 μM, 0.5 μM, 1 μM, 2 μM, 4 μM, 6 μM, 8 μM, 10 μM.
Figure 7:
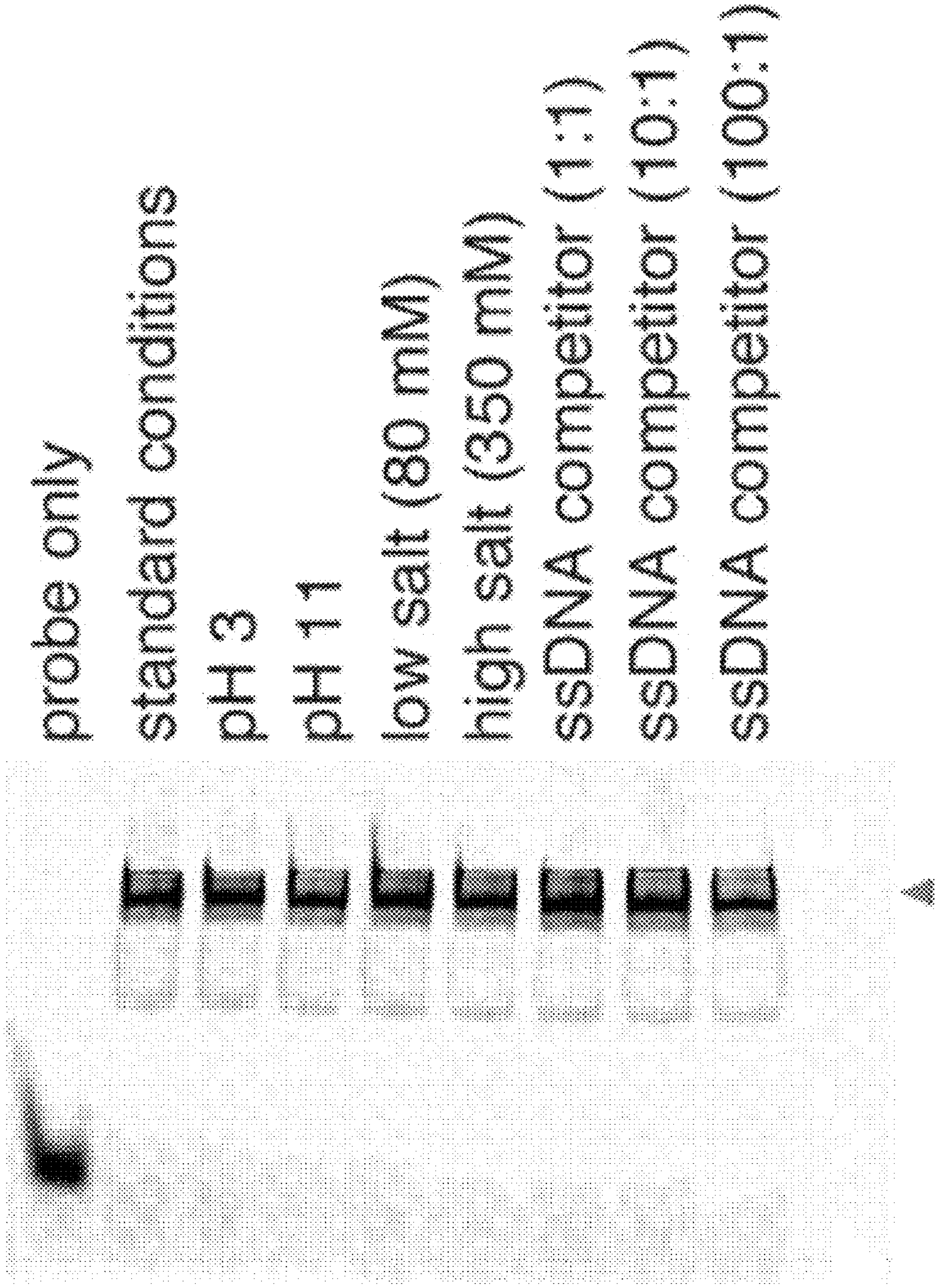
FIG. 7 demonstrates robust binding of cPPR-Telo1 proteins prepared according to the present invention to ssDNA in the presence of variable salt concentrations, pH, and competitor ssDNA. The standard EMSA reaction contain 5 μM cPPR-Telo1, 0.42 μM telomeric ssDNA probe, 105 mM salt, pH 7. Test reactions have altered buffers with low salt (80 mM), high salt (350 mM), pH 3, pH 11, and increasing amounts of competitor ssDNA (1:1, 10:1, and 100:1 ratios of competitor to telomeric DNA probe). Bound complexes are highlighted with a red arrow.
Figures 8A, 8B:
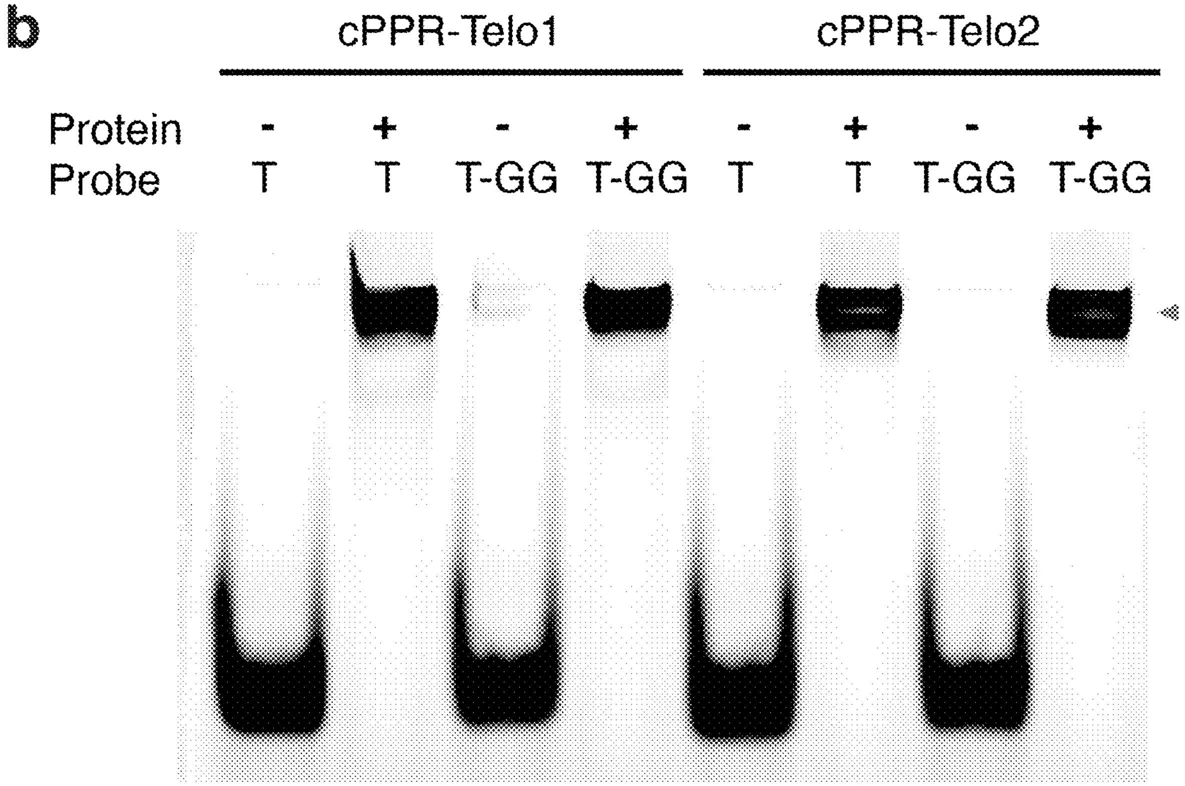
FIG. 8 demonstrates that cPPR proteins bind ssDNA independent of potential G-quadruplexes. (a) Shows sequences of Telo-ssDNA (ttagggttagggttaggg (SEQ ID NO: 45)) and Telo-ssDNA-GG (ggttagggttagggttaggg (SEQ ID NO: 46)). Telo-ssDNA-GG is the same as Telo-ssDNA except that it contains two additional G nucleotides at the 5'-end. (b) Shows native gel analysis of 100 nM ssDNA in the presence (+) or absence (−) of 333 nM cPPR-Telo1, cPPR-Telo2 or control cPPR-polyC. Bound complexes are highlighted with a red arrow.

Next, the inventors sought to determine if cPPRs could be designed to target biologically relevant ssDNA targets and focused on the repeating telomeric ssDNA sequences of mammalian cells. The inventors designed two cPPRs targeting staggered sequences within the telomeric repeats (FIG. 5*a* and FIG. 1*b*). In analogy to POT1, the inventors choose to build cPPRs consisting of 10 repeats to match the length of the POT1 recognition sequence. Both telomere targeting cPPRs, dubbed cPPR-Telo1 and cPPR-Telo2, bound telomeric ssDNA sequences with high affinity and specificity, as determined by binding assays with off-target ssDNAs (FIG. 5B and Figure. 6). Binding to ssDNA was robust in the presence of variable pH, salt concentrations, and in the presence of non-specific competitor ssDNA (FIG. 7). Furthermore, the inventors compared the ability of cPPR-Telo1 and cPPR-Telo2 to bind ssDNA in G-quadruplex structures by comparing binding to two targets, where one could form a G-quadruplex structure and the other could not. Both designed proteins could bind efficiently independent of potential formation of a G-quadruplex (FIG. 8), which is important since telomeric ssDNA is known for its ability to form robust G-quadruplexes.

Figure 9:
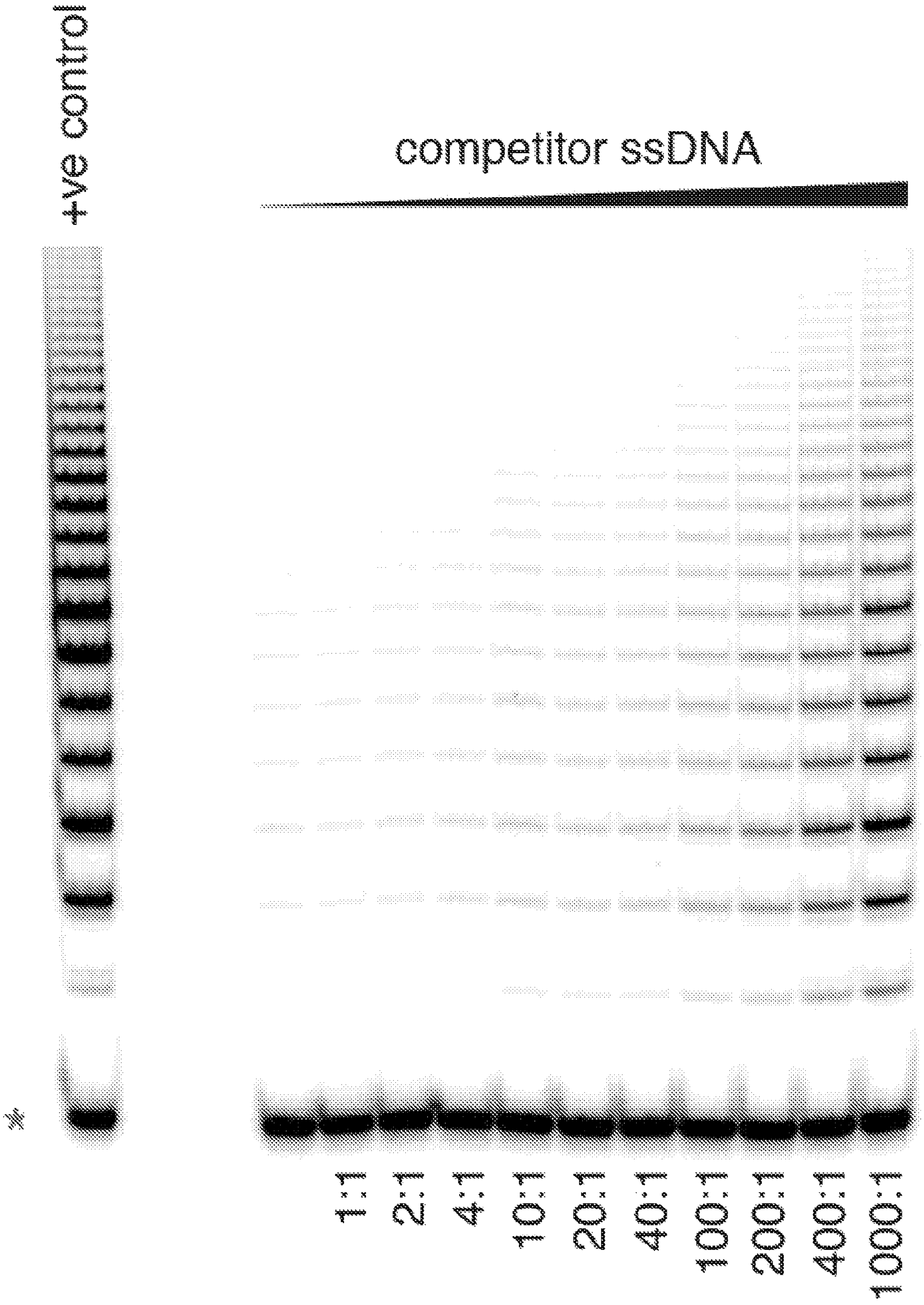
FIG. 9 shows robust inhibition of telomerase activity by cPPR-Telo1 in the presence of competitor ssDNA. A non-specific competitor ssDNA derived from the 15 nucleotides of spacer DNA of the telomerase extension assay substrate was added in increasing ratios relative to telomeric ssDNA substrate. The red asterisk indicates a 30-mer 5'-$^{32}$P-labelled recovery/loading control.

The extension of telomeric ssDNA by telomerase was used as a model system to examine whether cPPRs could modulate ssDNA function. To this end, direct telomerase extension assays (Cohen, S. B. & Reddel, R. R. A sensitive direct human telomerase activity assay. Nat Methods 5, 355-60 (2008)) were performed using human telomerase over-expressed and assembled in HEK-293T cells and it was examined whether the specific binding of the telomeric ssDNA by cPPR-Telo1 and cPPR-Telo2 could modulate telomerase activity. As demonstrated in FIG. 5*c*, the inventors found that both designed cPPRs effectively blocked telomerase activity in a dose-dependent manner, while control cPPR proteins had no effect (see FIG. 5*c*). Furthermore, inhibition of telomerase extension was maintained even when non-specific competitor ssDNA was present in orders of magnitude excess (FIG. 9).

Figure 10A:
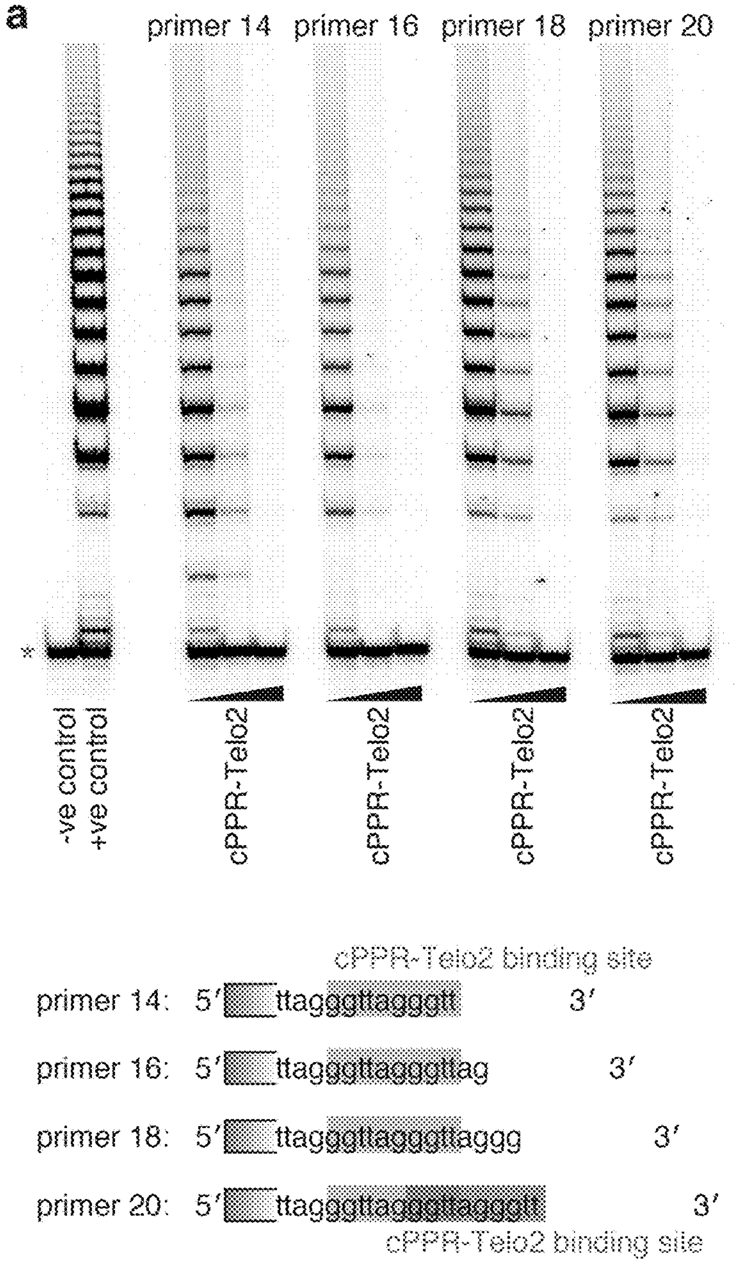
FIG. 10 shows mode of telomerase inhibition by cPPR proteins. (a) shows results of telomerase activity assays with primers incorporating varying lengths of telomeric sequence and increasing concentrations of cPPR-Telo2 (200 nM and 300 nM). The red asterisk indicates a 30-mer 5'-$^{32}$P-labelled recovery/loading control; primers 14, 16, 18 and 20 are ttagggttagggtt (SEQ ID NO: 47), ttagggttagggttag (SEQ ID NO: 48), ttagggttagggttaggg (SEQ ID NO: 49), ttagggttagggttagggtt (SEQ ID NO: 50) respectively. (b) provides results demonstrating that cPPR-Telo2 protects its ssDNA target from DNase I digestion.
Figure 10B:

The position of the POT1 binding site relative to the 3' end of the ssDNA template were shown to have a dramatic effect on telomerase activity, with 3' end binding blocking telomerase extension and internal binding stimulating the processivity of telomerase. To examine whether these effects were an inherent property of POT1 or resulted simply from the locations of protein binding the inventors tested the ability of cPPR-Telo2 to modulate the extension of telomerase on a variety of different primers where the binding locations were at varied distances from the 3' end of the ssDNA. As shown in the results demonstrated in FIG. 10, the inventors found that cPPR-Telo2 blocked telomerase activity regardless of its binding location, indicating that the multiple regulatory modes of POT1 are idiosyncratic to that particular protein (FIG. 10*a*). The inventors reasoned that this likely results from the cPPR's ability to block access of telomerase to ssDNA, since the inventors also found that cPPR-Telo2 could protect its ssDNA target from DNase I digestion (FIG. 10*b*).

Example 4: Structure of a Telomeric ssDNA-Bound cPPR Protein

Next, the inventors sought to obtain structural information on the two cPPR proteins prepared according to the present invention which were specifically designed to bind to telomeric ssDNA sequences (i.e., cPPR-Telo1 and cPPR-Telo1), to understand further the cPPR scaffold's ability to bind both ssDNA and RNA. Although these proteins were highly similar in their primary sequences, only cPPR-Telo1 gave reproducible and diffracting crystals. The inventors solved the structure of cPPR-Telo1 and cPPR-Telo1 bound to its ssDNA target using single-wavelength anomalous dispersion at 2.1 Å and 2.0 Å resolution, respectively (Table 1, with sample electron densities in FIG. 2). As demonstrated, the cPPR-Telo1 protein adopted an overall fold that closely mimicked other designed PPR structures (FIG. 4*d-e*), where the two helices of each repeat, helix a and helix b, form a hairpin and these hairpins stack upon each other to form a right-handed superhelix: Coquille, S. et al. An artificial PPR scaffold for programmable RNA recognition. *Nat Commun* 5, 5729 (2014); and Shen, C. et al. Structural basis for specific single-stranded RNA recognition by designer pentatricopeptide repeat proteins. *Nat Commun* 7, 11285 (2016); and Gully, B. S. et al. The design and structural characterization of a synthetic pentatricopeptide repeat protein. *Acta Crystallogr D Biol Crystallogr* 71, 196-208 (2015). Mapping the electrostatic potential revealed a highly asymmetrical surface charge distribution with positively charged residues in the ssDNA-binding cavity and a negatively charged band along the exterior, exposed face of the superhelix (FIG. 4*d-e*). The inventors reasoned that this charge distribution might provide the initial driving force for nucleic acids to bind the PPR proteins, based on their negatively charged phosphate backbones.

Figure 11:
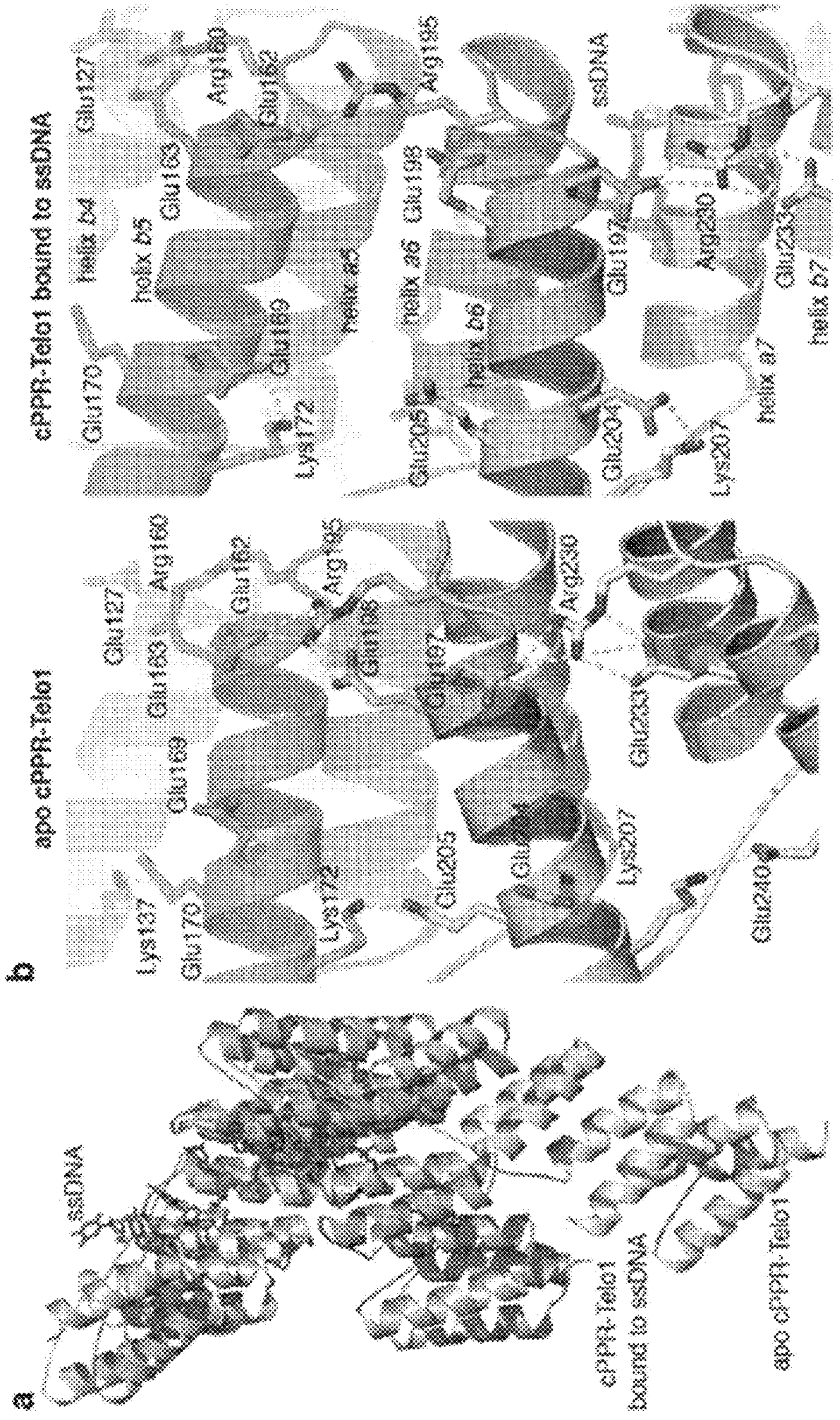
FIG. 11 shows an altered hydrogen bond network enables compaction of PPRs upon ssDNA binding. (a) Shows a structural comparison of apo cPPR-Telo1 alone (wheat colour) and in complex with ssDNA (grey colour). (b) Shows altered hydrogen bond network between b helices of cPPR-Telo1 upon ssDNA binding. Amino acids participating in hydrogen bond rearrangements are shown as sticks and hydrogen bonds are shown with dashes. Arg160, Arg195 and Arg230 correspond to Arg16 in the standardised annotation of PPR motifs based on the numbering scheme of Yin et al. (Yin, P. et al. Structural basis for the modular recognition of single-stranded RNA by PPR proteins. *Nature* 504, 168-171 (2013)); Glu162 and Glu197 to Glu18; Glu163, Glu198 and Glu233 to Glu19; Glu169 and Glu204 to Glu25; Lys137, Lys172 and Lys 207 to Lys28; and Glu170, Glu205, and Glu240 to Glu29.

The structures resolves by the inventors as discussed above provide the first pair of structures where an identical PPR protein compacts upon binding a nucleic acid in the canonical, sequence-specific mode, providing an opportunity to understand how the conformation of the protein changes upon ligand binding. cPPR-Telo1 wraps around the ssDNA upon binding, inducing a massive compaction of the superhelical structure and decreasing the length of the protein from 104 to 64 Å (FIG. 4*d-e*, FIG. 11*a*). This conformational change more than halves the number of cPPR protein side chains exposed to water and may be the principal driving force favouring nucleic acid binding. Overall the rearrangement is based on the a helices on the concave side of the protein moving into closer proximity as bonds are formed to the DNA with a concomitant separation of the b helices on the convex side. To allow the separation, an extensive hydrogen bond network between an arginine at position 16 and a glutamic acid at position 19 from one PPR repeat and a glutamic acid at position 18 from the preceding repeat in the apo protein rearranges at three out of nine possible positions leading to a more open arrangement when bound to DNA (FIG. 11*b*). Specifically, the side chains of Glu128, Glu198 and Glu303 form hydrogen bonds to their own main chain instead of to Arg125, Arg195 and Arg300, respectively. In addition, a hydrogen bond between a lysine at position 28 in each repeat and a glutamic acid at position 26 of the succeeding repeat switches to an intra-helix hydrogen bond interaction between this lysine and a nearby glutamic acid at position 25 (FIG. 11*b*). As shown in FIG. 11, these and other changes in van der Waals interactions produce conformational variations that were amplified over the entire cPPR, resulting in the notable compression of the protein superhelix (FIG. 11*a*).

Example 5: Interactions Between cPPR-Telo1 and ssDNA

Figure 12:
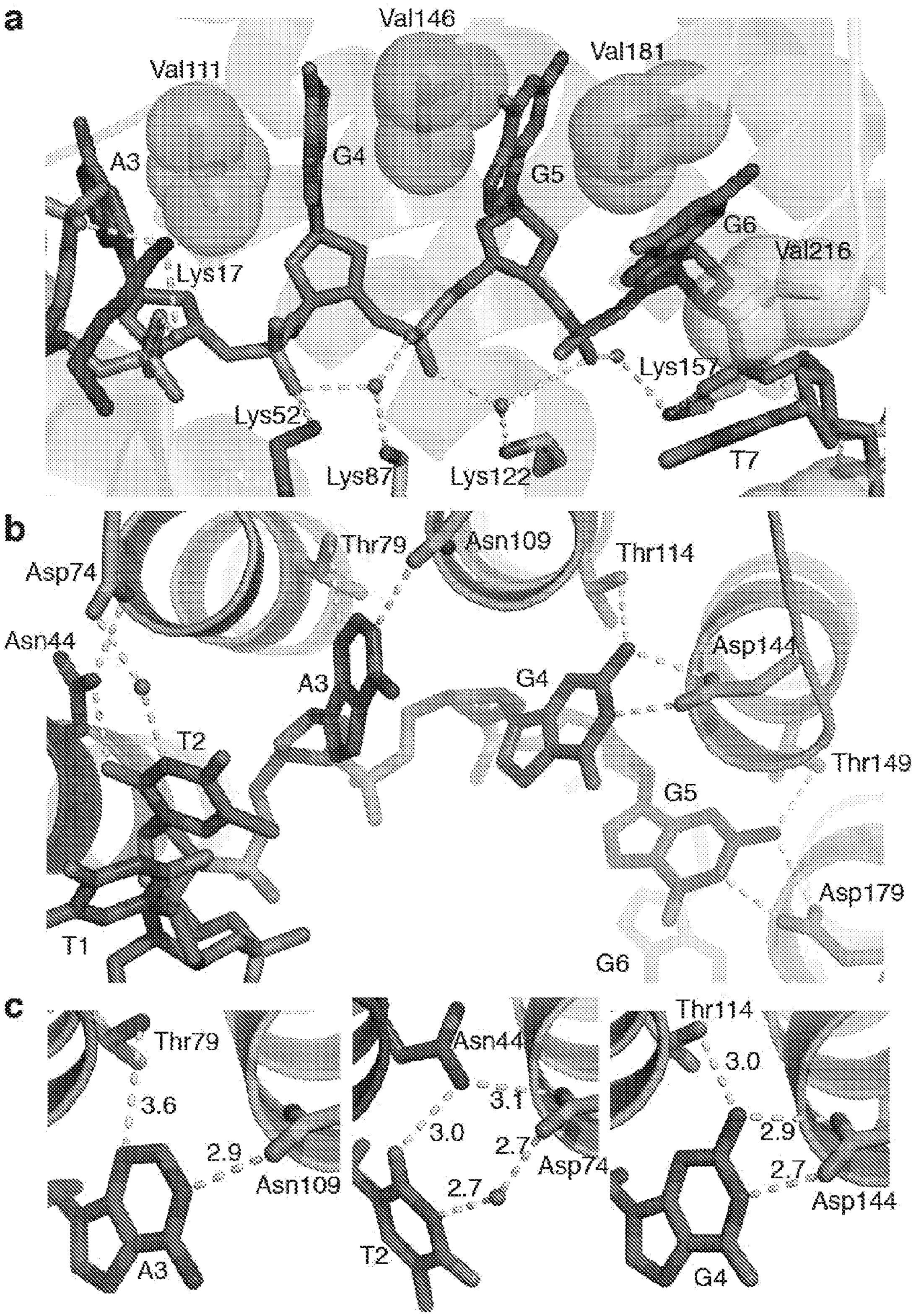
FIG. 12 Provides a three-dimensional schematic pictorial representations showing protein-ssDNA interactions of cPPR-Telo1. (a) Non-specific protein-DNA interactions. Stacking valines are shown as sticks and spheres and interacting polar residues and ssDNA are shown as sticks. Hydrogen bonds are shown with dashes. (b) Specific protein-ssDNA interactions. (c) Nucleotide base recognition by cPPR-Telo1 according to the PPR code. Interacting polar residues of cPPR-Telo1 and adenine (A), thymine (T), and guanine (G) are shown as sticks. Hydrogen bonds are shown with dashes and distances in Å are indicated.

Specific recognition of RNA by PPR proteins was found to occur via hydrogen bonding between the side chains of residues at positions 5 and 35 of each PPR motif and the Watson-Crick faces of the nucleotide bases. The amino acid at position 5 forms direct hydrogen bonds with the RNA base, while the amino acid at position 35 directly bonds with purine bases but makes a water-mediated interaction in the case of pyrimidines. As demonstrated in FIG. 12, the same binding mode was observed in the cPPR-ssDNA structure illuminated by the present invention and likewise the bases were sandwiched between the valine residues at position 2 of each repeat (FIG. 12*a*). Furthermore, the phosphate backbone of the ssDNA was found to be bound by lysine residues at position 13 of each repeat (FIG. 12*a*), as had been observed previously for RNA (Coquille, S. et al. An artificial PPR scaffold for programmable RNA recognition. *Nat. Commun.* 5, 5729 (2014); and Shen, C. et al. Structural basis for specific single-stranded RNA recognition by designer pentatricopeptide repeat proteins. *Nat. Commun.* 7, 11285 (2016)). The conserved modes of cPPR-base recognition between RNA and ssDNA are reflected in cPPR-Telo1's ability to bind both ssDNA and RNA (FIG. 5*b*). Interestingly, the hydrogen bond between the threonine at position 5 and adenine is rather long (3.6-3.9 Å), compared to when threonine in this position binds guanine (2.9-3.1 Å), which appears to be more ideal (FIG. 12*c*). This phenomenon is also true in the structures of designed PPR proteins in complex with RNA but if another residue at position 5 might be more efficient in the binding of adenine, or whether this arrangement is advantageous for some reason remains to be determined.

Figure 13:
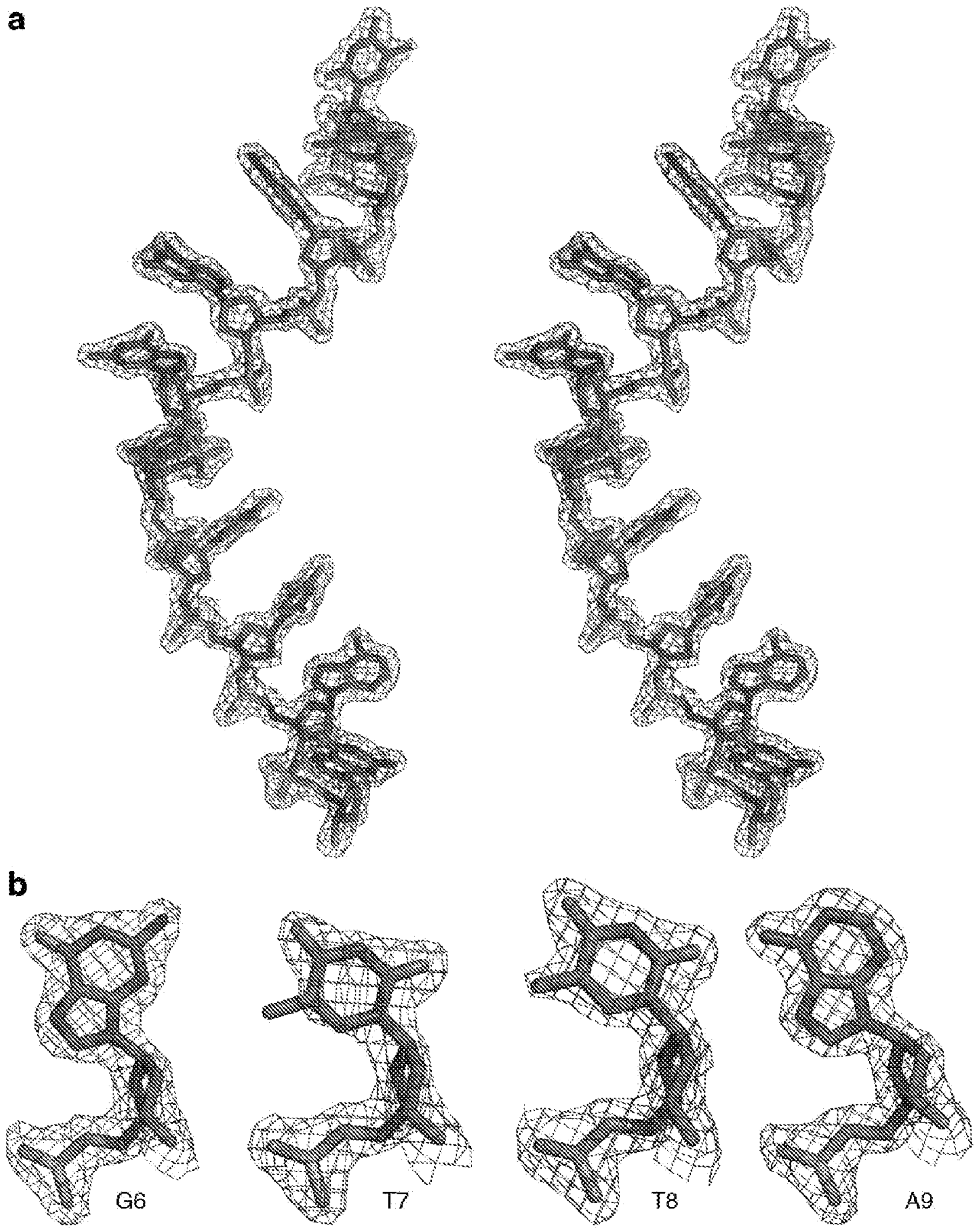
FIG. 13 shows electron density stereo images of the cPPR-bound ssDNA. (a) image showing the final weighted $2F_O$-$F_C$ electron density map of the DNA contoured at 1.6 σ. Residues are shown as red sticks and map in grey mesh. (b) Guanine (G), thymine (T), and adenine (A) nucleobases shown as red sticks and the final weighted $2F_O$-$F_C$ electron density map contoured at 1.6 σ in grey mesh.

In the case of uracil recognition in PPR-RNA complexes, the amide group of the asparagine side chain at position 5 donated a hydrogen bond to the $O_2$ of the pyrimidine ring, while the carboxyl group of the aspartate made a water-mediated hydrogen bond with the N3 of the pyrimidine. An identical mode of thymine recognition was seen in our structure when ssDNA was bound and the methyl group at position C5 that distinguishes uracil and thymine was orientated away from the protein (FIG. 12*a-c*), such that it was initially hard to predict why poly (T) ssDNA was bound less efficiently than poly (U) RNA, based on this difference. However, the C5 methyl groups likely altered the hydration pattern of the backbone and could have also altered the stacking energies between bases, and thereby affect the dynamics of the RNA-protein interaction. Support for this hypothesis comes from the observation that although the electron density was very clear for all nucleotides, it was weaker for one of the thymines (T7) in the structure (FIG. 13). T7 sits adjacent to another thymine (T8) and the altered stacking energy between these bases might contribute to the observed flexibility at that position. Although tolerated well, or to some extent, when there was an isolated thymine or a pair of thymines in the ssDNA target, respectively, it could be that the additive disruption in stacking energies caused poly (T) tracts to bind poorly to cPPR proteins (as seen in FIG. 3 and FIG. 4).

Figures 14A, 14B, 14C, 14D, 14E:
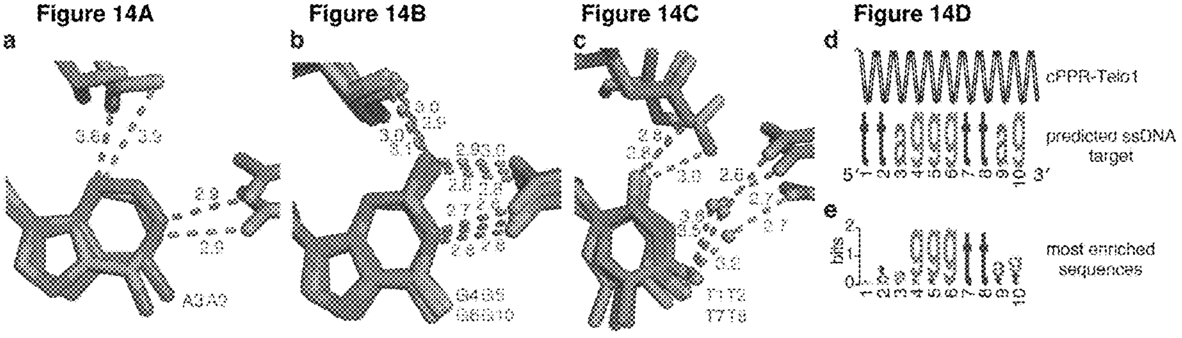
FIG. 14 shows recognition of ssDNA bases (ttagggttag (SEQ ID NO: 40) across the length of the artificial PPR protein. (a) Recognition of adenines at positions 3 and 9. (b) Recognition of guanines at positions 4, 5, 6 and 10. (c) Recognition of thymines at positions 1, 2, 7 and 8. Hydrogen bonds are shown with dashes and distances in Å are indicated. (d) Bind-n-Seq analysis of cPPR-Telo1 protein ssDNA-binding specificity, compared to its designed target. (e) Is a logo representing the most enriched sequences (1127 in total, all with E-values >8.6e-18) found in the cPPR-Telo1-bound ssDNA library, as determined by discriminative regular expression motif elicitation (performed as described in Bailey, T. L. DREME: motif discovery in transcription factor ChIP-seq data. *Bioinformatics* 27, 1653-1659 (2011)). No significantly enriched motifs were found in a matched unselected library.
Figure 15:
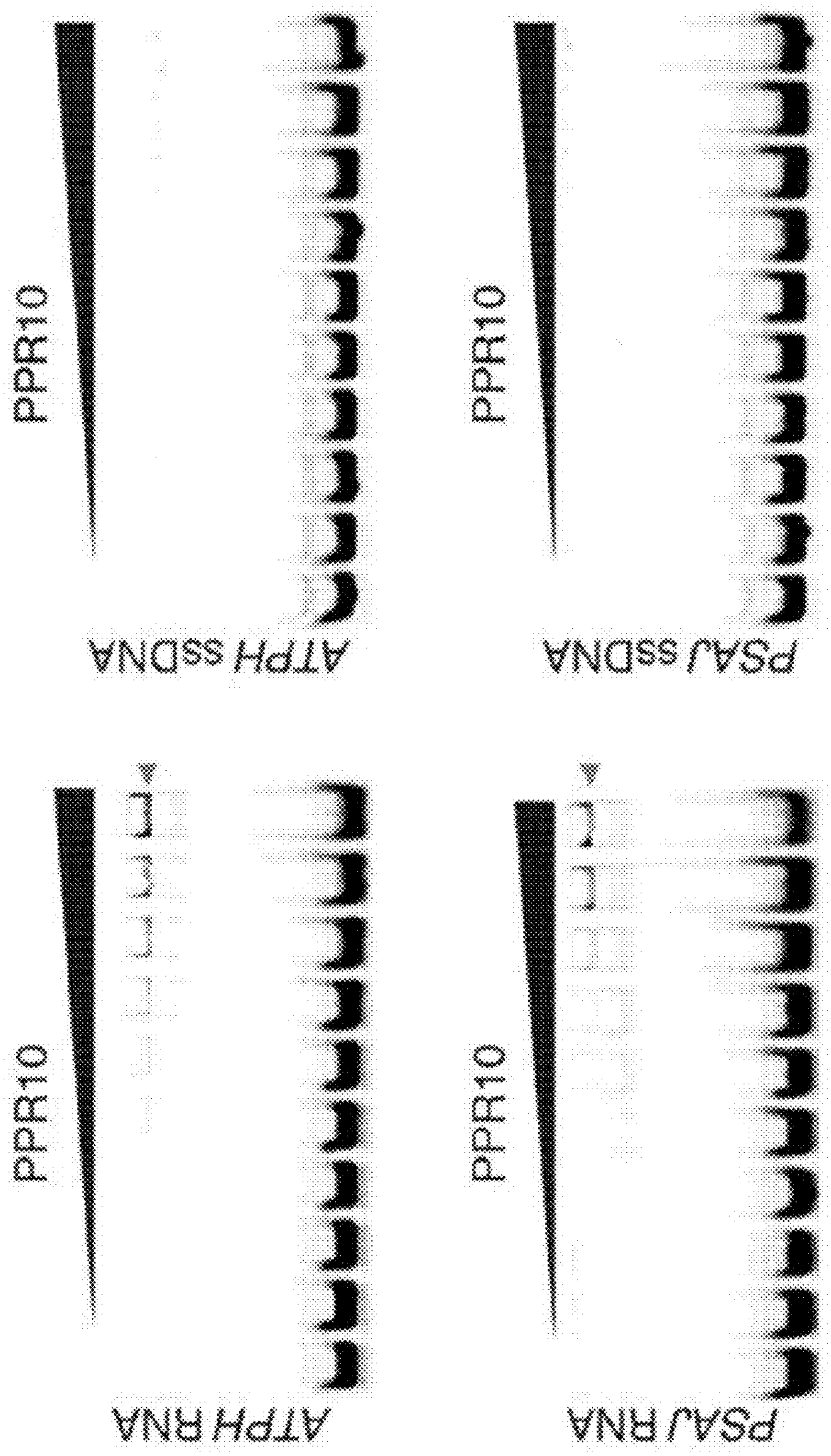
FIG. 15 shows EMSA analyses of PPR10 binding of PSAJ and ATPH ssDNA and RNA probes. Bound complexes are highlighted with red arrows. The results demonstrate that PPR10 does not bind ssDNA.

Comparing of the recognition of bases by each of the 10 PPRs revealed that the hydrogen bonding was very similar within each type of base. This included the long hydrogen bond between the threonine at position 5 and adenine (FIG. 14*a*), the compact hydrogen bonding network recognising guanine (FIG. 14*b*), and the water-mediated hydrogen bonds recognising thymines (FIG. 14*c*). One interesting exception was the thymine at position 1, which did not make any specific hydrogen bonds with the protein in the inventors' resolved structure.

To further examine this observation and the specificity of base recognition at all positions in cPPR-Telo1, a comprehensive Bind-n-Seq analysis using a randomised ssDNA target sequence was performed (FIG. 14*d-e*). The inventors found significant enrichment of the predicted base at each position in the selected library, further demonstrating the specificity of cPPRs for ssDNA, however the enrichment of thymine at position 1 was less than the other positions. Therefore, the inventors reasoned that the thymine at position 1 might be in a dynamic equilibrium between bound and unbound states. An examination of the binding of RNA to designer PPR proteins found that the terminal positions in the target nucleic acids made the least contribution to the binding affinities of these complexes: Yin, P. et al. Structural basis for the modular recognition of single-stranded RNA by PPR proteins. *Nature* 504, 168-71 (2013). The inventors' data as outlined in this examples show that this observation holds for ssDNA and also provide structural evidence for this effect.

Example 6—Expression of cPPRs in Mammalian Cells

This example demonstrates that cPPR proteins may be difficult to express in mammalian cells. As demonstrated herein the inventors' first attempts at establishing a cPPR-based system for manipulating ssDNA and/or RNA in mammalian cells were unsuccessful and resulted in lack of cPPR expression in mammalian cells.

Figure 16:
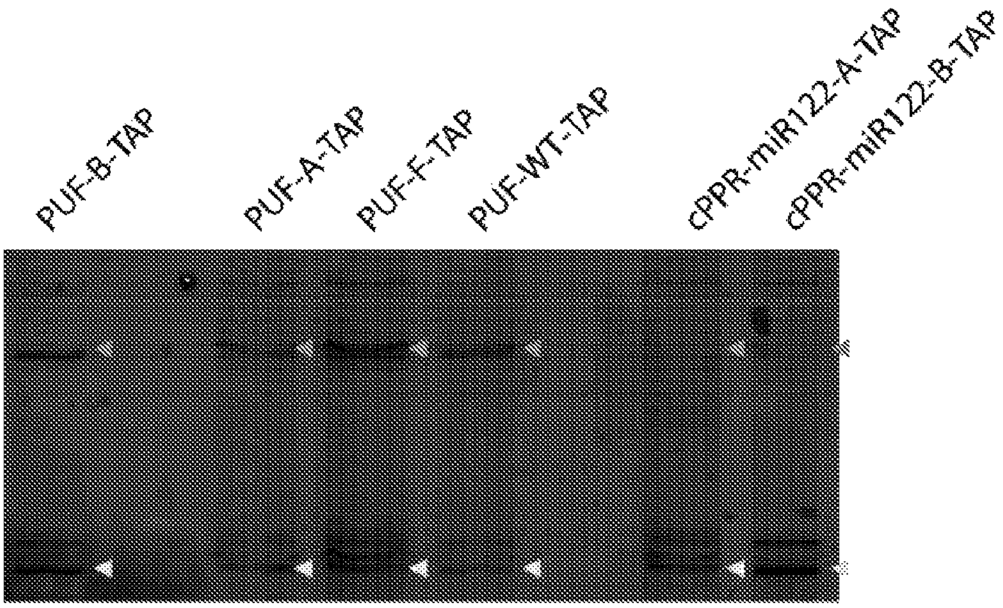
FIG. 16 shows undetectable level of cPPRs in transfected Hela cells as determined by western blotting. Hela cells were transfected with pcDNA3 vectors containing different variants of PUF (A, B and F) and cPPR (A and B) proteins that bind to different regions of miR122 sequence. All proteins were fused with a C-terminal TAP tag that can be detected using anti-lgG secondary antibodies. Primary anti-porin antibodies was used to detect porin expression, which serve as loading controls. The expected protein sizes are indicated by red arrows. Blue arrows indicated the expected size of the porin protein. PUF protein expression can be detected but not cPPR expression.

The inventors sought to assess the possibility of establishing a cPPR-based system to manipulate ssDNA and/or RNA in mammalian cells. To this effect, the inventors designed a pair of cPPR proteins designed to target microRNA 122 (miR122). The coding sequences for these cPPRs and a selection of *Pumilio* and FBF homology protein (PUF) variants were fused to a tandem affinity purification (TAP) tag at their C-termini (data not shown). The TAP tag can be easily detected by lgG antibodies as it contains a tandem repeat of Streptococcal protein G and thus facilitates protein detection by western blotting. The fusions were cloned into the pcDNA3 vector, which contains a CMV promoter, and transfected into Hela cells using the Fugene HD transfection reagent. Cells were lysed after 3 days and analysed by western blotting. PUF protein expression was detected but not expression of the cPPRs (FIG. 16). This was not due to an idiosyncratic feature of the pcDNA3 backbone as no expression of cPPRs was detected using a different plasmid, pJ609, which also contains a CMV promoter.

Example 7—Fusion of cPPRs to Green Fluorescent Protein Such as Enhanced Green Fluorescent Protein (EGFP) or Superfolder Green Fluorescent Protein (sfGFP) Enables Robust Expression of cPPRs in Mammalian Cells, Thereby Facilitating a cPPR Based System which Allows to Manipulate ssDNA and/or RNA in Mammalian Cells This example demonstrates that fusion of cPPRs to enhanced green fluorescent protein (EGFP) or to superfolder green fluorescent protein (sfGFP) enables robust expression of cPPRs in mammalian cells, thereby overcoming difficulties of expression cPPRs in mammalian cells, and facilitating a cPPR based system to manipulate ssDNA and/or RNA in mammalian cells.

Figure 17:
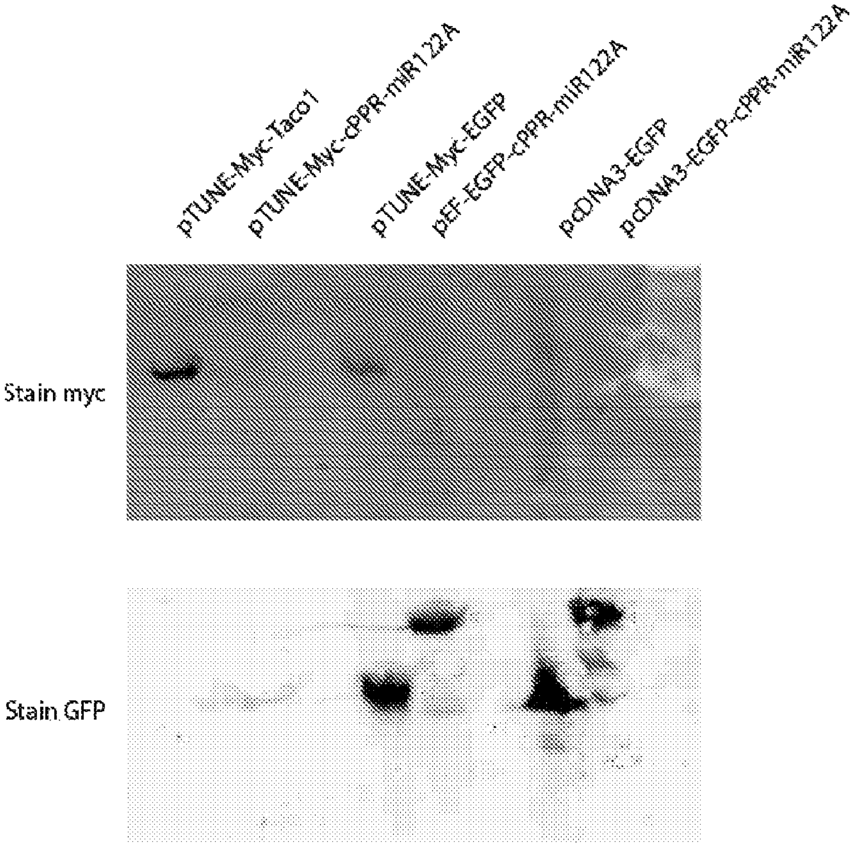
FIG. 17 shows expression of cPPR fusions using different tags and vector backbones. cPPRs were fused to myc tag or enhanced green fluorescent protein (EGFP) at the N-terminal using the indicated vector backbones. Plasmids were transfected into Hela cells for 3 days and lysates were analyzed by immunoblotting using anti-myc or anti-GFP primary antibodies. The expected protein sizes are indicated by red or green arrows, for myc-tagged or EGFP-tagged proteins, respectively. The results shown here demonstrates that fusion of cPPRs to green fluorescent protein (EGFP) enables robust expression of cPPRs in mammalian cells.
Figure 18:
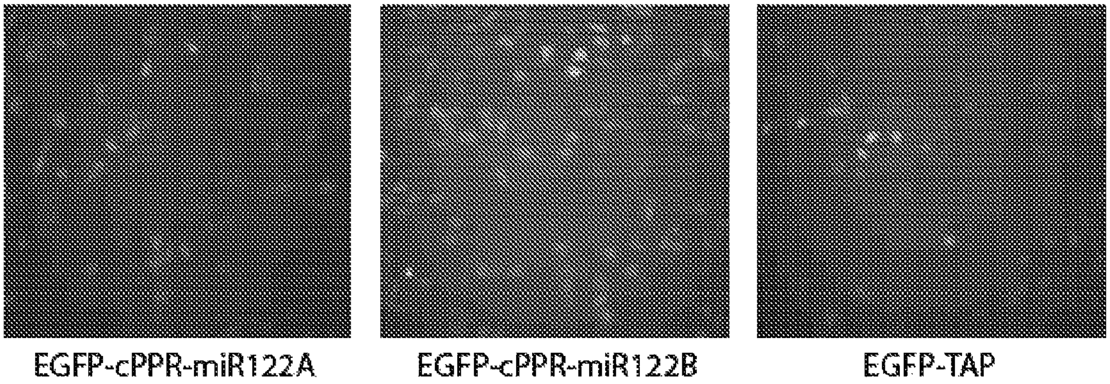
FIG. 18 shows Visualization of cells expressing EGFP fusion proteins by fluorescent microscopy. Both cPPRs designed to target miR122 and control EGFP-TAP proteins can be readily detected. These results demonstrate that fusion constructs of cPPRs to green fluorescent protein (EGFP) can readily be visualised transfected mammalian cells e.g., by fluorescent microscopy.

As demonstrated in the preceding example, despite their robust expression in *Escherichia coli*, expression of cPPRs in mammalian cells has been unsuccessful until the present invention. In the work leading to the present invention, the inventors speculated that the lack of cPPR expression in mammalian cells might be due to protein instability or misfolding. The inventors reasoned that if a stable and well-folded domain was added to the N-terminus, it might assist cPPR expression. To test this reasoning, the inventors used the myc tag and enhanced green fluorescent protein (EGFP). A myc tag was added by cloning cPPR into the myc-containing pTUNE vector. The coding sequence of EGFP was fused to the N-terminus of a cPPR designed to target microRNA 122 (miR 122) and cloned into pcDNA3 and pEF vectors (data not shown). Hela cells were transfected with the plasmids for 3 days and analyzed by western blotting using anti-myc and anti-GFP antibodies. Expression of the cPPR protein designed to target miR122 was dramatically increased when EGFP, but not myc, was fused to its N-terminus (see FIG. 17). Expression of myc-TACO1 and myc-EGFP were detected but not myc-cPPR. In contrast, EGFP-cPPR was strongly expressed from both pEF and pcDNA3 vectors, indicating that vector choice was not the reason for poor cPPR expression, but rather protein stability and folding. The inventors could also detect robust cPPR expression via the inherent fluorescence of EGFP using fluorescent microscopy (FIG. 18).

Figure 19:
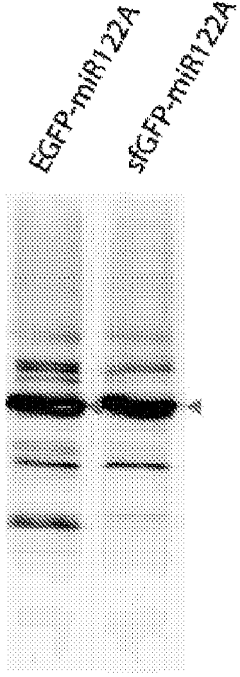
FIG. 19 shows that both EGFP and superfolder green fluorescent protein (sfGFP) enable robust expression of cPPRs in mammalian cells. A cPPR designed to target miR122 was fused to EGFP and sfGFP at the N-terminus. Plasmids were transfected into Hela cells for 3 days and lysates were analyzed by immunoblotting using anti-GFP primary antibodies. The expected protein sizes are indicated by red arrows. These results demonstrate that fusion of cPPRs to sfGFP enables robust expression of cPPRs in mammalian cells and also confirms that fusion of cPPRs to EGFP enables robust expression of cPPRs in mammalian cells.

To see if cPPR expression could be further optimised the inventors also tested a GFP protein with improved folding properties, known as superfolder GFP (sfGFP). sfGFP was reported by Pédelacq et al. in 2006 (Pédelacq J D, Cabantous S, Tran T, Terwilliger T C, Waldo G S. Engineering and characterization of a superfolder green fluorescent protein. *Nat Biotechnol.* 2006 24 (1): 79-88)) when they found that GFP protein bearing the 'cycle-3' mutations (F99S, M153T and V163A), 'enhanced GFP' mutations (F64L and S65T) and 'superfolder GFP' mutations (S30R, Y39N, N105T, Y145F, 1171V and A206V) showed improved protein folding, enhanced tolerance to circular permutation and greater resistance to chemical denaturants. As shown in FIG. 19, fusion of sfGFP to the N-termini of the cPPR protein somewhat improved its stability (FIG. 19). In subsequent experiments sown in the working example that follows, the inventors used EGFP-cPPR constructs to block the activity of miR122 and sfGFP fusions to telomeric ssDNA-targeting cPPR proteins.

Accordingly, the results provided herein fusion demonstrate that fusion of cPPRs to green fluorescent protein (either in the form of EGFP or sfGFP) enables robust expression of cPPRs in mammalian cells. This was not previously expected since cPPRs were anticipated to be adequately stable on their own in mammalian cells. Also the inventors tested a variety of different expression modes (data not shown) before discovering the effect of GFP fusion on cPPR proteins.

Example 8-Fusion of cPPRs to a Fragment of the POT1 Protein (POT1 (AOB)) Enables Targeting cPPRs to Telomeres in Mammalian Cells As demonstrated in the examples above, the inventors found that cPPRs can profoundly inhibit telomerase activity in vitro by blocking its association with its ssDNA template. In light of this, the inventors then sought to explore the potential to use cPPRs proteins which bind to ssDNA in mammalian cells.

Interestingly, Loayza et al. reported a truncated version of the POT1 without its N-terminal OB-fold can still translocate to the telomere in human cells (Loayza D, De Lange T. POT1 as a terminal transducer of TRF1 telomere length control. *Nature.* 2003 423 (6943): 1013-8). In particular, the human POT1 (hPOT1) is the only ssDNA-binding protein in the six-protein telomere-protective shelterin complex. It binds ssDNA via its OB-fold domains at the N-terminus. Importantly, truncated hPOT1 without its N-terminal OB-folds can still translocate to the telomere. Therefore, the C-terminal TPP-binding domain alone can translocate the protein to the telomere.

Taking advantage of this, the inventors fused the telomeric ssDNA-targeting cPPRs detailed in the previous examples above i.e., cPPR-Telo1 and cPPR-Telo2, with the C-terminus of the human POT1 (hPOT1) to create an artificial cPPR-POT1 (AOB) fusion whereby the cPPR protein was fused to only the C-terminus of hPOT1 whereby the OB fold was deleted. An N-terminal sfGFP or EGFP was also added for example to facilitate mammalian protein n and immunofluorescence staining. A nuclear localization signal (NLS) was also optionally used.

The following recombinant protein constructs were created:

(i) NLS-EGFP-linker 1-cPPR-Telo1-linker 2-POT1 (AOB) (set forth in SEQ ID NO: 36, and encoded by the nucleotide sequence set forth in 24);

(ii) NLS-EGFP-linker 1-cPPR-Telo2-linker 2-POT1 (AOB) (set forth in SEQ ID NO: 37, and encoded by the nucleotide sequence set forth in 25);

(iii) NLS-sfGFP-linker 1-cPPR-Telo1-linker 2-POT1 (AOB) (set forth in SEQ ID NO: 38, and encoded by the nucleotide sequence set forth in 26);

(iv) NLS-sfGFP-linker 1-cPPR-Telo2-linker 2-POT1 (AOB) (set forth in SEQ ID NO: 39, and encoded by the nucleotide sequence set forth in 27).

As outlined in the accompanying Sequence Listing, the nuclear localization signal (NLS) has the amino acid sequence set forth in SEQ ID NO: 28 (and may be encoded by a nucleotide sequence as shown in SEQ ID NO: 16).

As also outlined in the accompanying Sequence Listing, the EGFP has the amino acid sequence set forth in SEQ ID NO: 29 (and may be encoded by a nucleotide sequence as shown in SEQ ID NO: 17).

As also outlined in the accompanying Sequence Listing, the sfGFP has the amino acid sequence set forth in SEQ ID NO: 30 (and may be encoded by a nucleotide sequence as shown in SEQ ID NO: 18).

As also outlined in the accompanying Sequence Listing, the cPPR-Telo1 protein employed in the present invention has the amino acid sequence set forth in SEQ ID NO: 32 (and may be encoded by a nucleotide sequence as shown in SEQ ID NO: 20).

As also outlined in the accompanying Sequence Listing, the cPPR-Telo2 protein employed in the present invention has the amino acid sequence set forth in SEQ ID NO: 35 (and may be encoded by a nucleotide sequence as shown in SEQ ID NO: 23).

As also outlined in the accompanying Sequence Listing, the POT1 (AOB) protein employed in the present invention has the amino acid sequence set forth in SEQ ID NO: 34 (and may be encoded by a nucleotide sequence as shown in SEQ ID NO: 22).

As also outlined in the accompanying Sequence Listing, the linker 1 employed in the present invention has the amino acid sequence set forth in SEQ ID NO: 31 (and may be encoded by a nucleotide sequence as shown in SEQ ID NO: 19).

As also outlined in the accompanying Sequence Listing, the linker 2 employed in the present invention has the amino acid sequence set forth in SEQ ID NO: 33 (and may be encoded by a nucleotide sequence as shown in SEQ ID NO: 21).

Hela cells were then cells transfected for two days with the sfGFP-cPPR fusions, Telo1-POT (ΔOB), Telo2-POT1 (ΔOB) and positive control POT1 (ΔOB).

Figure 20:
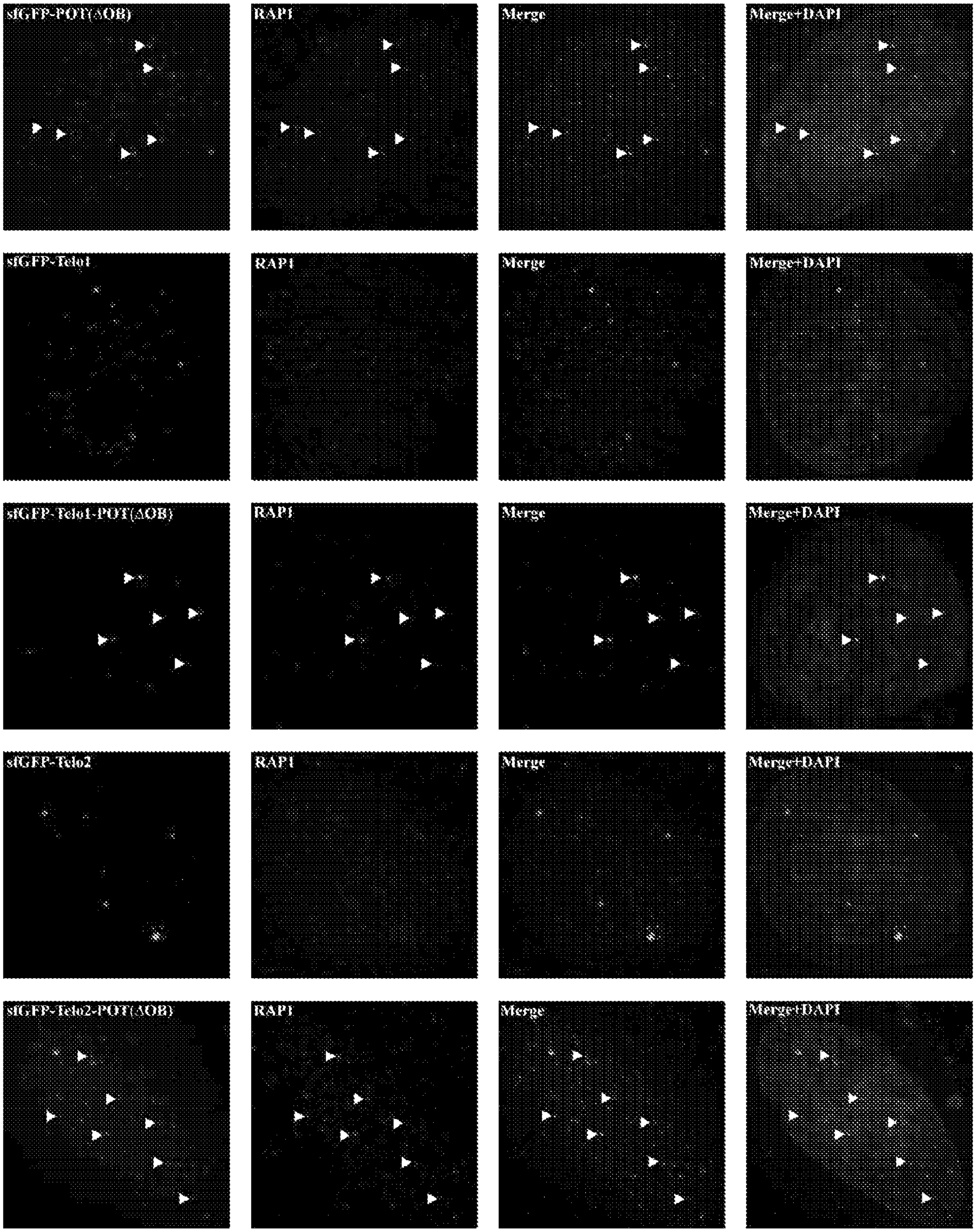
FIG. 20 shows that fusing cPPRs to a fragment of the POT1 protein can enable the cPPRs to be targeted to telomeres in mammalian cells. Telomeric ssDNA targeting cPPR proteins Telo-1 and Telo-2 can translocate to telomeres when fused to POT (AOB). Immunofluorescence of Hela cells transfected with the indicated sfGFP fusions for two days. Cells were stained with GFP Booster, RAP1 antibody and DAPI. White arrowheads indicate examples of co-localisation between RAP1 and the respective GFP fusions.

As shown in FIG. 20, all sfGFP-cPPR fusions were readily detected in cells by fluorescence microscopy, demonstrating their robust expression. Telo1-POT (AOB), Telo2-POT1 (AOB) and positive control POT1 (AOB) successfully translocated to the telomere as shown by immunofluorescence (FIG. 20). However, translocation was not observed for sfGFP-Telo1 and sfGFP-Telo2 without the hPOT1 (AOB) domain, further reinforcing the importance of at least the C-terminal region of POT1 in telomere translocation.

These findings demonstrate that fusion of cPPRs proteins to the full length POT1 Protein or the C-terminal TPP-binding domain of POT1 (e.g., POT (AOB)) enables targeting cPPRs to telomeres in mammalian cells and further fusion of this TPP-binding domain of POT1 to GFP enables their robust expression in the mammalian cells. These findings pave the way for the use of cPPR-based telomerase inhibitors for use in cancer therapies.

The invention claimed is:

1. A method of targeting telomeric ssDNA to inhibit or block extension of the telomeric ssDNA by a telomerase enzyme in a mammalian cell or in a patient, and/or inhibiting or decreasing activity of telomerase in a mammalian cell or a patient, wherein the method comprises administering to the mammalian cell or the patient an amount of an artificial polypeptide or a nucleic acid or vector encoding the artificial polypeptide, to thereby target the telomeric ssDNA to inhibit or block the extension of the telomeric ssDNA by a telomerase enzyme in the mammalian cell or in the patient, and/or thereby inhibiting or decreasing activity of telomerase in the cell or the patient;

wherein the cell or the patient comprises telomeric ssDNA comprising at least one target ssDNA sequence comprising the nucleotide sequence of SEQ NO ID: 40 or 51;

wherein the artificial polypeptide comprises at least one pentatricopeptide repeat (PPR) ssDNA-binding domain that binds to the target telomeric ssDNA having the sequence comprising the nucleotide sequence of SEQ NO ID: 40 or 51; and/or wherein the PPR ssDNA-binding domain comprises at least two PPR ssDNA base binding motifs, each motif comprising a 35-amino acid PPR sequence selected from the group consisting of:

the amino acid sequence of SEQ ID NO: 1;

the amino acid sequence of SEQ ID NO: 2; and the amino acid sequence of SEQ ID NO: 4.

2. The method of claim 1, wherein the method comprises administering to the mammalian cell or the patient the artificial polypeptide.

3. The method of claim 1, wherein the mammalian cell or the patient comprises telomeric ssDNA comprising at least one target ssDNA sequence comprising the nucleotide sequence of SEQ ID NO: 40, and the artificial polypeptide comprises at least one PPR ssDNA-binding domain that binds to the target telomeric ssDNA comprising the nucleotide sequence of SEQ ID NO: 40.

4. The method of claim 1, wherein the mammalian cell or the patient comprises telomeric ssDNA comprising at least one target ssDNA sequence comprising the nucleotide sequence of SEQ ID NO: 51, and the artificial polypeptide comprises at least one PPR ssDNA-binding domain that binds to the target telomeric ssDNA comprising the nucleotide sequence of SEQ ID NO: 51.

5. The method of claim 1, wherein:

(a) the PPR ssDNA base binding motif comprising the amino acid sequence of SEQ ID NO: 1 binds to adenine (a) in the target ssDNA;

(b) the PPR ssDNA base binding motif comprising the amino acid sequence of SEQ ID NO: 2 binds to guanine (g) in the target ssDNA; and (c) the PPR ssDNA base binding motif comprising the amino acid sequence of SEQ ID NO: 4 binds to thymine (t) in the target ssDNA.

6. The method of claim 1, wherein the artificial polypeptide comprises at least one PPR ssDNA-binding domain that binds to the target telomeric ssDNA having the sequence 5'-ttagggttag-3' (SEQ NO ID: 40), and wherein the ssDNA-binding domain comprises ten PPR ssDNA base-binding motifs as follows:

```
Motif 1
                                       (SEQ ID NO: 4)
VVTYNTLISGLGKAGRLEEALELFEEMKEKGIVPD,

Motif 2
                                       (SEQ ID NO: 4)
VVTYNTLISGLGKAGRLEEALELFEEMKEKGIVPD,

Motif 3
                                       (SEQ ID NO: 1)
VVTYTTLISGLGKAGRLEEALELFEEMKEKGIVPN,

Motif 4
                                       (SEQ ID NO: 2)
VVTYTTLISGLGKAGRLEEALELFEEMKEKGIVPD,

Motif 5
                                       (SEQ ID NO: 2)
VVTYTTLISGLGKAGRLEEALELFEEMKEKGIVPD,
```

-continued

```
Motif 6
                                       (SEQ ID NO: 2)
VVTYTTLISGLGKAGRLEEALELFEEMKEKGIVPD,

Motif 7
                                       (SEQ ID NO: 4)
VVTYNTLISGLGKAGRLEEALELFEEMKEKGIVPD,

Motif 8
                                       (SEQ ID NO: 4)
VVTYNTLISGLGKAGRLEEALELFEEMKEKGIVPD,

Motif 9
                                       (SEQ ID NO: 1)
VVTYTTLISGLGKAGRLEEALELFEEMKEKGIVPN, and

Motif 10
                                       (SEQ ID NO: 2)
VVTYTTLISGLGKAGRLEEALELFEEMKEKGIVPD.
```

7. The method of claim 6, wherein the at least one PPR ssDNA-binding domain of the artificial polypeptide consists of ten motifs.

8. The method of claim 1, wherein the artificial polypeptide comprises:

a) an N-terminal cap sequence;

b) the at least one PPR ssDNA-binding domain that binds to the target ssDNA sequence; and c) a C-terminal solvating helix sequence located after the PPR ssDNA-binding domain.

9. The method of claim 8, wherein the C-terminal solvating helix sequence located after the PPR ssDNA-binding domain prevents unfolding of a helical structure of the at least one PPR ssDNA-binding domain and/or enhances stability of the helical structure of the at least one PPR ssDNA-binding domain of the artificial polypeptide.

10. The method of claim 8, wherein:

(i) the N-terminal cap sequence comprises the amino acid sequence of SEQ ID NO: 5; and/or (ii) the C-terminal solvating helix amino acid sequence comprises the amino acid sequence of SEQ ID NO: 6 or 7.

11. The method of claim 8, wherein in the artificial polypeptide comprising at least one PPR ssDNA-binding domain that binds to the target telomeric ssDNA comprising the nucleotide sequence of SEQ ID NO: 40, wherein the ssDNA-binding domain comprises ten PPR ssDNA base binding motifs, and wherein the combination of the N-terminal cap sequence, the ten PPR ssDNA base binding motifs and the C-terminal solvating helix sequence in the artificial polypeptide is selected from the following sequence combinations of (A) and (B):

```
(A)
                                       (SEQ ID NO: 5)
MGNS

Motif 1:
                                       (SEQ ID NO: 4)
VVTYNTLISGLGKAGRLEEALELFEEMKEKGIVPD,

Motif 2:
                                       (SEQ ID NO: 4)
VVTYNTLISGLGKAGRLEEALELFEEMKEKGIVPD,

Motif 3:
                                       (SEQ ID NO: 1)
VVTYTTLISGLGKAGRLEEALELFEEMKEKGIVPN,

Motif 4:
                                       (SEQ ID NO: 2)
VVTYTTLISGLGKAGRLEEALELFEEMKEKGIVPD,
```

-continued

```
Motif 5:
                                    (SEQ ID NO: 2)
VVTYTTLISGLGKAGRLEEALELFEEMKEKGIVPD,

Motif 6:
                                    (SEQ ID NO: 2)
VVTYTTLISGLGKAGRLEEALELFEEMKEKGIVPD,

Motif 7:
                                    (SEQ ID NO: 4)
VVTYNTLISGLGKAGRLEEALELFEEMKEKGIVPD,

Motif 8:
                                    (SEQ ID NO: 4)
VVTYNTLISGLGKAGRLEEALELFEEMKEKGIVPD,

Motif 9:
                                    (SEQ ID NO: 1)
VVTYTTLISGLGKAGRLEEALELFEEMKEKGIVPN,

Motif 10:
                                    (SEQ ID NO: 2)
VVTYTTLISGLGKAGRLEEALELFEEMKEKGIVPD,
and

                                    (SEQ ID NO: 6)
VVTYNTLISGLGKAG
and

(B)
                                    (SEQ ID NO: 5)
MGNS

Motif 1:
                                    (SEQ ID NO: 4)
VVTYNTLISGLGKAGRLEEALELFEEMKEKGIVPD,

Motif 2:
                                    (SEQ ID NO: 4)
VVTYNTLISGLGKAGRLEEALELFEEMKEKGIVPD,

Motif 3:
                                    (SEQ ID NO: 1)
VVTYTTLISGLGKAGRLEEALELFEEMKEKGIVPN,

Motif 4:
                                    (SEQ ID NO: 2)
VVTYTTLISGLGKAGRLEEALELFEEMKEKGIVPD,

Motif 5:
                                    (SEQ ID NO: 2)
VVTYTTLISGLGKAGRLEEALELFEEMKEKGIVPD,
```

-continued

```
Motif 6:
                                    (SEQ ID NO: 2)
VVTYTTLISGLGKAGRLEEALELFEEMKEKGIVPD,

Motif 7:
                                    (SEQ ID NO: 4)
VVTYNTLISGLGKAGRLEEALELFEEMKEKGIVPD,

Motif 8:
                                    (SEQ ID NO: 4)
VVTYNTLISGLGKAGRLEEALELFEEMKEKGIVPD,

Motif 9:
                                    (SEQ ID NO: 1)
VVTYTTLISGLGKAGRLEEALELFEEMKEKGIVPN,

Motif 10:
                                    (SEQ ID NO: 2)
VVTYTTLISGLGKAGRLEEALELFEEMKEKGIVPD,
and

                                    (SEQ ID NO: 7)
VVTYTTLISGLGKAG.
```

12. The method of claim 1, wherein the artificial polypeptide further comprises a green fluorescent protein or a functional variant thereof.

13. The method of claim 12, wherein the green fluorescent protein or functional variant thereof is fused or linked to the at least one PPR ssDNA-binding domain in the artificial polypeptide.

14. The method of claim 1, wherein the artificial polypeptide further comprises at least a fragment of the human POT1 (hPOT1) protein wherein the fragment comprises the least the C-terminal TPP binding domain of the hPOT1 or a functional variant thereof.

15. The method of claim 14, wherein the fragment of the hPOT1 protein or functional variant thereof is fused or linked to the at least one PPR ssDNA-binding domain in the artificial polypeptide.

16. The method of claim 1, wherein the artificial polypeptide is produced recombinantly.

17. The method of claim 1, wherein (a) the mammalian cell is a cancer cell or a neoplastic cell; or (b) the patient has cancer or neoplastic tissue.

18. The method of claim 1, wherein the artificial polypeptide maintains telomere length or prevents shortening of telomere length in the mammalian cell or the patient.

* * * * *

SEQUENCE LISTING

```
<160> NUMBER OF SEQ ID NOS: 51

<210> SEQ ID NO 1
<211> LENGTH: 35
<212> TYPE: PRT
<213> ORGANISM: Homo sapiens

<400> SEQUENCE: 1

Val Val Thr Tyr Thr Thr Leu Ile Ser Gly Leu Gly Lys Ala Gly Arg
1               5                   10                  15

Leu Glu Glu Ala Leu Glu Leu Phe Glu Glu Met Lys Glu Lys Gly Ile
            20                  25                  30

Val Pro Asn
        35


<210> SEQ ID NO 2
<211> LENGTH: 35
<212> TYPE: PRT
<213> ORGANISM: Homo sapiens

<400> SEQUENCE: 2

Val Val Thr Tyr Thr Thr Leu Ile Ser Gly Leu Gly Lys Ala Gly Arg
1               5                   10                  15

Leu Glu Glu Ala Leu Glu Leu Phe Glu Glu Met Lys Glu Lys Gly Ile
            20                  25                  30

Val Pro Asp
        35


<210> SEQ ID NO 3
<211> LENGTH: 35
<212> TYPE: PRT
<213> ORGANISM: Homo sapiens

<400> SEQUENCE: 3

Val Val Thr Tyr Asn Thr Leu Ile Ser Gly Leu Gly Lys Ala Gly Arg
1               5                   10                  15

Leu Glu Glu Ala Leu Glu Leu Phe Glu Glu Met Lys Glu Lys Gly Ile
            20                  25                  30
```

```
Val Pro Ser
        35


<210> SEQ ID NO 4
<211> LENGTH: 35
<212> TYPE: PRT
<213> ORGANISM: Homo sapiens

<400> SEQUENCE: 4

Val Val Thr Tyr Asn Thr Leu Ile Ser Gly Leu Gly Lys Ala Gly Arg
1               5                   10                  15

Leu Glu Glu Ala Leu Glu Leu Phe Glu Glu Met Lys Glu Lys Gly Ile
            20                  25                  30

Val Pro Asp
        35


<210> SEQ ID NO 5
<211> LENGTH: 4
<212> TYPE: PRT
<213> ORGANISM: Homo sapiens

<400> SEQUENCE: 5

Met Gly Asn Ser
1


<210> SEQ ID NO 6
<211> LENGTH: 15
<212> TYPE: PRT
<213> ORGANISM: Homo sapiens

<400> SEQUENCE: 6

Val Val Thr Tyr Asn Thr Leu Ile Ser Gly Leu Gly Lys Ala Gly
1               5                   10                  15


<210> SEQ ID NO 7
<211> LENGTH: 15
<212> TYPE: PRT
<213> ORGANISM: Homo sapiens

<400> SEQUENCE: 7

Val Val Thr Tyr Thr Thr Leu Ile Ser Gly Leu Gly Lys Ala Gly
1               5                   10                  15


<210> SEQ ID NO 8
<211> LENGTH: 19
<212> TYPE: PRT
<213> ORGANISM: Homo sapiens

<400> SEQUENCE: 8

Ala Arg Pro Ala Glu Glu Ala Thr Ser Leu Glu Gly Ala Leu Ser Gly
1               5                   10                  15

Thr Arg His


<210> SEQ ID NO 9
<211> LENGTH: 29
<212> TYPE: DNA
<213> ORGANISM: Homo sapiens

<400> SEQUENCE: 9

ctagacctgt catcattagg gttagggtt                                       29


<210> SEQ ID NO 10
<211> LENGTH: 31
```

<212> TYPE: DNA
<213> ORGANISM: Homo sapiens

<400> SEQUENCE: 10
ctagacctgt catcattagg gttagggtta g 31

<210> SEQ ID NO 11
<211> LENGTH: 33
<212> TYPE: DNA
<213> ORGANISM: Homo sapiens

<400> SEQUENCE: 11
ctagacctgt catcattagg gttagggtta ggg 33

<210> SEQ ID NO 12
<211> LENGTH: 35
<212> TYPE: DNA
<213> ORGANISM: Homo sapiens

<400> SEQUENCE: 12
ctagacctgt catcattagg gttagggtta gggtt 35

<210> SEQ ID NO 13
<211> LENGTH: 46
<212> TYPE: DNA
<213> ORGANISM: Homo sapiens
<220> FEATURE:
<221> NAME/KEY: misc_feature
<222> LOCATION: (18)..(27)
<223> OTHER INFORMATION: n is a, c, g, t or u

<400> SEQUENCE: 13
ctttatccag ccctcacnnn nnnnnnncta tagtgtcacc taaatc 46

<210> SEQ ID NO 14
<211> LENGTH: 50
<212> TYPE: DNA
<213> ORGANISM: Homo sapiens

<400> SEQUENCE: 14
tcgtcggcag cgtcagatgt gtataagaga cagctttatc cagccctcac 50

<210> SEQ ID NO 15
<211> LENGTH: 53
<212> TYPE: DNA
<213> ORGANISM: Homo sapiens

<400> SEQUENCE: 15
gtctcgtggg ctcggagatg tgtataagag acaggattta ggtgacacta tag 53

<210> SEQ ID NO 16
<211> LENGTH: 60
<212> TYPE: DNA
<213> ORGANISM: Homo sapiens

<400> SEQUENCE: 16
atggataaag cggaattaat tcccgagcct ccaaaaaaga agagaaaggt cgaattgggt 60

<210> SEQ ID NO 17
<211> LENGTH: 717
<212> TYPE: DNA
<213> ORGANISM: Homo sapiens

<400> SEQUENCE: 17

```
atggtgagca agggcgagga gctgttcacc ggggtggtgc ccatcctggt cgagctggac     60

ggcgacgtaa acggccacaa gttcagcgtg tccggcgagg gcgagggcga tgccacctac    120

ggcaagctga ccctgaagtt catctgcacc accggcaagc tgcccgtgcc ctggcccacc    180

ctcgtgacca ccctgaccta cggcgtgcag tgcttcagcc gctaccccga ccacatgaag    240

cagcacgact tcttcaagtc cgccatgccc gaaggctacg tccaggagcg caccatcttc    300

ttcaaggacg acggcaacta caagacccgc gccgaggtga agttcgaggg cgacaccctg    360

gtgaaccgca tcgagctgaa gggcatcgac ttcaaggagg acggcaacat cctggggcac    420

aagctggagt acaactacaa cagccacaac gtctatatca tggccgacaa gcagaagaac    480

ggcatcaagg tgaacttcaa gatccgccac aacatcgagg acggcagcgt gcagctcgcc    540

gaccactacc agcagaacac ccccatcggc gacggccccg tgctgctgcc cgacaaccac    600

tacctgagca cccagtccgc cctgagcaaa gaccccaacg agaagcgcga tcacatggtc    660

ctgctggagt tcgtgaccgc cgccgggatc actctcggca tggacgagct gtacaag       717
```

```
<210> SEQ ID NO 18
<211> LENGTH: 720
<212> TYPE: DNA
<213> ORGANISM: Homo sapiens

<400> SEQUENCE: 18

atgggtagca aaggagaaga acttttcact ggagttgtcc caattcttgt tgaattagat     60

ggtgatgtta atgggcacaa attttctgtc cgtggagagg gtgaaggtga tgctacaaac    120

ggaaaactca cccttaaatt tatttgcact actggaaaac tacctgttcc gtggccaaca    180

cttgtcacta ctctgaccta tggtgttcaa tgcttttccc gttatccgga tcacatgaaa    240

cggcatgact ttttcaagag tgccatgccc gaaggttatg tacaggaacg cactatatct    300

ttcaaagatg acgggaccta caagacgcgt gctgaagtca agtttgaagg tgataccctt    360

gttaatcgta tcgagttaaa gggtattgat tttaaagaag atggaaacat tcttggacac    420

aaactcgagt acaactttaa ctcacacaat gtatacatca cggcagacaa acaaaagaat    480

ggaatcaaag ctaacttcaa aattcgccac aacgttgaag atggttccgt tcaactagca    540

gaccattatc aacaaaatac tccaattggc gatggccctg tccttttacc agacaaccat    600

tacctgtcga cacaatctgt cctttcgaaa gatcccaacg aaaagcgtga ccacatggtc    660

cttcttgagt ttgtaactgc tgctgggatt acacatggca tggacgagct gtacaagggt    720
```

```
<210> SEQ ID NO 19
<211> LENGTH: 12
<212> TYPE: DNA
<213> ORGANISM: Homo sapiens

<400> SEQUENCE: 19

ggtggcgcgc cc                                                         12
```

```
<210> SEQ ID NO 20
<211> LENGTH: 1104
<212> TYPE: DNA
<213> ORGANISM: Homo sapiens

<400> SEQUENCE: 20

atggggaatt cagtcaccta caatacccta atctctggac tgggaaaggc tggtcgctta     60

gaagaggctt tagaactgtt cgaggagatg aaagaaaaag gcatagttcc cgatgttgtg    120

acatacaaca cactcatcag tggtcttgga aaagcaggcc ggcttgagga agctctggaa    180
```

ttgttcgagg aaatgaagga gaaggggatc gtgccggatg tggttacata cacaacgctt 240
attagcggcc tcggcaaggc tggccgtctg gaggaggcgc ttgagttgtt cgaagagatg 300
aaagagaaag gtatagttcc gaacgtggtg acgtatacta cactcatctc cggtctaggc 360
aaagccggga gattggagga agcgctagaa ctgttcgaag aaatgaaaga gaagggtata 420
gtaccagacg tagtcacata taccacgttg atctctggcc tgggcaaagc cggtcgtctt 480
gaagaagcgc tggaattatt tgaggagatg aaggaaaagg gtattgtgcc cgacgttgtg 540
acgtacacaa cgttgatcag tggccttggg aaagcgggac gtctggaaga agccctcgaa 600
ttatttgaag aaatgaagga aaaaggtatt gttccggatg ttgtaactta caacacgctg 660
ataagtggtc tgggcaaagc tggacgctta gaggaggcct tagagctctt tgaggaaatg 720
aaagaaaagg ggattgtgcc tgacgtggtc acatataaca ccctgattag tggcttaggc 780
aaagcaggta gactggagga agcgctggag ctgtttgaag agatgaagga gaaagggatt 840
gttccagacg ttgttaccta tactacgctc atttctgggc tgggtaaagc aggcaggtta 900
gaagaagcac tcgaactctt tgaagagatg aaggagaaag gtatcgttcc caacgtagta 960
acctacacta cgctgatatc cggcttaggt aaagccggtc ggctggagga agctctcgaa 1020
ctgtttgaag aaatgaagga aaaaggaatt gttccagatg ttgttacata tacgacgttg 1080
ataagcgggc tcggtaaagc tgga 1104

<210> SEQ ID NO 21
<211> LENGTH: 21
<212> TYPE: DNA
<213> ORGANISM: Homo sapiens

<400> SEQUENCE: 21
gttgatactg gaaacgctag c 21

<210> SEQ ID NO 22
<211> LENGTH: 960
<212> TYPE: DNA
<213> ORGANISM: Homo sapiens

<400> SEQUENCE: 22
ccaagctctg gatcagtatc attatacgag gtagaaagat gtcaacagct atctgctaca 60
atacttacag atcatcagta tttggagagg acaccactat gtgccatttt gaaacaaaaa 120
gctcctcaac aataccgcat ccgagcaaaa ttgaggtcat ataagcccag aagactattt 180
cagtctgtta aacttcattg ccctaaatgt catttgctgc aagaagttcc acatgagggc 240
gatttggata taatttttca ggatggtgca actaaaaccc cagatgtcaa gctacaaaat 300
acatcattat atgattcaaa aatctggacc actaaaaatc aaaaaggacg aaaagtagca 360
gttcattttg tgaaaaataa tggtattctc ccgctttcaa atgaatgtct acttttgata 420
gaaggaggta cactcagtga aatttgcaaa ctctcgaaca agtttaatag tgtaattcct 480
gtgagatctg gccacgaaga cctggaactt ttggaccttt cagcaccatt tcttatacaa 540
ggaacaatac atcactatgg atgtaaacag tgttctagtt tgagatccat acaaaatcta 600
aattccctgg ttgataaaac atcgtggatt ccttcttctg tggcagaagc actgggtatt 660
gtacccctcc aatatgtgtt tgttatgacc tttacacttg atgatggaac aggagtacta 720
gaagcctatc tcatggattc tgacaaattc ttccagattc cagcatcaga agttctgatg 780
gatgatgacc ttcagaaaag tgtggatatg atcatggata tgttttgtcc tccaggaata 840
aaaattgatg catatccgtg gttggaatgc ttcatcaagt catacaatgt cacaaatgga 900
acagataatc aaatttgcta tcagattttt gacaccacag ttgcagaaga tgtaatctaa 960

<210> SEQ ID NO 23
<211> LENGTH: 1104
<212> TYPE: DNA
<213> ORGANISM: Homo sapiens

<400> SEQUENCE: 23
atggggaatt cagtcaccta cactacccta atctctggac tgggaaaggc tggtcgctta 60
gaagaggctt tagaactgtt cgaggagatg aaagaaaaag gcatagttcc cgatgttgtg 120
acatacacca cactcatcag tggtcttgga aaagcaggcc ggcttgagga agctctggaa 180
ttgttcgagg aaatgaagga gaaggggatc gtgccggatg tggttacata caacacgctt 240
attagcggcc tcggcaaggc tggccgtctg gaggaggcgc ttgagttgtt cgaagagatg 300
aaagagaaag gtatagttcc ggacgtggtg acgtataata cactcatctc cggtctaggc 360
aaagccggga gattggagga agcgctagaa ctgttcgaag aaatgaaaga gaagggtata 420
gtaccagacg tagtcacata taccacgttg atctctggcc tgggcaaagc cggtcgtctt 480
gaagaagcgc tggaattatt tgaggagatg aaggaaaagg gtattgtgcc caacgttgtg 540
acgtacacca cgttgatcag tggccttggg aaagcgggac gtctggaaga agccctcgaa 600
ttatttgaag aaatgaagga aaaaggtatt gttccggatg ttgtaactta caccacgctg 660
ataagtggtc tgggcaaagc tggacgctta gaggaggcct tagagctctt tgaggaaatg 720
aaagaaaagg ggattgtgcc tgacgtggtc acatatacca ccctgattag tggcttaggc 780
aaagcaggta gactggagga agcgctggag ctgtttgaag agatgaagga gaaagggatt 840
gttccagacg ttgttaccta taatacgctc atttctgggc tgggtaaagc aggcaggtta 900
gaagaagcac tcgaactctt tgaagagatg aaggagaaag gtatcgttcc cgacgtagta 960
acctacaata cgctgatatc cggcttaggt aaagccggtc ggctggagga agctctcgaa 1020
ctgtttgaag aaatgaagga aaaaggaatt gttccagatg ttgttacata tactacgttg 1080
ataagcgggc tcggtaaagc tgga 1104

<210> SEQ ID NO 24
<211> LENGTH: 2874
<212> TYPE: DNA
<213> ORGANISM: Homo sapiens

<400> SEQUENCE: 24
atggataaag cggaattaat tcccgagcct ccaaaaaaga agagaaaggt cgaattgggt 60
atggtgagca agggcgagga gctgttcacc ggggtggtgc ccatcctggt cgagctggac 120
ggcgacgtaa acggccacaa gttcagcgtg tccggcgagg gcgagggcga tgccacctac 180
ggcaagctga ccctgaagtt catctgcacc accggcaagc tgcccgtgcc ctggcccacc 240
ctcgtgacca ccctgaccta cggcgtgcag tgcttcagcc gctaccccga ccacatgaag 300
cagcacgact tcttcaagtc cgccatgccc gaaggctacg tccaggagcg caccatcttc 360
ttcaaggacg acggcaacta caagacccgc gccgaggtga agttcgaggg cgacaccctg 420
gtgaaccgca tcgagctgaa gggcatcgac ttcaaggagg acggcaacat cctggggcac 480
aagctggagt acaactacaa cagccacaac gtctatatca tggccgacaa gcagaagaac 540
ggcatcaagg tgaacttcaa gatccgccac aacatcgagg acggcagcgt gcagctcgcc 600
gaccactacc agcagaacac ccccatcggc gacggccccg tgctgctgcc cgacaaccac 660

```
tacctgagca cccagtccgc cctgagcaaa gaccccaacg agaagcgcga tcacatggtc    720

ctgctggagt tcgtgaccgc cgccgggatc actctcggca tggacgagct gtacaagggt    780

ggcgcgccca tggggaattc agtcacctac aataccctaa tctctggact gggaaaggct    840

ggtcgcttag aagaggcttt agaactgttc gaggagatga aagaaaaagg catagttccc    900

gatgttgtga catacaacac actcatcagt ggtcttggaa aagcaggccg gcttgaggaa    960

gctctggaat tgttcgagga aatgaaggag aaggggatcg tgccggatgt ggttacatac   1020

acaacgctta ttagcggcct cggcaaggct ggccgtctgg aggaggcgct tgagttgttc   1080

gaagagatga aagagaaagg tatagttccg aacgtggtga cgtatactac actcatctcc   1140

ggtctaggca aagccgggag attggaggaa gcgctagaac tgttcgaaga aatgaaagag   1200

aagggtatag taccagacgt agtcacatat accacgttga tctctggcct gggcaaagcc   1260

ggtcgtcttg aagaagcgct ggaattattt gaggagatga aggaaaaggg tattgtgccc   1320

gacgttgtga cgtacacaac gttgatcagt ggccttggga aagcgggacg tctggaagaa   1380

gccctcgaat tatttgaaga aatgaaggaa aaaggtattg ttccggatgt tgtaacttac   1440

aacacgctga taagtggtct gggcaaagct ggacgcttag aggaggcctt agagctcttt   1500

gaggaaatga aagaaaaggg gattgtgcct gacgtggtca catataacac cctgattagt   1560

ggcttaggca aagcaggtag actggaggaa gcgctggagc tgtttgaaga gatgaaggag   1620

aaagggattg ttccagacgt tgttacctat actacgctca tttctgggct gggtaaagca   1680

ggcaggttag aagaagcact cgaactcttt gaagagatga aggagaaagg tatcgttccc   1740

aacgtagtaa cctacactac gctgatatcc ggcttaggta aagccggtcg gctggaggaa   1800

gctctcgaac tgtttgaaga aatgaaggaa aaaggaattg ttccagatgt tgttacatat   1860

acgacgttga taagcgggct cggtaaagct ggagttgata ctggaaacgc tagcccaagc   1920

tctggatcag tatcattata cgaggtagaa agatgtcaac agctatctgc tacaatactt   1980

acagatcatc agtatttgga gaggacacca ctatgtgcca ttttgaaaca aaaagctcct   2040

caacaatacc gcatccgagc aaaattgagg tcatataagc ccagaagact atttcagtct   2100

gttaaacttc attgccctaa atgtcatttg ctgcaagaag ttccacatga gggcgatttg   2160

gatataattt ttcaggatgg tgcaactaaa accccagatg tcaagctaca aaatacatca   2220

ttatatgatt caaaaatctg gaccactaaa aatcaaaaag gacgaaaagt agcagttcat   2280

tttgtgaaaa ataatggtat tctcccgctt tcaaatgaat gtctactttt gatagaagga   2340

ggtacactca gtgaaatttg caaactctcg aacaagttta atagtgtaat tcctgtgaga   2400

tctggccacg aagacctgga acttttggac ctttcagcac catttcttat acaaggaaca   2460

atacatcact atggatgtaa acagtgttct agtttgagat ccatacaaaa tctaaattcc   2520

ctggttgata aaacatcgtg gattccttct tctgtggcag aagcactggg tattgtaccc   2580

ctccaatatg tgtttgttat gacctttaca cttgatgatg gaacaggagt actagaagcc   2640

tatctcatgg attctgacaa attcttccag attccagcat cagaagttct gatggatgat   2700

gaccttcaga aaagtgtgga tatgatcatg gatatgtttt gtcctccagg aataaaaatt   2760

gatgcatatc cgtggttgga atgcttcatc aagtcataca atgtcacaaa tggaacagat   2820

aatcaaattt gctatcagat ttttgacacc acagttgcag aagatgtaat ctaa         2874
```

<210> SEQ ID NO 25
<211> LENGTH: 2874
<212> TYPE: DNA

<213> ORGANISM: Homo sapiens

<400> SEQUENCE: 25
atggataaag cggaattaat tcccgagcct ccaaaaaaga agagaaaggt cgaattgggt 60
atggtgagca agggcgagga gctgttcacc ggggtggtgc ccatcctggt cgagctggac 120
ggcgacgtaa acggccacaa gttcagcgtg tccggcgagg gcgagggcga tgccacctac 180
ggcaagctga ccctgaagtt catctgcacc accggcaagc tgcccgtgcc ctggcccacc 240
ctcgtgacca ccctgaccta cggcgtgcag tgcttcagcc gctaccccga ccacatgaag 300
cagcacgact tcttcaagtc cgccatgccc gaaggctacg tccaggagcg caccatcttc 360
ttcaaggacg acggcaacta caagacccgc gccgaggtga agttcgaggg cgacaccctg 420
gtgaaccgca tcgagctgaa gggcatcgac ttcaaggagg acggcaacat cctggggcac 480
aagctggagt acaactacaa cagccacaac gtctatatca tggccgacaa gcagaagaac 540
ggcatcaagg tgaacttcaa gatccgccac aacatcgagg acggcagcgt gcagctcgcc 600
gaccactacc agcagaacac ccccatcggc gacggccccg tgctgctgcc cgacaaccac 660
tacctgagca cccagtccgc cctgagcaaa gaccccaacg agaagcgcga tcacatggtc 720
ctgctggagt tcgtgaccgc cgccgggatc actctcggca tggacgagct gtacaagggt 780
ggcgcgccca tggggaattc agtcacctac actaccctaa tctctggact gggaaaggct 840
ggtcgcttag aagaggcttt agaactgttc gaggagatga aagaaaaagg catagttccc 900
gatgttgtga catacaccac actcatcagt ggtcttggaa aagcaggccg gcttgaggaa 960
gctctggaat tgttcgagga aatgaaggag aaggggatcg tgccggatgt ggttacatac 1020
aacacgctta ttagcggcct cggcaaggct ggccgtctgg aggaggcgct tgagttgttc 1080
gaagagatga aagagaaagg tatagttccg gacgtggtga cgtataatac actcatctcc 1140
ggtctaggca aagccgggag attggaggaa gcgctagaac tgttcgaaga aatgaaagag 1200
aagggtatag taccagacgt agtcacatat accacgttga tctctggcct gggcaaagcc 1260
ggtcgtcttg aagaagcgct ggaattattt gaggagatga aggaaaaggg tattgtgccc 1320
aacgttgtga cgtacaccac gttgatcagt ggccttggga aagcgggacg tctggaagaa 1380
gccctcgaat tatttgaaga aatgaaggaa aaaggtattg ttccggatgt tgtaacttac 1440
accacgctga taagtggtct gggcaaagct ggacgcttag aggaggcctt agagctcttt 1500
gaggaaatga aagaaaaggg gattgtgcct gacgtggtca catataccac cctgattagt 1560
ggcttaggca aagcaggtag actggaggaa gcgctggagc tgtttgaaga gatgaaggag 1620
aaagggattg ttccagacgt tgttacctat aatacgctca tttctgggct gggtaaagca 1680
ggcaggttag aagaagcact cgaactcttt gaagagatga aggagaaagg tatcgttccc 1740
gacgtagtaa cctacaatac gctgatatcc ggcttaggta aagccggtcg gctggaggaa 1800
gctctcgaac tgtttgaaga aatgaaggaa aaaggaattg ttccagatgt tgttacatat 1860
actacgttga taagcgggct cggtaaagct ggagttgata ctggaaacgc tagcccaagc 1920
tctggatcag tatcattata cgaggtagaa agatgtcaac agctatctgc tacaatactt 1980
acagatcatc agtatttgga gaggacacca ctatgtgcca ttttgaaaca aaaagctcct 2040
caacaatacc gcatccgagc aaaattgagg tcatataagc ccagaagact atttcagtct 2100
gttaaacttc attgccctaa atgtcatttg ctgcaagaag ttccacatga gggcgatttg 2160
gatataattt ttcaggatgg tgcaactaaa accccagatg tcaagctaca aaatacatca 2220
ttatatgatt caaaaatctg gaccactaaa aatcaaaaag gacgaaaagt agcagttcat 2280

```
tttgtgaaaa ataatggtat tctcccgctt tcaaatgaat gtctactttt gatagaagga   2340

ggtacactca gtgaaatttg caaactctcg aacaagttta atagtgtaat tcctgtgaga   2400

tctggccacg aagacctgga acttttggac ctttcagcac catttcttat acaaggaaca   2460

atacatcact atggatgtaa acagtgttct agtttgagat ccatacaaaa tctaaattcc   2520

ctggttgata aaacatcgtg gattccttct tctgtggcag aagcactggg tattgtaccc   2580

ctccaatatg tgtttgttat gacctttaca cttgatgatg gaacaggagt actagaagcc   2640

tatctcatgg attctgacaa attcttccag attccagcat cagaagttct gatggatgat   2700

gaccttcaga aaagtgtgga tatgatcatg gatatgtttt gtcctccagg aataaaaatt   2760

gatgcatatc cgtggttgga atgcttcatc aagtcataca atgtcacaaa tggaacagat   2820

aatcaaattt gctatcagat tttgacacc acagttgcag aagatgtaat ctaa          2874
```

<210> SEQ ID NO 26
<211> LENGTH: 2877
<212> TYPE: DNA
<213> ORGANISM: Homo sapiens

<400> SEQUENCE: 26

```
atggataaag cggaattaat tcccgagcct ccaaaaaaga agagaaaggt cgaattgggt     60

atgggtagca aaggagaaga acttttcact ggagttgtcc caattcttgt tgaattagat    120

ggtgatgtta atgggcacaa attttctgtc cgtggagagg gtgaaggtga tgctacaaac    180

ggaaaactca cccttaaatt tatttgcact actggaaaac tacctgttcc gtggccaaca    240

cttgtcacta ctctgaccta tggtgttcaa tgcttttccc gttatccgga tcacatgaaa    300

cggcatgact ttttcaagag tgccatgccc gaaggttatg tacaggaacg cactatatct    360

ttcaaagatg acgggaccta caagacgcgt gctgaagtca agtttgaagg tgataccctt    420

gttaatcgta tcgagttaaa gggtattgat tttaaagaag atggaaacat tcttggacac    480

aaactcgagt acaactttaa ctcacacaat gtatacatca cggcagacaa acaaaagaat    540

ggaatcaaag ctaacttcaa aattcgccac aacgttgaag atggttccgt tcaactagca    600

gaccattatc aacaaaatac tccaattggc gatggccctg tccttttacc agacaaccat    660

tacctgtcga cacaatctgt cctttcgaaa gatcccaacg aaaagcgtga ccacatggtc    720

cttcttgagt ttgtaactgc tgctgggatt acacatggca tggacgagct gtacaagggt    780

ggtggcgcgc ccatggggaa ttcagtcacc tacaataccc taatctctgg actgggaaag    840

gctggtcgct tagaagaggc tttagaactg ttcgaggaga tgaaagaaaa aggcatagtt    900

cccgatgttg tgacatacaa cacactcatc agtggtcttg gaaaagcagg ccggcttgag    960

gaagctctgg aattgttcga ggaaatgaag gagaagggga tcgtgccgga tgtggttaca   1020

tacacaacgc ttattagcgg cctcggcaag gctggccgtc tggaggaggc gcttgagttg   1080

ttcgaagaga tgaaagagaa aggtatagtt ccgaacgtgg tgacgtatac tacactcatc   1140

tccggtctag gcaaagccgg gagattggag gaagcgctag aactgttcga agaaatgaaa   1200

gagaagggta tagtaccaga cgtagtcaca tataccacgt tgatctctgg cctgggcaaa   1260

gccggtcgtc ttgaagaagc gctggaatta tttgaggaga tgaaggaaaa gggtattgtg   1320

cccgacgttg tgacgtacac aacgttgatc agtggccttg ggaaagcggg acgtctggaa   1380

gaagccctcg aattatttga agaaatgaag gaaaaaggta ttgttccgga tgttgtaact   1440

tacaacacgc tgataagtgg tctgggcaaa gctggacgct tagaggaggc cttagagctc   1500
```

```
tttgaggaaa tgaaagaaaa ggggattgtg cctgacgtgg tcacatataa caccctgatt   1560

agtggcttag gcaaagcagg tagactggag gaagcgctgg agctgtttga agagatgaag   1620

gagaaaggga ttgttccaga cgttgttacc tatactacgc tcatttctgg gctgggtaaa   1680

gcaggcaggt tagaagaagc actcgaactc tttgaagaga tgaaggagaa aggtatcgtt   1740

cccaacgtag taacctacac tacgctgata tccggcttag gtaaagccgg tcggctggag   1800

gaagctctcg aactgtttga agaaatgaag gaaaaaggaa ttgttccaga tgttgttaca   1860

tatacgacgt tgataagcgg gctcggtaaa gctggagttg atactggaaa cgctagccca   1920

agctctggat cagtatcatt atacgaggta gaaagatgtc aacagctatc tgctacaata   1980

cttacagatc atcagtattt ggagaggaca ccactatgtg ccattttgaa acaaaaagct   2040

cctcaacaat accgcatccg agcaaaattg aggtcatata agcccagaag actatttcag   2100

tctgttaaac ttcattgccc taaatgtcat ttgctgcaag aagttccaca tgagggcgat   2160

ttggatataa tttttcagga tggtgcaact aaaaccccag atgtcaagct acaaaataca   2220

tcattatatg attcaaaaat ctggaccact aaaaatcaaa aaggacgaaa agtagcagtt   2280

cattttgtga aaaataatgg tattctcccg ctttcaaatg aatgtctact tttgatagaa   2340

ggaggtacac tcagtgaaat ttgcaaactc tcgaacaagt ttaatagtgt aattcctgtg   2400

agatctggcc acgaagacct ggaacttttg gacctttcag caccatttct tatacaagga   2460

acaatacatc actatggatg taaacagtgt tctagtttga gatccataca aaatctaaat   2520

tccctggttg ataaaacatc gtggattcct tcttctgtgg cagaagcact gggtattgta   2580

cccctccaat atgtgtttgt tatgaccttt acacttgatg atggaacagg agtactagaa   2640

gcctatctca tggattctga caaattcttc cagattccag catcagaagt tctgatggat   2700

gatgaccttc agaaaagtgt ggatatgatc atggatatgt tttgtcctcc aggaataaaa   2760

attgatgcat atccgtggtt ggaatgcttc atcaagtcat acaatgtcac aaatggaaca   2820

gataatcaaa tttgctatca gatttttgac accacagttg cagaagatgt aatctaa      2877
```

```
<210> SEQ ID NO 27
<211> LENGTH: 2877
<212> TYPE: DNA
<213> ORGANISM: Homo sapiens

<400> SEQUENCE: 27

atggataaag cggaattaat tcccgagcct ccaaaaaaga agagaaaggt cgaattgggt     60

atgggtagca aaggagaaga acttttcact ggagttgtcc caattcttgt tgaattagat    120

ggtgatgtta atgggcacaa attttctgtc cgtggagagg gtgaaggtga tgctacaaac    180

ggaaaactca cccttaaatt tatttgcact actggaaaac tacctgttcc gtggccaaca    240

cttgtcacta ctctgaccta tggtgttcaa tgcttttccc gttatccgga tcacatgaaa    300

cggcatgact ttttcaagag tgccatgccc gaaggttatg tacaggaacg cactatatct    360

ttcaaagatg acgggaccta caagacgcgt gctgaagtca agtttgaagg tgatacctt     420

gttaatcgta tcgagttaaa gggtattgat tttaaagaag atggaaacat tcttggacac    480

aaactcgagt acaactttaa ctcacacaat gtatacatca cggcagacaa acaaaagaat    540

ggaatcaaag ctaacttcaa aattcgccac aacgttgaag atggttccgt tcaactagca    600

gaccattatc aacaaaatac tccaattggc gatggccctg tccttttacc agacaaccat    660

tacctgtcga cacaatctgt cctttcgaaa gatcccaacg aaaagcgtga ccacatggtc    720

cttcttgagt ttgtaactgc tgctgggatt acacatggca tggacgagct gtacaagggt    780
```

```
ggtggcgcgc ccatggggaa ttcagtcacc tacactaccc taatctctgg actgggaaag    840
gctggtcgct tagaagaggc tttagaactg ttcgaggaga tgaaagaaaa aggcatagtt    900
cccgatgttg tgacatacac cacactcatc agtggtcttg gaaaagcagg ccggcttgag    960
gaagctctgg aattgttcga ggaaatgaag gagaagggga tcgtgccgga tgtggttaca   1020
tacaacacgc ttattagcgg cctcggcaag gctggccgtc tggaggaggc gcttgagttg   1080
ttcgaagaga tgaaagagaa aggtatagtt ccggacgtgg tgacgtataa tacactcatc   1140
tccggtctag gcaaagccgg gagattggag gaagcgctag aactgttcga agaaatgaaa   1200
gagaagggta tagtaccaga cgtagtcaca tataccacgt tgatctctgg cctgggcaaa   1260
gccggtcgtc ttgaagaagc gctggaatta tttgaggaga tgaaggaaaa gggtattgtg   1320
cccaacgttg tgacgtacac cacgttgatc agtggccttg ggaaagcggg acgtctggaa   1380
gaagccctcg aattatttga agaaatgaag gaaaaaggta ttgttccgga tgttgtaact   1440
tacaccacgc tgataagtgg tctgggcaaa gctggacgct tagaggaggc cttagagctc   1500
tttgaggaaa tgaaagaaaa ggggattgtg cctgacgtgg tcacatatac caccctgatt   1560
agtggcttag gcaaagcagg tagactggag gaagcgctgg agctgtttga agagatgaag   1620
gagaaaggga ttgttccaga cgttgttacc tataatacgc tcatttctgg gctgggtaaa   1680
gcaggcaggt tagaagaagc actcgaactc tttgaagaga tgaaggagaa aggtatcgtt   1740
cccgacgtag taacctacaa tacgctgata tccggcttag gtaaagccgg tcggctggag   1800
gaagctctcg aactgtttga agaaatgaag gaaaaaggaa ttgttccaga tgttgttaca   1860
tatactacgt tgataagcgg gctcggtaaa gctggagttg atactggaaa cgctagccca   1920
agctctggat cagtatcatt atacgaggta gaaagatgtc aacagctatc tgctacaata   1980
cttacagatc atcagtattt ggagaggaca ccactatgtg ccattttgaa acaaaaagct   2040
cctcaacaat accgcatccg agcaaaattg aggtcatata agcccagaag actatttcag   2100
tctgttaaac ttcattgccc taaatgtcat ttgctgcaag aagttccaca tgagggcgat   2160
ttggatataa tttttcagga tggtgcaact aaaaccccag atgtcaagct acaaaataca   2220
tcattatatg attcaaaaat ctggaccact aaaaatcaaa aaggacgaaa agtagcagtt   2280
cattttgtga aaaataatgg tattctcccg ctttcaaatg aatgtctact tttgatagaa   2340
ggaggtacac tcagtgaaat ttgcaaactc tcgaacaagt ttaatagtgt aattcctgtg   2400
agatctggcc acgaagacct ggaacttttg gacctttcag caccatttct tatacaagga   2460
acaatacatc actatggatg taaacagtgt tctagtttga gatccataca aaatctaaat   2520
tccctggttg ataaaacatc gtggattcct tcttctgtgg cagaagcact gggtattgta   2580
cccctccaat atgtgtttgt tatgaccttt acacttgatg atggaacagg agtactagaa   2640
gcctatctca tggattctga caaattcttc cagattccag catcagaagt tctgatggat   2700
gatgaccttc agaaaagtgt ggatatgatc atggatatgt tttgtcctcc aggaataaaa   2760
attgatgcat atccgtggtt ggaatgcttc atcaagtcat acaatgtcac aaatggaaca   2820
gataatcaaa tttgctatca gatttttgac accacagttg cagaagatgt aatctaa      2877
```

<210> SEQ ID NO 28
<211> LENGTH: 20
<212> TYPE: PRT
<213> ORGANISM: Homo sapiens

<400> SEQUENCE: 28

```
Met Asp Lys Ala Glu Leu Ile Pro Glu Pro Pro Lys Lys Lys Arg Lys
1               5                   10                  15

Val Glu Leu Gly
            20


<210> SEQ ID NO 29
<211> LENGTH: 239
<212> TYPE: PRT
<213> ORGANISM: Homo sapiens

<400> SEQUENCE: 29

Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
    50                  55                  60

Leu Thr Tyr Gly Val Gln Cys Phe Ser Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
    130                 135                 140

Asn Tyr Asn Ser His Asn Val Tyr Ile Met Ala Asp Lys Gln Lys Asn
145                 150                 155                 160

Gly Ile Lys Val Asn Phe Lys Ile Arg His Asn Ile Glu Asp Gly Ser
                165                 170                 175

Val Gln Leu Ala Asp His Tyr Gln Gln Asn Thr Pro Ile Gly Asp Gly
            180                 185                 190

Pro Val Leu Leu Pro Asp Asn His Tyr Leu Ser Thr Gln Ser Ala Leu
        195                 200                 205

Ser Lys Asp Pro Asn Glu Lys Arg Asp His Met Val Leu Leu Glu Phe
    210                 215                 220

Val Thr Ala Ala Gly Ile Thr Leu Gly Met Asp Glu Leu Tyr Lys
225                 230                 235


<210> SEQ ID NO 30
<211> LENGTH: 239
<212> TYPE: PRT
<213> ORGANISM: Homo sapiens

<400> SEQUENCE: 30

Met Gly Ser Lys Gly Glu Glu Leu Phe Thr Gly Val Val Pro Ile Leu
1               5                   10                  15

Val Glu Leu Asp Gly Asp Val Asn Gly His Lys Phe Ser Val Arg Gly
            20                  25                  30

Glu Gly Glu Gly Asp Ala Thr Asn Gly Lys Leu Thr Leu Lys Phe Ile
        35                  40                  45

Cys Thr Thr Gly Lys Leu Pro Val Pro Trp Pro Thr Leu Val Thr Thr
    50                  55                  60
```

Leu Thr Tyr Gly Val Gln Cys Phe Ser Arg Tyr Pro Asp His Met Lys
65 70 75 80

Arg His Asp Phe Phe Lys Ser Ala Met Pro Glu Gly Tyr Val Gln Glu
85 90 95

Arg Thr Ile Ser Phe Lys Asp Asp Gly Thr Tyr Lys Thr Arg Ala Glu
100 105 110

Val Lys Phe Glu Gly Asp Thr Leu Val Asn Arg Ile Glu Leu Lys Gly
115 120 125

Ile Asp Phe Lys Glu Asp Gly Asn Ile Leu Gly His Lys Leu Glu Tyr
130 135 140

Asn Phe Asn Ser His Asn Val Tyr Ile Thr Ala Asp Lys Gln Lys Asn
145 150 155 160

Gly Ile Lys Ala Asn Phe Lys Ile Arg His Asn Val Glu Asp Gly Ser
165 170 175

Val Gln Leu Ala Asp His Tyr Gln Gln Asn Thr Pro Ile Gly Asp Gly
180 185 190

Pro Val Leu Leu Pro Asp Asn His Tyr Leu Ser Thr Gln Ser Val Leu
195 200 205

Ser Lys Asp Pro Asn Glu Lys Arg Asp His Met Val Leu Leu Glu Phe
210 215 220

Val Thr Ala Ala Gly Ile Thr His Gly Met Asp Glu Leu Tyr Lys
225 230 235

<210> SEQ ID NO 31
<211> LENGTH: 4
<212> TYPE: PRT
<213> ORGANISM: Homo sapiens

<400> SEQUENCE: 31

Gly Gly Ala Pro
1

<210> SEQ ID NO 32
<211> LENGTH: 368
<212> TYPE: PRT
<213> ORGANISM: Homo sapiens

<400> SEQUENCE: 32

Met Gly Asn Ser Val Thr Tyr Asn Thr Leu Ile Ser Gly Leu Gly Lys
1 5 10 15

Ala Gly Arg Leu Glu Glu Ala Leu Glu Leu Phe Glu Glu Met Lys Glu
20 25 30

Lys Gly Ile Val Pro Asp Val Val Thr Tyr Asn Thr Leu Ile Ser Gly
35 40 45

Leu Gly Lys Ala Gly Arg Leu Glu Glu Ala Leu Glu Leu Phe Glu Glu
50 55 60

Met Lys Glu Lys Gly Ile Val Pro Asp Val Val Thr Tyr Thr Thr Leu
65 70 75 80

Ile Ser Gly Leu Gly Lys Ala Gly Arg Leu Glu Glu Ala Leu Glu Leu
85 90 95

Phe Glu Glu Met Lys Glu Lys Gly Ile Val Pro Asn Val Val Thr Tyr
100 105 110

Thr Thr Leu Ile Ser Gly Leu Gly Lys Ala Gly Arg Leu Glu Glu Ala
115 120 125

Leu Glu Leu Phe Glu Glu Met Lys Glu Lys Gly Ile Val Pro Asp Val
130 135 140

```
Val Thr Tyr Thr Thr Leu Ile Ser Gly Leu Gly Lys Ala Gly Arg Leu
145                 150                 155                 160

Glu Glu Ala Leu Glu Leu Phe Glu Glu Met Lys Glu Lys Gly Ile Val
                165                 170                 175

Pro Asp Val Val Thr Tyr Thr Thr Leu Ile Ser Gly Leu Gly Lys Ala
            180                 185                 190

Gly Arg Leu Glu Glu Ala Leu Glu Leu Phe Glu Glu Met Lys Glu Lys
        195                 200                 205

Gly Ile Val Pro Asp Val Val Thr Tyr Asn Thr Leu Ile Ser Gly Leu
    210                 215                 220

Gly Lys Ala Gly Arg Leu Glu Glu Ala Leu Glu Leu Phe Glu Glu Met
225                 230                 235                 240

Lys Glu Lys Gly Ile Val Pro Asp Val Val Thr Tyr Asn Thr Leu Ile
                245                 250                 255

Ser Gly Leu Gly Lys Ala Gly Arg Leu Glu Glu Ala Leu Glu Leu Phe
            260                 265                 270

Glu Glu Met Lys Glu Lys Gly Ile Val Pro Asp Val Val Thr Tyr Thr
        275                 280                 285

Thr Leu Ile Ser Gly Leu Gly Lys Ala Gly Arg Leu Glu Glu Ala Leu
    290                 295                 300

Glu Leu Phe Glu Glu Met Lys Glu Lys Gly Ile Val Pro Asn Val Val
305                 310                 315                 320

Thr Tyr Thr Thr Leu Ile Ser Gly Leu Gly Lys Ala Gly Arg Leu Glu
                325                 330                 335

Glu Ala Leu Glu Leu Phe Glu Glu Met Lys Glu Lys Gly Ile Val Pro
            340                 345                 350

Asp Val Val Thr Tyr Thr Thr Leu Ile Ser Gly Leu Gly Lys Ala Gly
        355                 360                 365


<210> SEQ ID NO 33
<211> LENGTH: 7
<212> TYPE: PRT
<213> ORGANISM: Homo sapiens

<400> SEQUENCE: 33

Val Asp Thr Gly Asn Ala Ser
1               5


<210> SEQ ID NO 34
<211> LENGTH: 319
<212> TYPE: PRT
<213> ORGANISM: Homo sapiens

<400> SEQUENCE: 34

Pro Ser Ser Gly Ser Val Ser Leu Tyr Glu Val Glu Arg Cys Gln Gln
1               5                   10                  15

Leu Ser Ala Thr Ile Leu Thr Asp His Gln Tyr Leu Glu Arg Thr Pro
            20                  25                  30

Leu Cys Ala Ile Leu Lys Gln Lys Ala Pro Gln Gln Tyr Arg Ile Arg
        35                  40                  45

Ala Lys Leu Arg Ser Tyr Lys Pro Arg Arg Leu Phe Gln Ser Val Lys
    50                  55                  60

Leu His Cys Pro Lys Cys His Leu Leu Gln Glu Val Pro His Glu Gly
65                  70                  75                  80

Asp Leu Asp Ile Ile Phe Gln Asp Gly Ala Thr Lys Thr Pro Asp Val
                85                  90                  95
```

```
Lys Leu Gln Asn Thr Ser Leu Tyr Asp Ser Lys Ile Trp Thr Thr Lys
            100                 105                 110

Asn Gln Lys Gly Arg Lys Val Ala Val His Phe Val Lys Asn Asn Gly
        115                 120                 125

Ile Leu Pro Leu Ser Asn Glu Cys Leu Leu Leu Ile Glu Gly Gly Thr
    130                 135                 140

Leu Ser Glu Ile Cys Lys Leu Ser Asn Lys Phe Asn Ser Val Ile Pro
145                 150                 155                 160

Val Arg Ser Gly His Glu Asp Leu Glu Leu Leu Asp Leu Ser Ala Pro
                165                 170                 175

Phe Leu Ile Gln Gly Thr Ile His His Tyr Gly Cys Lys Gln Cys Ser
            180                 185                 190

Ser Leu Arg Ser Ile Gln Asn Leu Asn Ser Leu Val Asp Lys Thr Ser
        195                 200                 205

Trp Ile Pro Ser Ser Val Ala Glu Ala Leu Gly Ile Val Pro Leu Gln
    210                 215                 220

Tyr Val Phe Val Met Thr Phe Thr Leu Asp Asp Gly Thr Gly Val Leu
225                 230                 235                 240

Glu Ala Tyr Leu Met Asp Ser Asp Lys Phe Phe Gln Ile Pro Ala Ser
                245                 250                 255

Glu Val Leu Met Asp Asp Asp Leu Gln Lys Ser Val Asp Met Ile Met
            260                 265                 270

Asp Met Phe Cys Pro Pro Gly Ile Lys Ile Asp Ala Tyr Pro Trp Leu
        275                 280                 285

Glu Cys Phe Ile Lys Ser Tyr Asn Val Thr Asn Gly Thr Asp Asn Gln
    290                 295                 300

Ile Cys Tyr Gln Ile Phe Asp Thr Thr Val Ala Glu Asp Val Ile
305                 310                 315


<210> SEQ ID NO 35
<211> LENGTH: 368
<212> TYPE: PRT
<213> ORGANISM: Homo sapiens

<400> SEQUENCE: 35

Met Gly Asn Ser Val Thr Tyr Thr Thr Leu Ile Ser Gly Leu Gly Lys
1               5                   10                  15

Ala Gly Arg Leu Glu Glu Ala Leu Glu Leu Phe Glu Glu Met Lys Glu
            20                  25                  30

Lys Gly Ile Val Pro Asp Val Val Thr Tyr Thr Thr Leu Ile Ser Gly
        35                  40                  45

Leu Gly Lys Ala Gly Arg Leu Glu Glu Ala Leu Glu Leu Phe Glu Glu
    50                  55                  60

Met Lys Glu Lys Gly Ile Val Pro Asp Val Val Thr Tyr Asn Thr Leu
65                  70                  75                  80

Ile Ser Gly Leu Gly Lys Ala Gly Arg Leu Glu Glu Ala Leu Glu Leu
                85                  90                  95

Phe Glu Glu Met Lys Glu Lys Gly Ile Val Pro Asp Val Val Thr Tyr
            100                 105                 110

Asn Thr Leu Ile Ser Gly Leu Gly Lys Ala Gly Arg Leu Glu Glu Ala
        115                 120                 125

Leu Glu Leu Phe Glu Glu Met Lys Glu Lys Gly Ile Val Pro Asp Val
    130                 135                 140

Val Thr Tyr Thr Thr Leu Ile Ser Gly Leu Gly Lys Ala Gly Arg Leu
145                 150                 155                 160
```

Glu Glu Ala Leu Glu Leu Phe Glu Glu Met Lys Glu Lys Gly Ile Val
165 170 175

Pro Asn Val Val Thr Tyr Thr Thr Leu Ile Ser Gly Leu Gly Lys Ala
180 185 190

Gly Arg Leu Glu Glu Ala Leu Glu Leu Phe Glu Glu Met Lys Glu Lys
195 200 205

Gly Ile Val Pro Asp Val Val Thr Tyr Thr Thr Leu Ile Ser Gly Leu
210 215 220

Gly Lys Ala Gly Arg Leu Glu Glu Ala Leu Glu Leu Phe Glu Glu Met
225 230 235 240

Lys Glu Lys Gly Ile Val Pro Asp Val Val Thr Tyr Thr Thr Leu Ile
245 250 255

Ser Gly Leu Gly Lys Ala Gly Arg Leu Glu Glu Ala Leu Glu Leu Phe
260 265 270

Glu Glu Met Lys Glu Lys Gly Ile Val Pro Asp Val Val Thr Tyr Asn
275 280 285

Thr Leu Ile Ser Gly Leu Gly Lys Ala Gly Arg Leu Glu Glu Ala Leu
290 295 300

Glu Leu Phe Glu Glu Met Lys Glu Lys Gly Ile Val Pro Asp Val Val
305 310 315 320

Thr Tyr Asn Thr Leu Ile Ser Gly Leu Gly Lys Ala Gly Arg Leu Glu
325 330 335

Glu Ala Leu Glu Leu Phe Glu Glu Met Lys Glu Lys Gly Ile Val Pro
340 345 350

Asp Val Val Thr Tyr Thr Thr Leu Ile Ser Gly Leu Gly Lys Ala Gly
355 360 365

<210> SEQ ID NO 36
<211> LENGTH: 957
<212> TYPE: PRT
<213> ORGANISM: Homo sapiens

<400> SEQUENCE: 36

Met Asp Lys Ala Glu Leu Ile Pro Glu Pro Pro Lys Lys Lys Arg Lys
1 5 10 15

Val Glu Leu Gly Met Val Ser Lys Gly Glu Glu Leu Phe Thr Gly Val
20 25 30

Val Pro Ile Leu Val Glu Leu Asp Gly Asp Val Asn Gly His Lys Phe
35 40 45

Ser Val Ser Gly Glu Gly Glu Gly Asp Ala Thr Tyr Gly Lys Leu Thr
50 55 60

Leu Lys Phe Ile Cys Thr Thr Gly Lys Leu Pro Val Pro Trp Pro Thr
65 70 75 80

Leu Val Thr Thr Leu Thr Tyr Gly Val Gln Cys Phe Ser Arg Tyr Pro
85 90 95

Asp His Met Lys Gln His Asp Phe Phe Lys Ser Ala Met Pro Glu Gly
100 105 110

Tyr Val Gln Glu Arg Thr Ile Phe Phe Lys Asp Asp Gly Asn Tyr Lys
115 120 125

Thr Arg Ala Glu Val Lys Phe Glu Gly Asp Thr Leu Val Asn Arg Ile
130 135 140

Glu Leu Lys Gly Ile Asp Phe Lys Glu Asp Gly Asn Ile Leu Gly His
145 150 155 160

Lys Leu Glu Tyr Asn Tyr Asn Ser His Asn Val Tyr Ile Met Ala Asp

```
                165                 170                 175

Lys Gln Lys Asn Gly Ile Lys Val Asn Phe Lys Ile Arg His Asn Ile
            180                 185                 190

Glu Asp Gly Ser Val Gln Leu Ala Asp His Tyr Gln Gln Asn Thr Pro
        195                 200                 205

Ile Gly Asp Gly Pro Val Leu Leu Pro Asp Asn His Tyr Leu Ser Thr
    210                 215                 220

Gln Ser Ala Leu Ser Lys Asp Pro Asn Glu Lys Arg Asp His Met Val
225                 230                 235                 240

Leu Leu Glu Phe Val Thr Ala Ala Gly Ile Thr Leu Gly Met Asp Glu
                245                 250                 255

Leu Tyr Lys Gly Gly Ala Pro Met Gly Asn Ser Val Thr Tyr Asn Thr
            260                 265                 270

Leu Ile Ser Gly Leu Gly Lys Ala Gly Arg Leu Glu Glu Ala Leu Glu
        275                 280                 285

Leu Phe Glu Glu Met Lys Glu Lys Gly Ile Val Pro Asp Val Val Thr
    290                 295                 300

Tyr Asn Thr Leu Ile Ser Gly Leu Gly Lys Ala Gly Arg Leu Glu Glu
305                 310                 315                 320

Ala Leu Glu Leu Phe Glu Glu Met Lys Glu Lys Gly Ile Val Pro Asp
                325                 330                 335

Val Val Thr Tyr Thr Thr Leu Ile Ser Gly Leu Gly Lys Ala Gly Arg
            340                 345                 350

Leu Glu Glu Ala Leu Glu Leu Phe Glu Glu Met Lys Glu Lys Gly Ile
        355                 360                 365

Val Pro Asn Val Val Thr Tyr Thr Thr Leu Ile Ser Gly Leu Gly Lys
    370                 375                 380

Ala Gly Arg Leu Glu Glu Ala Leu Glu Leu Phe Glu Glu Met Lys Glu
385                 390                 395                 400

Lys Gly Ile Val Pro Asp Val Val Thr Tyr Thr Thr Leu Ile Ser Gly
                405                 410                 415

Leu Gly Lys Ala Gly Arg Leu Glu Glu Ala Leu Glu Leu Phe Glu Glu
            420                 425                 430

Met Lys Glu Lys Gly Ile Val Pro Asp Val Val Thr Tyr Thr Thr Leu
        435                 440                 445

Ile Ser Gly Leu Gly Lys Ala Gly Arg Leu Glu Glu Ala Leu Glu Leu
    450                 455                 460

Phe Glu Glu Met Lys Glu Lys Gly Ile Val Pro Asp Val Val Thr Tyr
465                 470                 475                 480

Asn Thr Leu Ile Ser Gly Leu Gly Lys Ala Gly Arg Leu Glu Glu Ala
                485                 490                 495

Leu Glu Leu Phe Glu Glu Met Lys Glu Lys Gly Ile Val Pro Asp Val
            500                 505                 510

Val Thr Tyr Asn Thr Leu Ile Ser Gly Leu Gly Lys Ala Gly Arg Leu
        515                 520                 525

Glu Glu Ala Leu Glu Leu Phe Glu Glu Met Lys Glu Lys Gly Ile Val
    530                 535                 540

Pro Asp Val Val Thr Tyr Thr Thr Leu Ile Ser Gly Leu Gly Lys Ala
545                 550                 555                 560

Gly Arg Leu Glu Glu Ala Leu Glu Leu Phe Glu Glu Met Lys Glu Lys
                565                 570                 575

Gly Ile Val Pro Asn Val Val Thr Tyr Thr Thr Leu Ile Ser Gly Leu
            580                 585                 590
```

```
Gly Lys Ala Gly Arg Leu Glu Glu Ala Leu Glu Leu Phe Glu Glu Met
        595                 600                 605

Lys Glu Lys Gly Ile Val Pro Asp Val Val Thr Tyr Thr Thr Leu Ile
    610                 615                 620

Ser Gly Leu Gly Lys Ala Gly Val Asp Thr Gly Asn Ala Ser Pro Ser
625                 630                 635                 640

Ser Gly Ser Val Ser Leu Tyr Glu Val Glu Arg Cys Gln Gln Leu Ser
                645                 650                 655

Ala Thr Ile Leu Thr Asp His Gln Tyr Leu Glu Arg Thr Pro Leu Cys
            660                 665                 670

Ala Ile Leu Lys Gln Lys Ala Pro Gln Gln Tyr Arg Ile Arg Ala Lys
        675                 680                 685

Leu Arg Ser Tyr Lys Pro Arg Arg Leu Phe Gln Ser Val Lys Leu His
    690                 695                 700

Cys Pro Lys Cys His Leu Leu Gln Glu Val Pro His Glu Gly Asp Leu
705                 710                 715                 720

Asp Ile Ile Phe Gln Asp Gly Ala Thr Lys Thr Pro Asp Val Lys Leu
                725                 730                 735

Gln Asn Thr Ser Leu Tyr Asp Ser Lys Ile Trp Thr Thr Lys Asn Gln
            740                 745                 750

Lys Gly Arg Lys Val Ala Val His Phe Val Lys Asn Asn Gly Ile Leu
        755                 760                 765

Pro Leu Ser Asn Glu Cys Leu Leu Leu Ile Glu Gly Gly Thr Leu Ser
    770                 775                 780

Glu Ile Cys Lys Leu Ser Asn Lys Phe Asn Ser Val Ile Pro Val Arg
785                 790                 795                 800

Ser Gly His Glu Asp Leu Glu Leu Leu Asp Leu Ser Ala Pro Phe Leu
                805                 810                 815

Ile Gln Gly Thr Ile His His Tyr Gly Cys Lys Gln Cys Ser Ser Leu
            820                 825                 830

Arg Ser Ile Gln Asn Leu Asn Ser Leu Val Asp Lys Thr Ser Trp Ile
        835                 840                 845

Pro Ser Ser Val Ala Glu Ala Leu Gly Ile Val Pro Leu Gln Tyr Val
    850                 855                 860

Phe Val Met Thr Phe Thr Leu Asp Asp Gly Thr Gly Val Leu Glu Ala
865                 870                 875                 880

Tyr Leu Met Asp Ser Asp Lys Phe Phe Gln Ile Pro Ala Ser Glu Val
                885                 890                 895

Leu Met Asp Asp Asp Leu Gln Lys Ser Val Asp Met Ile Met Asp Met
            900                 905                 910

Phe Cys Pro Pro Gly Ile Lys Ile Asp Ala Tyr Pro Trp Leu Glu Cys
        915                 920                 925

Phe Ile Lys Ser Tyr Asn Val Thr Asn Gly Thr Asp Asn Gln Ile Cys
    930                 935                 940

Tyr Gln Ile Phe Asp Thr Thr Val Ala Glu Asp Val Ile
945                 950                 955


<210> SEQ ID NO 37
<211> LENGTH: 957
<212> TYPE: PRT
<213> ORGANISM: Homo sapiens

<400> SEQUENCE: 37

Met Asp Lys Ala Glu Leu Ile Pro Glu Pro Pro Lys Lys Lys Arg Lys
```

```
1               5                   10                  15

Val Glu Leu Gly Met Val Ser Lys Gly Glu Glu Leu Phe Thr Gly Val
            20                  25                  30

Val Pro Ile Leu Val Glu Leu Asp Gly Asp Val Asn Gly His Lys Phe
        35                  40                  45

Ser Val Ser Gly Glu Gly Glu Gly Asp Ala Thr Tyr Gly Lys Leu Thr
    50                  55                  60

Leu Lys Phe Ile Cys Thr Thr Gly Lys Leu Pro Val Pro Trp Pro Thr
65                  70                  75                  80

Leu Val Thr Thr Leu Thr Tyr Gly Val Gln Cys Phe Ser Arg Tyr Pro
                85                  90                  95

Asp His Met Lys Gln His Asp Phe Phe Lys Ser Ala Met Pro Glu Gly
            100                 105                 110

Tyr Val Gln Glu Arg Thr Ile Phe Phe Lys Asp Asp Gly Asn Tyr Lys
        115                 120                 125

Thr Arg Ala Glu Val Lys Phe Glu Gly Asp Thr Leu Val Asn Arg Ile
    130                 135                 140

Glu Leu Lys Gly Ile Asp Phe Lys Glu Asp Gly Asn Ile Leu Gly His
145                 150                 155                 160

Lys Leu Glu Tyr Asn Tyr Asn Ser His Asn Val Tyr Ile Met Ala Asp
                165                 170                 175

Lys Gln Lys Asn Gly Ile Lys Val Asn Phe Lys Ile Arg His Asn Ile
            180                 185                 190

Glu Asp Gly Ser Val Gln Leu Ala Asp His Tyr Gln Gln Asn Thr Pro
        195                 200                 205

Ile Gly Asp Gly Pro Val Leu Leu Pro Asp Asn His Tyr Leu Ser Thr
    210                 215                 220

Gln Ser Ala Leu Ser Lys Asp Pro Asn Glu Lys Arg Asp His Met Val
225                 230                 235                 240

Leu Leu Glu Phe Val Thr Ala Ala Gly Ile Thr Leu Gly Met Asp Glu
                245                 250                 255

Leu Tyr Lys Gly Gly Ala Pro Met Gly Asn Ser Val Thr Tyr Thr Thr
            260                 265                 270

Leu Ile Ser Gly Leu Gly Lys Ala Gly Arg Leu Glu Glu Ala Leu Glu
        275                 280                 285

Leu Phe Glu Glu Met Lys Glu Lys Gly Ile Val Pro Asp Val Val Thr
    290                 295                 300

Tyr Thr Thr Leu Ile Ser Gly Leu Gly Lys Ala Gly Arg Leu Glu Glu
305                 310                 315                 320

Ala Leu Glu Leu Phe Glu Glu Met Lys Glu Lys Gly Ile Val Pro Asp
                325                 330                 335

Val Val Thr Tyr Asn Thr Leu Ile Ser Gly Leu Gly Lys Ala Gly Arg
            340                 345                 350

Leu Glu Glu Ala Leu Glu Leu Phe Glu Glu Met Lys Glu Lys Gly Ile
        355                 360                 365

Val Pro Asp Val Val Thr Tyr Asn Thr Leu Ile Ser Gly Leu Gly Lys
    370                 375                 380

Ala Gly Arg Leu Glu Glu Ala Leu Glu Leu Phe Glu Glu Met Lys Glu
385                 390                 395                 400

Lys Gly Ile Val Pro Asp Val Val Thr Tyr Thr Thr Leu Ile Ser Gly
                405                 410                 415

Leu Gly Lys Ala Gly Arg Leu Glu Glu Ala Leu Glu Leu Phe Glu Glu
            420                 425                 430
```

-continued

```
Met Lys Glu Lys Gly Ile Val Pro Asn Val Val Thr Tyr Thr Thr Leu
        435                 440                 445

Ile Ser Gly Leu Gly Lys Ala Gly Arg Leu Glu Glu Ala Leu Glu Leu
    450                 455                 460

Phe Glu Glu Met Lys Glu Lys Gly Ile Val Pro Asp Val Val Thr Tyr
465                 470                 475                 480

Thr Thr Leu Ile Ser Gly Leu Gly Lys Ala Gly Arg Leu Glu Glu Ala
                485                 490                 495

Leu Glu Leu Phe Glu Glu Met Lys Glu Lys Gly Ile Val Pro Asp Val
            500                 505                 510

Val Thr Tyr Thr Thr Leu Ile Ser Gly Leu Gly Lys Ala Gly Arg Leu
        515                 520                 525

Glu Glu Ala Leu Glu Leu Phe Glu Glu Met Lys Glu Lys Gly Ile Val
    530                 535                 540

Pro Asp Val Val Thr Tyr Asn Thr Leu Ile Ser Gly Leu Gly Lys Ala
545                 550                 555                 560

Gly Arg Leu Glu Glu Ala Leu Glu Leu Phe Glu Glu Met Lys Glu Lys
                565                 570                 575

Gly Ile Val Pro Asp Val Val Thr Tyr Asn Thr Leu Ile Ser Gly Leu
            580                 585                 590

Gly Lys Ala Gly Arg Leu Glu Glu Ala Leu Glu Leu Phe Glu Glu Met
        595                 600                 605

Lys Glu Lys Gly Ile Val Pro Asp Val Val Thr Tyr Thr Thr Leu Ile
    610                 615                 620

Ser Gly Leu Gly Lys Ala Gly Val Asp Thr Gly Asn Ala Ser Pro Ser
625                 630                 635                 640

Ser Gly Ser Val Ser Leu Tyr Glu Val Glu Arg Cys Gln Gln Leu Ser
                645                 650                 655

Ala Thr Ile Leu Thr Asp His Gln Tyr Leu Glu Arg Thr Pro Leu Cys
            660                 665                 670

Ala Ile Leu Lys Gln Lys Ala Pro Gln Gln Tyr Arg Ile Arg Ala Lys
        675                 680                 685

Leu Arg Ser Tyr Lys Pro Arg Arg Leu Phe Gln Ser Val Lys Leu His
    690                 695                 700

Cys Pro Lys Cys His Leu Leu Gln Glu Val Pro His Glu Gly Asp Leu
705                 710                 715                 720

Asp Ile Ile Phe Gln Asp Gly Ala Thr Lys Thr Pro Asp Val Lys Leu
                725                 730                 735

Gln Asn Thr Ser Leu Tyr Asp Ser Lys Ile Trp Thr Thr Lys Asn Gln
            740                 745                 750

Lys Gly Arg Lys Val Ala Val His Phe Val Lys Asn Asn Gly Ile Leu
        755                 760                 765

Pro Leu Ser Asn Glu Cys Leu Leu Leu Ile Glu Gly Gly Thr Leu Ser
    770                 775                 780

Glu Ile Cys Lys Leu Ser Asn Lys Phe Asn Ser Val Ile Pro Val Arg
785                 790                 795                 800

Ser Gly His Glu Asp Leu Glu Leu Leu Asp Leu Ser Ala Pro Phe Leu
                805                 810                 815

Ile Gln Gly Thr Ile His His Tyr Gly Cys Lys Gln Cys Ser Ser Leu
            820                 825                 830

Arg Ser Ile Gln Asn Leu Asn Ser Leu Val Asp Lys Thr Ser Trp Ile
        835                 840                 845
```

```
Pro Ser Ser Val Ala Glu Ala Leu Gly Ile Val Pro Leu Gln Tyr Val
    850                 855                 860

Phe Val Met Thr Phe Thr Leu Asp Asp Gly Thr Gly Val Leu Glu Ala
865                 870                 875                 880

Tyr Leu Met Asp Ser Asp Lys Phe Phe Gln Ile Pro Ala Ser Glu Val
                885                 890                 895

Leu Met Asp Asp Asp Leu Gln Lys Ser Val Asp Met Ile Met Asp Met
            900                 905                 910

Phe Cys Pro Pro Gly Ile Lys Ile Asp Ala Tyr Pro Trp Leu Glu Cys
        915                 920                 925

Phe Ile Lys Ser Tyr Asn Val Thr Asn Gly Thr Asp Asn Gln Ile Cys
    930                 935                 940

Tyr Gln Ile Phe Asp Thr Thr Val Ala Glu Asp Val Ile
945                 950                 955


<210> SEQ ID NO 38
<211> LENGTH: 957
<212> TYPE: PRT
<213> ORGANISM: Homo sapiens

<400> SEQUENCE: 38

Met Asp Lys Ala Glu Leu Ile Pro Glu Pro Pro Lys Lys Lys Arg Lys
1               5                   10                  15

Val Glu Leu Gly Met Gly Ser Lys Gly Glu Glu Leu Phe Thr Gly Val
            20                  25                  30

Val Pro Ile Leu Val Glu Leu Asp Gly Asp Val Asn Gly His Lys Phe
        35                  40                  45

Ser Val Arg Gly Glu Gly Glu Gly Asp Ala Thr Asn Gly Lys Leu Thr
    50                  55                  60

Leu Lys Phe Ile Cys Thr Thr Gly Lys Leu Pro Val Pro Trp Pro Thr
65                  70                  75                  80

Leu Val Thr Thr Leu Thr Tyr Gly Val Gln Cys Phe Ser Arg Tyr Pro
                85                  90                  95

Asp His Met Lys Arg His Asp Phe Phe Lys Ser Ala Met Pro Glu Gly
            100                 105                 110

Tyr Val Gln Glu Arg Thr Ile Ser Phe Lys Asp Asp Gly Thr Tyr Lys
        115                 120                 125

Thr Arg Ala Glu Val Lys Phe Glu Gly Asp Thr Leu Val Asn Arg Ile
    130                 135                 140

Glu Leu Lys Gly Ile Asp Phe Lys Glu Asp Gly Asn Ile Leu Gly His
145                 150                 155                 160

Lys Leu Glu Tyr Asn Phe Asn Ser His Asn Val Tyr Ile Thr Ala Asp
                165                 170                 175

Lys Gln Lys Asn Gly Ile Lys Ala Asn Phe Lys Ile Arg His Asn Val
            180                 185                 190

Glu Asp Gly Ser Val Gln Leu Ala Asp His Tyr Gln Gln Asn Thr Pro
        195                 200                 205

Ile Gly Asp Gly Pro Val Leu Leu Pro Asp Asn His Tyr Leu Ser Thr
    210                 215                 220

Gln Ser Val Leu Ser Lys Asp Pro Asn Glu Lys Arg Asp His Met Val
225                 230                 235                 240

Leu Leu Glu Phe Val Thr Ala Ala Gly Ile Thr His Gly Met Asp Glu
                245                 250                 255

Leu Tyr Lys Gly Gly Ala Pro Met Gly Asn Ser Val Thr Tyr Asn Thr
            260                 265                 270
```

```
Leu Ile Ser Gly Leu Gly Lys Ala Gly Arg Leu Glu Glu Ala Leu Glu
        275                 280                 285

Leu Phe Glu Glu Met Lys Glu Lys Gly Ile Val Pro Asp Val Val Thr
    290                 295                 300

Tyr Asn Thr Leu Ile Ser Gly Leu Gly Lys Ala Gly Arg Leu Glu Glu
305                 310                 315                 320

Ala Leu Glu Leu Phe Glu Glu Met Lys Glu Lys Gly Ile Val Pro Asp
                325                 330                 335

Val Val Thr Tyr Thr Thr Leu Ile Ser Gly Leu Gly Lys Ala Gly Arg
            340                 345                 350

Leu Glu Glu Ala Leu Glu Leu Phe Glu Glu Met Lys Glu Lys Gly Ile
        355                 360                 365

Val Pro Asn Val Val Thr Tyr Thr Thr Leu Ile Ser Gly Leu Gly Lys
    370                 375                 380

Ala Gly Arg Leu Glu Glu Ala Leu Glu Leu Phe Glu Glu Met Lys Glu
385                 390                 395                 400

Lys Gly Ile Val Pro Asp Val Val Thr Tyr Thr Thr Leu Ile Ser Gly
                405                 410                 415

Leu Gly Lys Ala Gly Arg Leu Glu Glu Ala Leu Glu Leu Phe Glu Glu
            420                 425                 430

Met Lys Glu Lys Gly Ile Val Pro Asp Val Val Thr Tyr Thr Thr Leu
        435                 440                 445

Ile Ser Gly Leu Gly Lys Ala Gly Arg Leu Glu Glu Ala Leu Glu Leu
    450                 455                 460

Phe Glu Glu Met Lys Glu Lys Gly Ile Val Pro Asp Val Val Thr Tyr
465                 470                 475                 480

Asn Thr Leu Ile Ser Gly Leu Gly Lys Ala Gly Arg Leu Glu Glu Ala
                485                 490                 495

Leu Glu Leu Phe Glu Glu Met Lys Glu Lys Gly Ile Val Pro Asp Val
            500                 505                 510

Val Thr Tyr Asn Thr Leu Ile Ser Gly Leu Gly Lys Ala Gly Arg Leu
        515                 520                 525

Glu Glu Ala Leu Glu Leu Phe Glu Glu Met Lys Glu Lys Gly Ile Val
    530                 535                 540

Pro Asp Val Val Thr Tyr Thr Thr Leu Ile Ser Gly Leu Gly Lys Ala
545                 550                 555                 560

Gly Arg Leu Glu Glu Ala Leu Glu Leu Phe Glu Glu Met Lys Glu Lys
                565                 570                 575

Gly Ile Val Pro Asn Val Val Thr Tyr Thr Thr Leu Ile Ser Gly Leu
            580                 585                 590

Gly Lys Ala Gly Arg Leu Glu Glu Ala Leu Glu Leu Phe Glu Glu Met
        595                 600                 605

Lys Glu Lys Gly Ile Val Pro Asp Val Val Thr Tyr Thr Thr Leu Ile
    610                 615                 620

Ser Gly Leu Gly Lys Ala Gly Val Asp Thr Gly Asn Ala Ser Pro Ser
625                 630                 635                 640

Ser Gly Ser Val Ser Leu Tyr Glu Val Glu Arg Cys Gln Gln Leu Ser
                645                 650                 655

Ala Thr Ile Leu Thr Asp His Gln Tyr Leu Glu Arg Thr Pro Leu Cys
            660                 665                 670

Ala Ile Leu Lys Gln Lys Ala Pro Gln Gln Tyr Arg Ile Arg Ala Lys
        675                 680                 685
```

```
Leu Arg Ser Tyr Lys Pro Arg Arg Leu Phe Gln Ser Val Lys Leu His
    690                 695                 700

Cys Pro Lys Cys His Leu Leu Gln Glu Val Pro His Glu Gly Asp Leu
705                 710                 715                 720

Asp Ile Ile Phe Gln Asp Gly Ala Thr Lys Thr Pro Asp Val Lys Leu
                725                 730                 735

Gln Asn Thr Ser Leu Tyr Asp Ser Lys Ile Trp Thr Thr Lys Asn Gln
            740                 745                 750

Lys Gly Arg Lys Val Ala Val His Phe Val Lys Asn Asn Gly Ile Leu
        755                 760                 765

Pro Leu Ser Asn Glu Cys Leu Leu Leu Ile Glu Gly Gly Thr Leu Ser
    770                 775                 780

Glu Ile Cys Lys Leu Ser Asn Lys Phe Asn Ser Val Ile Pro Val Arg
785                 790                 795                 800

Ser Gly His Glu Asp Leu Glu Leu Leu Asp Leu Ser Ala Pro Phe Leu
                805                 810                 815

Ile Gln Gly Thr Ile His His Tyr Gly Cys Lys Gln Cys Ser Ser Leu
            820                 825                 830

Arg Ser Ile Gln Asn Leu Asn Ser Leu Val Asp Lys Thr Ser Trp Ile
        835                 840                 845

Pro Ser Ser Val Ala Glu Ala Leu Gly Ile Val Pro Leu Gln Tyr Val
    850                 855                 860

Phe Val Met Thr Phe Thr Leu Asp Asp Gly Thr Gly Val Leu Glu Ala
865                 870                 875                 880

Tyr Leu Met Asp Ser Asp Lys Phe Phe Gln Ile Pro Ala Ser Glu Val
                885                 890                 895

Leu Met Asp Asp Asp Leu Gln Lys Ser Val Asp Met Ile Met Asp Met
            900                 905                 910

Phe Cys Pro Pro Gly Ile Lys Ile Asp Ala Tyr Pro Trp Leu Glu Cys
        915                 920                 925

Phe Ile Lys Ser Tyr Asn Val Thr Asn Gly Thr Asp Asn Gln Ile Cys
    930                 935                 940

Tyr Gln Ile Phe Asp Thr Thr Val Ala Glu Asp Val Ile
945                 950                 955
```

```
<210> SEQ ID NO 39
<211> LENGTH: 957
<212> TYPE: PRT
<213> ORGANISM: Homo sapiens

<400> SEQUENCE: 39

Met Asp Lys Ala Glu Leu Ile Pro Glu Pro Pro Lys Lys Lys Arg Lys
1               5                   10                  15

Val Glu Leu Gly Met Gly Ser Lys Gly Glu Glu Leu Phe Thr Gly Val
            20                  25                  30

Val Pro Ile Leu Val Glu Leu Asp Gly Asp Val Asn Gly His Lys Phe
        35                  40                  45

Ser Val Arg Gly Glu Gly Glu Gly Asp Ala Thr Asn Gly Lys Leu Thr
    50                  55                  60

Leu Lys Phe Ile Cys Thr Thr Gly Lys Leu Pro Val Pro Trp Pro Thr
65                  70                  75                  80

Leu Val Thr Thr Leu Thr Tyr Gly Val Gln Cys Phe Ser Arg Tyr Pro
                85                  90                  95

Asp His Met Lys Arg His Asp Phe Phe Lys Ser Ala Met Pro Glu Gly
            100                 105                 110
```

```
Tyr Val Gln Glu Arg Thr Ile Ser Phe Lys Asp Asp Gly Thr Tyr Lys
        115                 120                 125

Thr Arg Ala Glu Val Lys Phe Glu Gly Asp Thr Leu Val Asn Arg Ile
    130                 135                 140

Glu Leu Lys Gly Ile Asp Phe Lys Glu Asp Gly Asn Ile Leu Gly His
145                 150                 155                 160

Lys Leu Glu Tyr Asn Phe Asn Ser His Asn Val Tyr Ile Thr Ala Asp
                165                 170                 175

Lys Gln Lys Asn Gly Ile Lys Ala Asn Phe Lys Ile Arg His Asn Val
            180                 185                 190

Glu Asp Gly Ser Val Gln Leu Ala Asp His Tyr Gln Gln Asn Thr Pro
        195                 200                 205

Ile Gly Asp Gly Pro Val Leu Leu Pro Asp Asn His Tyr Leu Ser Thr
    210                 215                 220

Gln Ser Val Leu Ser Lys Asp Pro Asn Glu Lys Arg Asp His Met Val
225                 230                 235                 240

Leu Leu Glu Phe Val Thr Ala Ala Gly Ile Thr His Gly Met Asp Glu
                245                 250                 255

Leu Tyr Lys Gly Gly Ala Pro Met Gly Asn Ser Val Thr Tyr Thr Thr
            260                 265                 270

Leu Ile Ser Gly Leu Gly Lys Ala Gly Arg Leu Glu Glu Ala Leu Glu
        275                 280                 285

Leu Phe Glu Glu Met Lys Glu Lys Gly Ile Val Pro Asp Val Val Thr
    290                 295                 300

Tyr Thr Thr Leu Ile Ser Gly Leu Gly Lys Ala Gly Arg Leu Glu Glu
305                 310                 315                 320

Ala Leu Glu Leu Phe Glu Glu Met Lys Glu Lys Gly Ile Val Pro Asp
                325                 330                 335

Val Val Thr Tyr Asn Thr Leu Ile Ser Gly Leu Gly Lys Ala Gly Arg
            340                 345                 350

Leu Glu Glu Ala Leu Glu Leu Phe Glu Glu Met Lys Glu Lys Gly Ile
        355                 360                 365

Val Pro Asp Val Val Thr Tyr Asn Thr Leu Ile Ser Gly Leu Gly Lys
    370                 375                 380

Ala Gly Arg Leu Glu Glu Ala Leu Glu Leu Phe Glu Glu Met Lys Glu
385                 390                 395                 400

Lys Gly Ile Val Pro Asp Val Val Thr Tyr Thr Thr Leu Ile Ser Gly
                405                 410                 415

Leu Gly Lys Ala Gly Arg Leu Glu Glu Ala Leu Glu Leu Phe Glu Glu
            420                 425                 430

Met Lys Glu Lys Gly Ile Val Pro Asn Val Val Thr Tyr Thr Thr Leu
        435                 440                 445

Ile Ser Gly Leu Gly Lys Ala Gly Arg Leu Glu Glu Ala Leu Glu Leu
    450                 455                 460

Phe Glu Glu Met Lys Glu Lys Gly Ile Val Pro Asp Val Val Thr Tyr
465                 470                 475                 480

Thr Thr Leu Ile Ser Gly Leu Gly Lys Ala Gly Arg Leu Glu Glu Ala
                485                 490                 495

Leu Glu Leu Phe Glu Glu Met Lys Glu Lys Gly Ile Val Pro Asp Val
            500                 505                 510

Val Thr Tyr Thr Thr Leu Ile Ser Gly Leu Gly Lys Ala Gly Arg Leu
        515                 520                 525
```

-continued

```
Glu Glu Ala Leu Glu Leu Phe Glu Glu Met Lys Glu Lys Gly Ile Val
    530                 535                 540

Pro Asp Val Val Thr Tyr Asn Thr Leu Ile Ser Gly Leu Gly Lys Ala
545                 550                 555                 560

Gly Arg Leu Glu Glu Ala Leu Glu Leu Phe Glu Glu Met Lys Glu Lys
                565                 570                 575

Gly Ile Val Pro Asp Val Val Thr Tyr Asn Thr Leu Ile Ser Gly Leu
            580                 585                 590

Gly Lys Ala Gly Arg Leu Glu Glu Ala Leu Glu Leu Phe Glu Glu Met
        595                 600                 605

Lys Glu Lys Gly Ile Val Pro Asp Val Val Thr Tyr Thr Thr Leu Ile
    610                 615                 620

Ser Gly Leu Gly Lys Ala Gly Val Asp Thr Gly Asn Ala Ser Pro Ser
625                 630                 635                 640

Ser Gly Ser Val Ser Leu Tyr Glu Val Glu Arg Cys Gln Gln Leu Ser
                645                 650                 655

Ala Thr Ile Leu Thr Asp His Gln Tyr Leu Glu Arg Thr Pro Leu Cys
            660                 665                 670

Ala Ile Leu Lys Gln Lys Ala Pro Gln Gln Tyr Arg Ile Arg Ala Lys
        675                 680                 685

Leu Arg Ser Tyr Lys Pro Arg Arg Leu Phe Gln Ser Val Lys Leu His
    690                 695                 700

Cys Pro Lys Cys His Leu Leu Gln Glu Val Pro His Glu Gly Asp Leu
705                 710                 715                 720

Asp Ile Ile Phe Gln Asp Gly Ala Thr Lys Thr Pro Asp Val Lys Leu
                725                 730                 735

Gln Asn Thr Ser Leu Tyr Asp Ser Lys Ile Trp Thr Thr Lys Asn Gln
            740                 745                 750

Lys Gly Arg Lys Val Ala Val His Phe Val Lys Asn Asn Gly Ile Leu
        755                 760                 765

Pro Leu Ser Asn Glu Cys Leu Leu Leu Ile Glu Gly Gly Thr Leu Ser
    770                 775                 780

Glu Ile Cys Lys Leu Ser Asn Lys Phe Asn Ser Val Ile Pro Val Arg
785                 790                 795                 800

Ser Gly His Glu Asp Leu Glu Leu Leu Asp Leu Ser Ala Pro Phe Leu
                805                 810                 815

Ile Gln Gly Thr Ile His His Tyr Gly Cys Lys Gln Cys Ser Ser Leu
            820                 825                 830

Arg Ser Ile Gln Asn Leu Asn Ser Leu Val Asp Lys Thr Ser Trp Ile
        835                 840                 845

Pro Ser Ser Val Ala Glu Ala Leu Gly Ile Val Pro Leu Gln Tyr Val
    850                 855                 860

Phe Val Met Thr Phe Thr Leu Asp Asp Gly Thr Gly Val Leu Glu Ala
865                 870                 875                 880

Tyr Leu Met Asp Ser Asp Lys Phe Phe Gln Ile Pro Ala Ser Glu Val
                885                 890                 895

Leu Met Asp Asp Asp Leu Gln Lys Ser Val Asp Met Ile Met Asp Met
            900                 905                 910

Phe Cys Pro Pro Gly Ile Lys Ile Asp Ala Tyr Pro Trp Leu Glu Cys
        915                 920                 925

Phe Ile Lys Ser Tyr Asn Val Thr Asn Gly Thr Asp Asn Gln Ile Cys
    930                 935                 940

Tyr Gln Ile Phe Asp Thr Thr Val Ala Glu Asp Val Ile
```

945 950 955

<210> SEQ ID NO 40
<211> LENGTH: 10
<212> TYPE: DNA
<213> ORGANISM: Artificial Sequence
<220> FEATURE:
<223> OTHER INFORMATION: Synthetic construct

<400> SEQUENCE: 40
ttagggttag 10

<210> SEQ ID NO 41
<211> LENGTH: 24
<212> TYPE: DNA
<213> ORGANISM: Homo sapiens

<400> SEQUENCE: 41
cggtggaagg cggcaggccg aggc 24

<210> SEQ ID NO 42
<211> LENGTH: 17
<212> TYPE: DNA
<213> ORGANISM: Artificial Sequence
<220> FEATURE:
<223> OTHER INFORMATION: Synthetic construct

<400> SEQUENCE: 42
ctttatccag ccctcac 17

<210> SEQ ID NO 43
<211> LENGTH: 19
<212> TYPE: DNA
<213> ORGANISM: Artificial Sequence
<220> FEATURE:
<223> OTHER INFORMATION: Synthetic construct

<400> SEQUENCE: 43
ctatagtgtc acctaaatc 19

<210> SEQ ID NO 44
<211> LENGTH: 12
<212> TYPE: DNA
<213> ORGANISM: Artificial Sequence
<220> FEATURE:
<223> OTHER INFORMATION: Synthetic construct

<400> SEQUENCE: 44
ggttagggtt ag 12

<210> SEQ ID NO 45
<211> LENGTH: 18
<212> TYPE: DNA
<213> ORGANISM: Artificial Sequence
<220> FEATURE:
<223> OTHER INFORMATION: Synthetic construct

<400> SEQUENCE: 45
ttagggttag ggttaggg 18

<210> SEQ ID NO 46
<211> LENGTH: 20
<212> TYPE: DNA
<213> ORGANISM: Artificial Sequence
<220> FEATURE:
<223> OTHER INFORMATION: Synthetic construct

<400> SEQUENCE: 46
ggttagggtt agggttaggg 20

<210> SEQ ID NO 47
<211> LENGTH: 14
<212> TYPE: DNA
<213> ORGANISM: Artificial Sequence
<220> FEATURE:
<223> OTHER INFORMATION: Synthetic construct

<400> SEQUENCE: 47
ttagggttag ggtt 14

<210> SEQ ID NO 48
<211> LENGTH: 16
<212> TYPE: DNA
<213> ORGANISM: Artificial Sequence
<220> FEATURE:
<223> OTHER INFORMATION: Synthetic construct

<400> SEQUENCE: 48
ttagggttag ggttag 16

<210> SEQ ID NO 49
<211> LENGTH: 18
<212> TYPE: DNA
<213> ORGANISM: Artificial Sequence
<220> FEATURE:
<223> OTHER INFORMATION: Synthetic construct

<400> SEQUENCE: 49
ttagggttag ggttaggg 18

<210> SEQ ID NO 50
<211> LENGTH: 20
<212> TYPE: DNA
<213> ORGANISM: Artificial Sequence
<220> FEATURE:
<223> OTHER INFORMATION: Synthetic construct

<400> SEQUENCE: 50
ttagggttag ggttagggtt 20

<210> SEQ ID NO 51
<211> LENGTH: 10
<212> TYPE: DNA
<213> ORGANISM: Artificial Sequence
<220> FEATURE:
<223> OTHER INFORMATION: Synthetic construct

<400> SEQUENCE: 51
ggttagggtt 10